United States Patent
Raynel et al.

(10) Patent No.: US 10,874,957 B2
(45) Date of Patent: Dec. 29, 2020

(54) METHODS FOR DESALINATING AQUEOUS COMPOSITIONS THROUGH HETERO-AZEOTROPIC DISTILLATION

(71) Applicant: Saudi Arabian Oil Company, Dhahran (SA)

(72) Inventors: Guillaume Jean-Francois Robert Raynel, Dhahran (SA); Regis Didier Alain Vilagines, Dhahran (SA); Duaa J. Al Saeed, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/255,034

(22) Filed: Jan. 23, 2019

(65) Prior Publication Data

US 2020/0230519 A1 Jul. 23, 2020

(51) Int. Cl.
*B01D 3/36* (2006.01)
*B01D 5/00* (2006.01)
(Continued)

(52) U.S. Cl.
CPC ............... *B01D 3/36* (2013.01); *B01D 5/006* (2013.01); *B01D 5/0051* (2013.01); *C02F 1/04* (2013.01);
(Continued)

(58) Field of Classification Search
None
See application file for complete search history.

(56) References Cited

U.S. PATENT DOCUMENTS 2,324,240 A 7/1943 Schaafsma
2,564,200 A 8/1951 Grekel
(Continued)

FOREIGN PATENT DOCUMENTS

CA 770027 A 10/1967
CN 104844444 B 3/2017
RU 2613556 C1 3/2017

OTHER PUBLICATIONS

Vane, Review: Water recovery from brines and salt-saturated solutions: operability and thermodynamic efficiency considerations for desalination technologies, 2017, J. Chem. Technol. Biotechnol. vol. 92(10). (Year: 2017).*

(Continued)

*Primary Examiner* — Derek N Mueller
(74) *Attorney, Agent, or Firm* — Dinsmore & Shohl, LLP

(57) ABSTRACT

A method of desalinating an aqueous composition includes forming a hetero-azeotrope mixture by combining the aqueous composition with an entrainer, the aqueous composition including at least one salt, and subjecting the hetero-azeotrope mixture to distillation at a distillation temperature of less than the boiling temperature of the aqueous composition for an operating distillation pressure, resulting in separating the hetero-azeotrope mixture into a distillation bottoms liquid and a multi-phase condensate. The method includes recovering the multi-phase condensate having an entrainer-rich phase and an aqueous phase, the aqueous phase comprising desalinated water, and removing a portion of the aqueous phase from the multi-phase condensate to recover the desalinated water. Systems for conducting the method of desalinating an aqueous stream are also disclosed.

18 Claims, 30 Drawing Sheets

(51) Int. Cl.
  *C02F 1/04* (2006.01)
  *C02F 103/08* (2006.01)
  *C02F 103/10* (2006.01)
  *C02F 103/16* (2006.01)
(52) U.S. Cl.
  CPC ...... *C02F 2103/08* (2013.01); *C02F 2103/10* (2013.01); *C02F 2103/16* (2013.01)

(56) References Cited

U.S. PATENT DOCUMENTS

| | | | |
|---|---|---|---|
| 2,859,154 | A | 11/1958 | Othmer |
| 3,308,063 | A | 3/1967 | Hess et al. |
| 3,316,172 | A | 4/1967 | Hess |
| 3,318,805 | A | 5/1967 | Hess et al. |
| 3,325,400 | A | 6/1967 | Hess et al. |
| 3,337,105 | A | 8/1967 | Wilson |
| 3,350,299 | A | 10/1967 | Hess et al. |
| 3,350,300 | A | 10/1967 | Hess et al. |
| 3,350,421 | A | 10/1967 | Binning et al. |
| 3,366,553 | A | 1/1968 | Bulls et al. |
| 3,395,098 | A | 7/1968 | Hess et al. |
| 3,451,899 | A | 6/1969 | Sheely |
| 3,647,639 | A | 3/1972 | Buls et al. |
| 4,238,296 | A | 12/1980 | Sadhukjan |
| 4,548,614 | A | 10/1985 | Ireland |
| 5,076,934 | A | 12/1991 | Fenton |
| 5,330,618 | A | 7/1994 | Daniels et al. |
| 5,456,823 | A | 10/1995 | Lermite et al. |
| 8,915,301 | B1 | 12/2014 | Bader |
| 9,138,688 | B2 | 9/2015 | Prakash et al. |
| 9,266,748 | B1 | 2/2016 | Govindan et al. |
| 9,617,169 | B2 | 4/2017 | Govindan et al. |
| 9,751,777 | B1 | 9/2017 | Bader |
| 9,981,860 | B2 | 5/2018 | Govindan et al. |
| 10,060,296 | B2 | 8/2018 | Friesth |
| 2015/0143806 | A1 | 5/2015 | Friesth |
| 2016/0340208 | A1 | 11/2016 | Govindan et al. |
| 2016/0375375 | A1 | 12/2016 | Govindan et al. |
| 2017/0203977 | A1 | 7/2017 | Govindan et al. |

OTHER PUBLICATIONS

Denes et al., "New double column system for heterozzeotropic batch distillation", Computers and Chemical Engineering, vol. 33, pp. 1631-1643, 2009.
Denes et al., "Generalised closed double-column system for batch heteroazeotripic distillation", Separation and Purification Technology, vol. 89, pp. 297-308, 2012.
Furter, "Extractive Distillation by Salt Effect", Chemical Engineering Comm., vol. 116, pp. 35-40, 1992.
Gmehling et al., "Azeotropic Data for Binary Mixtures", CRC Handbook of Chemistry and Physics. 92nd Edition, pp. 6-210 to 6-228, 2011.
Le et al., "Materials and membrane technologies for water and energy stainability", Sustainable Materials and Technologies, Accepted Manuscript, 2017.
Nayar et al., "Performance Limits and Opportunities for Low Temperature Thermal Desalination", 2015 Indian Water Week, New Delhi, India, MIT Water Night, Cambridge MA, Mar. 5, 2015.
Sada et al., "Solubility of Tolunene in Aqueous Salt Solutions", Journal of Chemical and Engineering Data, vol. 20, No. 4, pp. 373-375, 1975.
Skouras, et al., "Analysis and Control of Heteroazeotropic Batch Distillation", AIChE Journal, vol. 51, No. 4, 1144-1157, Apr. 2005.
Skouras et al., "Feasible separations and entrainer selection rules for heteroazeotropic batch distillation", Chemical Engineering Science, vol. 60, pp. 2895-2909, 2005.
Sorensen et al., "Special Distillation Applications", Distillation: Operation and Applications, Chapter 9, pp. 367-401, 2004.
Stichlmair, "Distillation and Rectification", Ullmann's Encyclopedia of Industrial Chemistry, p. 57, 2000.
International Search Report and Written Opinion dated Nov. 19, 2019 pertaining to International application No. PCT/US2019/047695 filed Aug. 22, 2019, 15 pgs.
GCC Examination Report pertaining to Application No. GC2019-38286 dated Aug. 30, 2020, 5 pages.

* cited by examiner ical Field

METHODS FOR DESALINATING AQUEOUS COMPOSITIONS THROUGH HETERO-AZEOTROPIC DISTILLATION

TECHNICAL FIELD

The present specification generally relates to systems and methods for desalinating aqueous compositions, in particular, systems and methods that include hetero-azeotropic distillation for desalinating aqueous compositions.

BACKGROUND

Petroleum drilling, production, and refining operations can produce various aqueous streams, such as produced water for example, that have varied salt concentrations and include dissolved and undissolved organic compounds, such as oil residues or droplets, phenolic compounds, polymer compounds from drilling fluids and production chemicals, and other organic and inorganic contaminants. The salinity of produced water and other aqueous streams from oil drilling, production, or refining renders these aqueous streams unsuitable for many applications, such as use in drilling, oil desalting, anthropologic or agricultural uses, or other applications.

Processes such as membrane distillation, reverse osmosis, other membrane processes, thin film evaporation, vacuum distillation, multi-stage flash distillation (MSF), multiple-effect distillation (MED), mechanical or thermal vapor-compression evaporation, electro-dialysis, ion exchange, and other separation processes have been developed for removing salts from aqueous streams. For membrane-based separation processes, such as membrane distillation, reverse osmosis, or other membrane processes, the presence of oil droplets and other organic and inorganic constituents in aqueous streams from petroleum drilling, production, and refining operations renders these existing methods ineffective for desalinating the aqueous streams from petroleum operations. For example, oil droplets and other organic constituents of produced water may cause fouling of membranes employed in various membrane processes. Thermal separation methods, such as the various distillation methods previously discussed, require substantial energy demands as well as large equipment sizes (footprint and height) to desalinate large volumes of water. Additionally, some of these existing methods are not suitable from a safety standpoint in oxygen-free environments, such as petroleum drilling, production, or refining operations. In these oxygen-free environments, treatment processes must not require contact with or production of oxygen or compounds capable of providing a source of free oxygen, such as compounds commonly used in chemical treatments to remove organic compounds. Because of these constraints, produced water and other aqueous streams from petroleum drilling, production, or refining operations cannot be desalinating safely and effectively using currently available desalination technologies.

SUMMARY

Accordingly, ongoing needs exist for improved methods of desalinating aqueous compositions, such as produced water and other aqueous streams that include various salts as well as organic constituents or oily residues. The processes and systems of the present disclosure include a hetero-azeotropic distillation process in which the aqueous composition, such as produced water for example, is combined with one or more entrainers to form a hetero-azeotrope having a hetero-azeotropic boiling temperature that is less than the boiling temperature of the aqueous composition by itself. The entrainers include organic compounds that are immiscible with water or have reduced-miscibility with water, are non-reactive with water and other constituents of the aqueous composition, and do not result in introducing free-oxygen to the aqueous composition. The hetero-azeotropic distillation process may be conducted at a reduced distillation temperature, which enables a compact and economical water desalination process based on short-path distillation driven by industrial, or environmental, waste heat. Desalination of the aqueous composition through short-path hetero-azeotropic distillation may reduce the energy load of the desalination process to produce a desalinated water stream that does not have free oxygen. The processes and systems of the present disclosure can include additional unit operations, such as crystallizers and other water treatment processes, to further treat portions of the aqueous composition.

According to some aspects of the present disclosure, a method for desalinating an aqueous composition includes forming a hetero-azeotrope mixture by combining at least a portion of the aqueous composition with at least one entrainer, the at least a portion of the aqueous composition comprising at least one salt. The method includes subjecting the hetero-azeotrope mixture to distillation at a distillation temperature of less than a boiling temperature of the aqueous composition at an operating distillation pressure, which results in separation of the hetero-azeotrope mixture into a distillation bottoms liquid and a multi-phase condensate. The method further includes recovering the multi-phase condensate. The multi-phase condensate includes at least an entrainer-rich phase and an aqueous phase, the aqueous phase comprising desalinated water. The method includes removing at least a portion of the aqueous phase from the multi-phase condensate to recover the desalinated water. The method may further include subjecting at least a portion of the distillation bottoms liquid to crystallization which results in separation of the distillation bottoms liquid into a salt product and a brine composition.

According to one or more other aspects of the present disclosure, a system for desalinating an aqueous composition includes a distillation system comprising a distillation vessel in thermal communication with a heat source and a condenser in fluid communication with the distillation vessel. The system includes a condensate receiver in fluid communication with the condenser and operable to receive a multi-phase condensate comprising at least an aqueous phase and an entrainer-rich phase from the distillation system. The condensate receiver may include a separation system operable to separate at least a portion of an aqueous phase from the condensate. The system may further include a crystallizer in fluid communication with the distillation vessel, the crystallizer operable to receive a bottoms liquid from the distillation vessel and separate at least a portion of a salt in the bottoms liquid to produce a salt product and a brine composition.

Additional features and advantages of the present disclosure will be set forth in the detailed description which follows, and in part will be readily apparent to those skilled in the art from that description or recognized by practicing the described subject matter, including the detailed description which follows, the claims, as well as the appended drawings.

BRIEF DESCRIPTION OF THE DRAWINGS

The following detailed description of specific aspects of the present disclosure can be best understood when read in conjunction with the following drawings, in which like structure is indicated with like reference numerals and in which.

Figure 1:
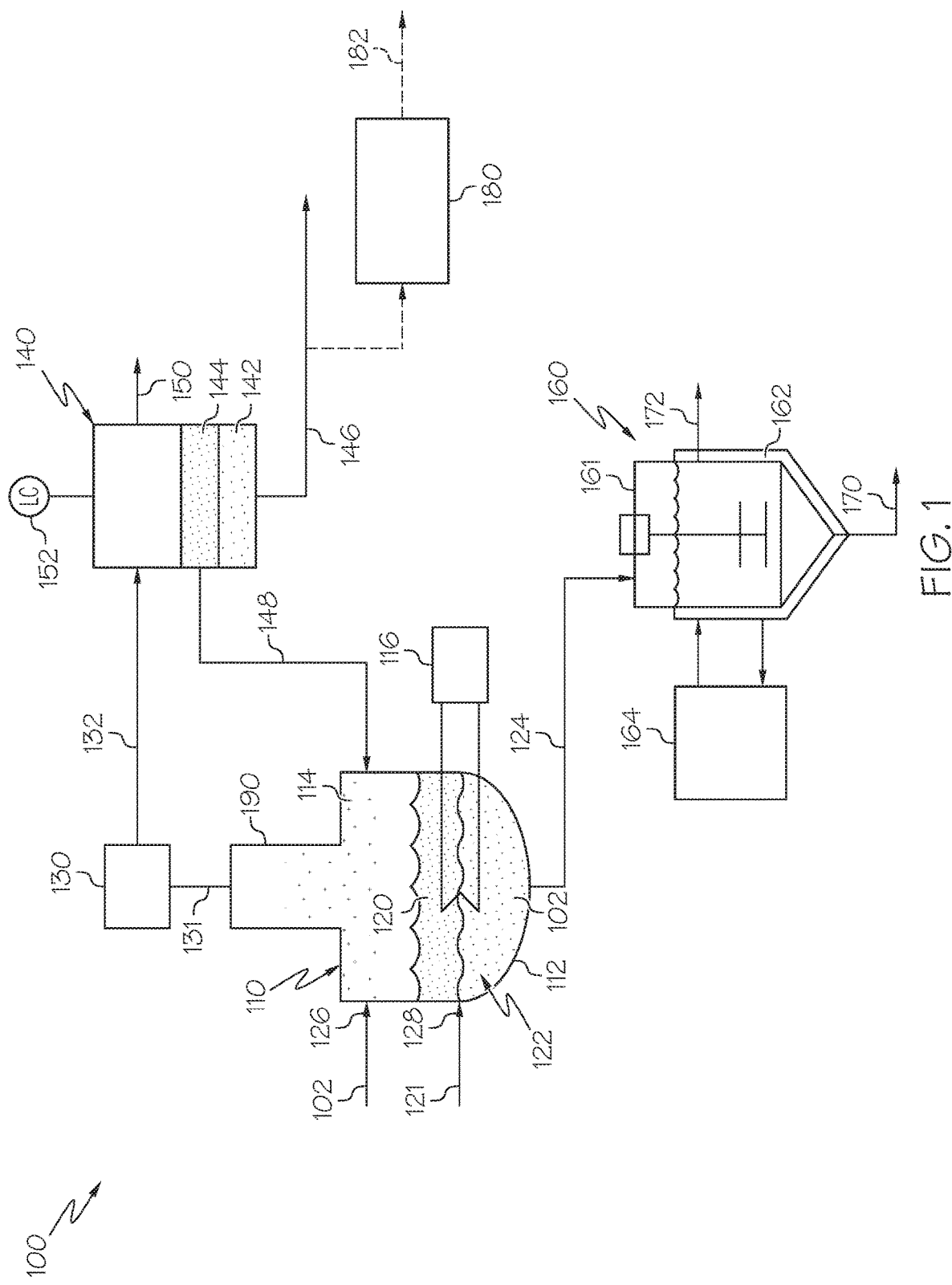
FIG. 1 schematically depicts a process flow diagram for a system for desalinating an aqueous composition, according to one or more embodiments described in this disclosure.

For the purpose of describing the simplified schematic illustrations and descriptions of FIGS. 1, 7, 8A, 8B, 8C, 8D, 9, 10, and 11, the numerous valves, temperature sensors, electronic controllers, and the like that may be employed and well known to those of ordinary skill in the art of certain chemical processing operations are not included. Further, accompanying components that are often included in typical chemical processing operations, such as valves, pipes, pumps, heat exchangers, instrumentation, internal vessel structures, or other subsystems may not be depicted. Though not depicted, it should be understood that these components are within the spirit and scope of the present disclosure. However, operational components, such as those described in the present disclosure, may be added to the systems and processes described in this disclosure.

Arrows in the drawings refer to process streams. However, the arrows may equivalently refer to transfer lines which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows which do not connect two or more system components may signify a product stream which exits the depicted system or a system inlet stream which enters the depicted system. Product streams may be further processed in accompanying chemical processing systems or may be commercialized as end products.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1, 7, 8A, 8B, 8C, 8D, 9, 10, and 11. Mixing or combining may also include mixing by directly introducing both streams into a like system component, such as a distillation vessel, crystallizer, or other system component. For example, it should be understood that when two streams are depicted as being combined directly prior to entering a system component, the streams could equivalently be introduced into the system component separately and be mixed in the system component.

Reference will now be made in greater detail to various aspects of the present disclosure, some aspects of which are illustrated in the accompanying drawings. Whenever possible, the same reference numerals will be used throughout the drawings to refer to the same or similar parts.

DETAILED DESCRIPTION

The present disclosure is directed to methods, processes, and systems for desalinating aqueous compositions that include at least one salt and may include one or more than one organic constituent. The methods and processes for desalinating the aqueous composition of the present disclosure include forming a hetero-azeotrope mixture by combining the aqueous composition with at least one entrainer. The aqueous composition includes at least one salt. Addition of the entrainer to the aqueous composition forms a hetero-azeotrope having a hetero-azeotrope boiling temperature less than the boiling temperature of the aqueous composition. The methods and processes further include subjecting the hetero-azeotrope mixture to distillation at a distillation temperature of less than the boiling temperature of the aqueous composition at an operating distillation pressure (such as less than 100° C. at 1 atmosphere (101.325 kilopascals) for pure water for example), which may result in separation of the hetero-azeotrope mixture into a two-phase condensate and a distillation bottoms liquid, and recovering the two-phase condensate from the distillation. The two-phase condensate may include a plurality of liquid phases such as an entrainer-rich phase and an aqueous phase, which includes desalinated water. The processes and methods may further include removing at least a portion of the aqueous phase from the two-phase condensate to recover desalinated water. The methods and processes of the present disclosure may further include subjecting a distillation bottoms liquid to crystallization to separate the distillation bottoms liquid into a salt product and a brine composition.

Referring to FIG. 1, a system for conducting the method of the present disclosure is schematically depicted and is generally associated with reference number 100. The system 100 for desalinating an aqueous composition 102 includes a distillation system 110 that may include a distillation vessel 112 in thermal communication with a heat source 116 and a condenser 130 in fluid communication with the distillation vessel 112. The system 100 further includes a condensate receiver 140 in fluid communication with the condenser 130. The condensate receiver 140 may be operable to receive a multi-phase condensate 132 that includes at least two liquid phases from the distillation system 110, the at least two liquid phases comprising two or more liquid phases that are immiscible with each other. The condensate receiver 140 may include a separation system operable to separate an aqueous phase 142 from the multi-phase condensate 132 to produce a desalinated water stream 146. The system 100 may also include a crystallization process 160 in fluid communication with the distillation vessel 112. The crystallization process 160 may be operable to receive a distillation bottoms liquid 124 from the distillation vessel 112 and separate at least a portion of a salt in the distillation bottoms liquid 124 to produce a salt product 170 and a brine composition 172.

The systems and methods of the present disclosure may provide a process for continuous desalination of aqueous streams and compositions that include salts and may include organic constituents without experiencing fouling and the need for a periodic cleaning sequence, such as cleaning sequences required for operation of filtration and membrane-based technologies. The systems and methods of the present disclosure also result in reduced maintenance downtime caused by fouling of equipment and membranes by oily residues or other organic constituents of the aqueous compositions. The systems and methods also do not require pre-treatment processes to remove hydrogen sulfide ($H_2S$), oil droplets, or other organic constituents (such as organic acids, alcohols, phenols, dissolved $C_1$ to $C_7$ hydrocarbons, benzene, ethylbenzene, toluene, and xylenes for example) compared to membrane-based processes or thermal non-azeotropic distillation processes. The systems and methods of the present disclosure may enable reduced energy consumption and more compact equipment compared to other known thermal desalination processes. The systems and methods of the present disclosure may also reduce the rate of corrosion of process equipment compared to other known thermal desalination processes because of the lesser temperature at which hetero-azeotropic distillation is conducted compared to the temperatures of the other thermal desalination processes. The systems and methods of the present disclosure are designed for use in oxygen-free environments and with pressurized vessels and can be easily integrated into existing petroleum drilling, production, and refining facilities compared to currently available desalination technologies. However, the system and methods of the present disclosure can also be operated at atmospheric pressure or under vacuum depending on the process conditions. The systems and methods of the present disclosure may also produce oxygen-free desalinated water without the need for an extra step of adding an oxygen scavenger in the overall water treatment process for several applications in the oil production and refining industry.

The formation of a hetero-azeotrope mixture that includes the aqueous composition and at least one entrainer reduces the boiling temperature of the aqueous composition, which also reduces the distillation temperature of the hetero-azeotropic distillation process compared to conventional thermal distillation. The decreased distillation temperature of the hetero-azeotrope mixture, compared to conventional thermal distillation, may reduce the energy required for distillation compared to conventional thermal distillation and may allow the use of waste heat, which may be readily available at most oil and gas drilling, production, or refining facilities, or other renewable energy sources, such as solar, wind, or other renewable energy sources. Thus, the systems and method of the present disclosure may have lesser operating costs compared to non-azeotropic thermal distillation processes and other desalination processes, such as membrane processes, electro-dialysis, ion exchange, or thin film evaporation, for example. The systems and methods of the present disclosure may also provide the ability to process greater quantities of the aqueous compositions per pass, potentially decreasing the capital expense compared to currently available technologies.

As used in this disclosure, the term "produced water" refers to aqueous streams that are extracted from subterranean formations by production wells during petroleum or natural gas production or aqueous streams generated from gas and oil separation plants (GOSP) or other petroleum processing facilities. Subterranean oil and gas reserves may often include substantial amounts of water along with the oil and gas. During gas and oil extraction, this water is also extracted as a by-product along with the gas or oil and is subsequently separated from the gas or oil. This water separated from the gas and oil may also be referred to as produced water. Produced water may include water naturally occurring in the subterranean formation, water injected into the subterranean formation to force oil and gas in the subterranean formation towards the production well, other water extracted from the subterranean formation, or combinations of these. As previously discussed, produced water may also include water streams from petroleum operations such as the GOSP and petroleum processing facilities. Produced water may also include a mixture of water extracted from a subterranean formation and one or more other streams of water, such as fresh water used for crude oil desalting, industrial wastewater generated at another petroleum processing facility, water from firefighting water storage, other water stream, or combinations of these.

As used in this disclosure, the term "distillation" may refer to a process of separating one or more constituents from a liquid composition based on differences in boiling temperatures of the constituents of the liquid composition.

As used in this disclosure, the term "azeotrope" may refer to a mixture of two liquid components in which the relative concentration between the two liquid components cannot be changed through distillation. Distillation of an azeotrope results in a vapor phase that has the same relative concentrations of the two components in the liquid phase.

As used in this disclosure, the term "hetero-azeotrope" may refer to an azeotrope in which the two liquid components are considered to be immiscible, which results in the hetero-azeotrope mixture being a multi-phase liquid. Two liquid components may be considered to be immiscible if a mixture of the two liquid components results in a two-phase liquid.

As used in this disclosure, the term "salinity" may refer to the concentration of dissolved salts in a liquid and is reported in this disclosure in units of grams per liter (g/L).

As used in this disclosure, the term "ambient temperature and pressure" refers generally to a temperature of 25° C. and atmospheric pressure at sea level (1 atmosphere=101.3 kilopascals (kPa)).

Referring now to FIG. 1, the process for desalinating the aqueous composition will be generally described in the context of system 100. The process for desalinating the aqueous composition 102 using system 100 of FIG. 1 includes forming a hetero-azeotrope mixture 122 by combining the aqueous composition 102 with at least one entrainer 120. The hetero-azeotrope mixture 122 is then subjected to a hetero-azeotropic distillation process in the distillation system 110. Hetero-azeotropic distillation of the hetero-azeotrope mixture 122 may produce a multi-phase condensate 132 that includes at least an aqueous phase 142 and an entrainer-rich phase 144. The aqueous phase 142 includes the desalinated water, which may be drawn out of the condensate receiver 140 in a desalinated water stream 146. Hetero-azeotropic distillation of the hetero-azeotrope mixture 122 may additionally produce a distillation bottoms liquid 124, which may have an increased salinity (increased salt concentration) compared to the hetero-azeotrope mixture 122. The multi-phase condensate 132 may be passed from the condenser 130 of the distillation system 110 to the condensate receiver 140, which may be operable to separate the aqueous phase 142 (or at least a portion of the aqueous phase 142), the entrainer-rich phase 144 (or at least a portion of the entrainer-rich phase 144), or both from the multi-phase condensate 132. The distillation bottoms liquid 124 may be passed to the crystallizer 160. The distillation bottoms liquid 124 may be subjected to crystallization in the crystallizer 160, which results in separation of the bottoms liquid 124 into the salt product 170 and the brine composition 172. The systems and methods for desalinating the aqueous compositions 102 will now be described in further detail.

The aqueous composition 102 includes water and at least one salt. In some embodiments, the aqueous composition 102 may have a plurality of different salts resulting in a plurality of ionic species in the aqueous composition 102. For example, the salts in the aqueous composition 102 may include but are not limited to chloride, bromide, fluoride, sulfide, sulfate, carbonate, phosphate, nitrate, or nitrite salts of calcium, sodium, potassium, magnesium, other cationic species, or combinations of these. The aqueous composition 102 may include produced water, water streams from oil-desalting, other aqueous streams from oil refining operations, seawater, briny water, salty wastewater, briny groundwater, the brine composition 172 from crystallization of the distillation bottoms liquid 124 (subsequently described in this disclosure), other aqueous compositions having at least one salt, or combinations of these. In some embodiments, the aqueous composition 102 may be briny water. As used in this disclosure, the term "briny water" may refer to water having a salinity of greater than or equal to 1 gram per liter (g/L), such as in a range of from 3 g/L to 300 g/L. In some embodiments, the aqueous composition 102 may be produced water from hydrocarbon drilling, production, or refining operations. In some embodiments, the aqueous composition 102 may be seawater or salty wastewater.

The aqueous compositions 102 may have a salinity that is sufficient to make the aqueous composition 102 unsuitable for use in petroleum drilling, production, or refining operations, such as preparation of drilling fluids, oil desalting, or other processes. The aqueous composition 102 may have salinity sufficient to make the aqueous composition 102 unsuitable for anthropologic or agricultural uses. The aqueous composition 102 may have salinity of greater than or equal to 1 g/L, greater than or equal to 10 g/L, greater than or equal to 20 g/L, greater than or equal to 100 g/L, or even greater than or equal to 200 g/L at ambient temperature and pressure. The aqueous composition 102 may have a salinity of less than or equal to 360 g/L, less than or equal to 350 g/L, less than or equal to 300 g/L, or even less than or equal to 200 g/L at ambient temperature and pressure. In some embodiments, the aqueous composition 102 may have salinity less than the solubility limit of the salts in water. The solubility limit is the concentration at which solids, such as salts, will start to precipitate, which is about 360 g/L for salts in water at ambient temperature and pressure. For more complex solutions, such as produced water that includes salts, organics, oil residues, and other constituents, the solubility limit may be about 350 g/L. In some embodiments, the aqueous composition 102 may have a salinity of from 1 g/L to 360 g/L, from 1 g/L to 350 g/L, from 1 g/L to 300 g/L, from 1 g/L to 200 g/L, from 10 g/L to 360 g/L, from 10 g/L to 350 g/L, from 10 g/L to 300 g/L, from 20 g/L to 360 g/L, from 20 g/L to 350 g/L, from 20 g/L to 300, from 200 g/L to 360 g/L, from 200 g/L to 350 g/L, or even from 200 g/L to 300 g/L at ambient temperature and pressure. In some embodiments, the aqueous composition 102 may be a greater-salinity aqueous composition having salinity of greater than or equal to 200 g/L at ambient temperature and pressure. Alternatively, in other embodiments, the aqueous composition 102 may be a lesser-salinity aqueous composition having a salinity of less than 200 g/L at ambient temperature and pressure.

The salinity of the aqueous composition 102 may cause the aqueous composition 102 to have a boiling temperature of greater than 100 degrees Celsius (° C.) at atmospheric pressure. The boiling temperature of the aqueous composition 102 may be greater than 101° C., greater than 102° C., or even greater than or equal to 105° C. Generally, the boiling temperature of the aqueous composition 102 increases with increasing salinity.

The aqueous composition 102 may also include organic compounds, such as free oil and hydrocarbon gases, dissolved hydrocarbons (such as dissolved $C_1$ to $C_7$ hydrocarbons), other dissolved organic compounds, such as phenolic compounds, organic acids, alcohols, benzene, ethylbenzene, toluene, xylenes, other organic compounds, or combinations of these. The aqueous composition 102 may have an oil content of greater than 0.1 weight percent (wt. %) based on the total weight of the aqueous composition 102. In some embodiments, the aqueous composition 102 may have up to or greater than 1 wt. % oil. The oil may be present in the aqueous composition 102 in the form of oil droplets suspended in the aqueous composition. Other organic compounds that may be present in the aqueous composition 102 may include, but are not limited to, phenolic compounds, alkanes, alkenes, organic acids, alcohols, waxes, asphaltenes, aromatic compounds, or combinations of these.

Some aqueous compositions 102, such as aqueous compositions 102 comprising produced water, may include inorganic contaminants, such as dissolved minerals, metals, and anionic species. Inorganic contaminants that may be present in the produced water may include, but are not limited to, aluminum, calcium, magnesium, arsenic, cadmium, chromium, copper, iron, lead, manganese, nickel, potassium, sodium, selenium, zinc, barium, lithium, sulfur, strontium, titanium, vanadium, other metal or inorganic contaminates, or combinations of these. The aqueous composition 102 may also include water-soluble polymers from the formulation of oilfield chemicals, such as demulsifiers, hydrate inhibitors, drilling fluids, spacer fluids, or other chemicals. Examples of these water-soluble polymers may include, but are not limited to, polyethylene oxides from demulsifier makeup, polyamides found in hydrate inhibitors, xanthan gum (XC) polymers used in drilling fluids, other water-soluble polymers, or combinations of polymers.

As previously discussed, the aqueous composition 102 is combined with at least one entrainer 120 to form the hetero-azeotrope mixture 122 that has a lesser boiling temperature compared to the boiling temperature of the aqueous composition 102 without the entrainer 120. In some cases, only a portion of the aqueous composition 102 may be combined with the entrainer 120 to form the hetero-azeotrope mixture 122, such as when the salinity of the aqueous composition 102 is greater than 200 g/mL and a portion of the salt is removed from the aqueous composition 102 prior to forming the hetero-azeotrope mixture 122. The entrainer 120 (or entrainers) forms an azeotrope with the water of the aqueous composition 102. Not intending to be bound by any particular theory, it is believed that the water molecules of the aqueous composition 102 interact with the molecules of the entrainer 120 to form a complex, which exhibit distinct physical and chemical properties. If the interaction between the water molecules and the entrainer is strong, then the azeotrope forms a homogeneous mixture. When the interaction between the water molecules and entrainer molecules is weaker, a hetero-azeotrope may be formed in which the vapor phase co-exists with two separate liquid phases, an aqueous phase and an entrainer phase.

Figure 2:
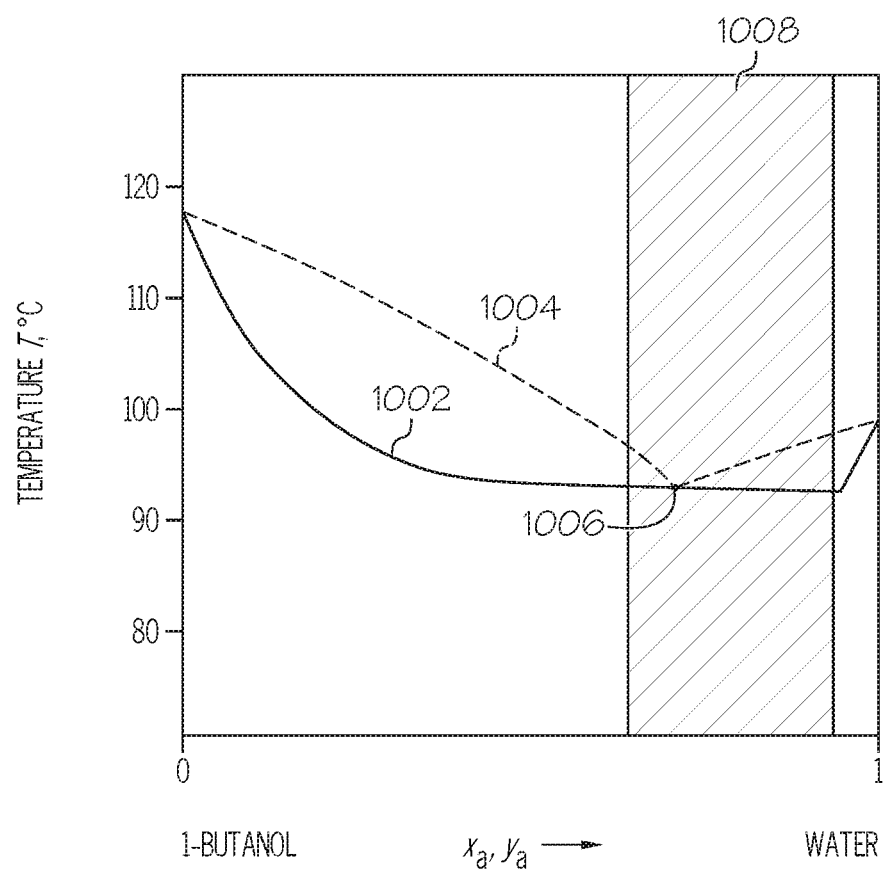
FIG. 2 graphically depicts a phase equilibrium diagram for an azeotrope of water and 1-butanol.

Referring to FIG. 2, a phase equilibrium diagram for a binary mixture of 1-butanol and water is depicted at ambient pressure. The phase equilibrium diagram of FIG. 2 graphically depicts the boiling point curve 1002, which is the boiling temperature (y-axis) as a function of the mass fraction of water in the liquid (x-axis), and the dew point curve 1004, which is the dew point temperature (y-axis) as a function of the mass fraction of water in the vapor phase (x-axis). At the azeotrope point 1006, the boiling temperature and dew point temperature converge, and the composition of the vapor phase is the same as the composition of the liquid phase. At the azeotrope composition and temperature, the composition (mixture of 1-butanol and water) boils at constant temperature to produce the vapor phase that has the same relative composition as the liquid phase. When the mass fraction of water in the mixture is less than the azeotrope composition, the vapor phase may have a greater concentration of 1-butanol than the vapor phase at the azeotrope composition. Thus, the 1-butanol may be transitioned to the vapor phase at a greater rate than the water, thus, increasing the mass fraction of water in the mixture. The mass fraction of water in the mixture may increase until the composition of the mixture reaches the azeotrope point 1006, where the composition of the vapor phase is the same as the liquid phase, which results in the boiling temperature and composition of the liquid phase remaining constant.

FIG. 2 also depicts the immiscibility range 1008 between the water and 1-butanol. At compositions within the immiscibility range 1008, the mixture of 1-butanol and water form a two-phase liquid. As shown in FIG. 2, the azeotrope point 1006 of a mixture of 1-butanol and water has an azeotrope composition that is within the immiscibility range of 1-butanol and water. Thus, 1-butanol and water may form a hetero-azeotrope mixture that includes a multiple-phase liquid.

Figure 3:
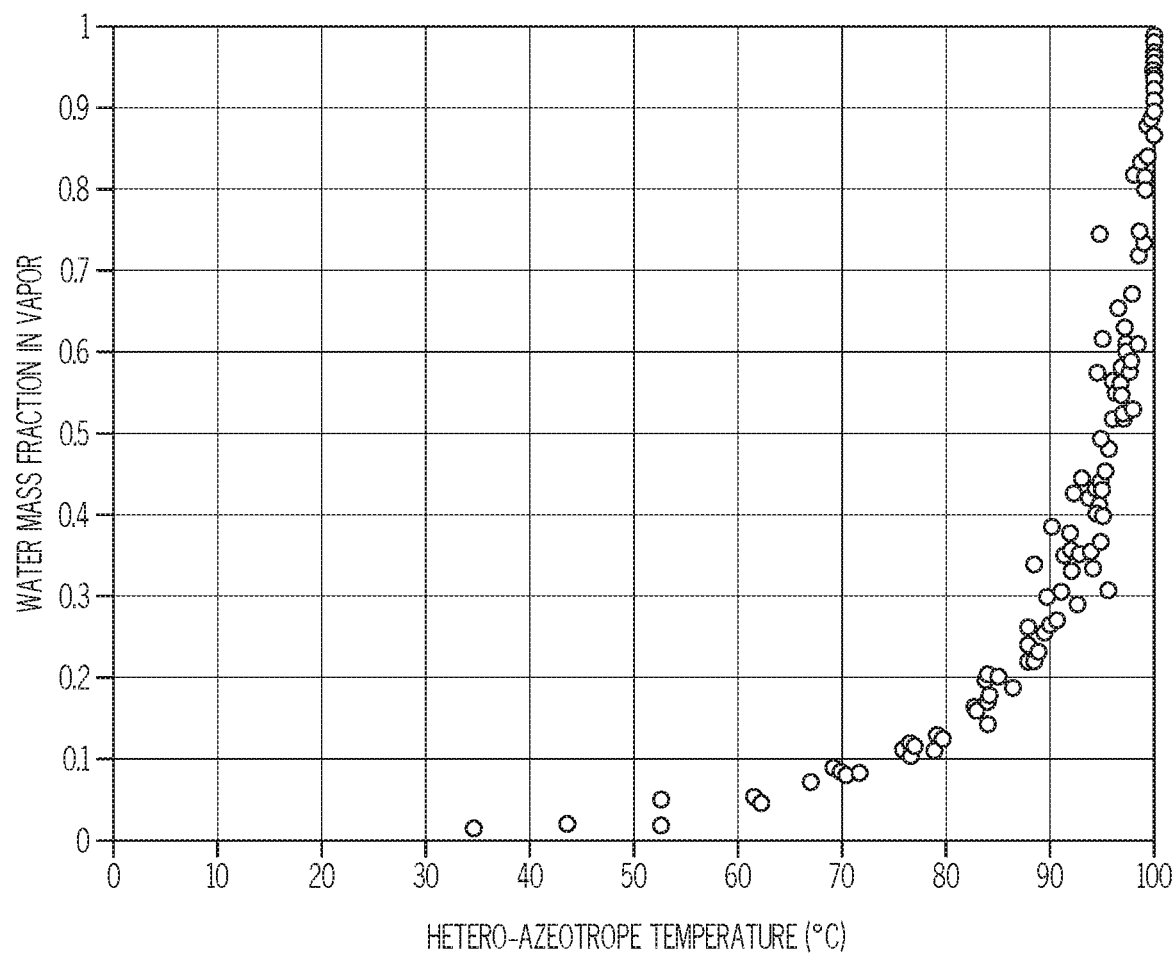
FIG. 3 graphically depicts a mass fraction of water in a vapor phase (y-axis) and hetero-azeotrope boiling temperature (x-axis) for a plurality of hetero-azeotropes formed with water and various entrainer compounds, according to one or more embodiments described in this disclosure.

This azeotrope point 1006, which has a boiling temperature of the hetero-azeotrope for a distinct mass fraction of water, is a physical attribute of the hetero-azeotrope mixture 122. At a given pressure, each hetero-azeotrope combination may have an azeotrope point 1006 characterized by a hetero-azeotrope boiling temperature and a hetero-azeotrope composition, which may be expressed as a mass fraction of one or more constituents in the vapor phase or liquid phase. Referring now to FIG. 3, the hetero-azeotrope composition (mass fraction of water in the vapor phase) (y-axis) and the hetero-azeotrope boiling temperature (x-axis) for a plurality of different binary hetero-azeotrope pairs formed with water and a plurality of different entrainer compounds are graphically depicted. As shown in FIG. 3, hetero-azeotropes having a greater hetero-azeotrope boiling temperature generally have a hetero-azeotrope composition with a greater concentration of water compared to hetero-azeotropes having lesser hetero-azeotrope boiling temperatures. As shown in FIG. 3, selection of the entrainer used to form the hetero-azeotrope mixture 122 may influence the energy consumption of the desalination process of the present disclosure by fixing the distillation temperature at the constant hetero-azeotrope boiling temperature and may also influence the production rate of desalinated water by setting the concentration of water in the vapor phase resulting from the distillation.

The entrainer 120 may be an organic compound capable of forming a hetero-azeotrope mixture when combined with the aqueous composition 102. The entrainer 120 may have an entrainer boiling temperature that is less than the boiling temperature of the aqueous composition 102. For instance, the entrainer 120 may have an entrainer boiling temperature of less than or equal to 120° C., less than or equal to 100° C., less than or equal to 90° C., less than or equal to 80° C., or even less than or equal to 70° C. Entrainers 120 suitable for forming the hetero-azeotrope mixture 122 may be considered to be immiscible with water. For instance, the entrainers 120 may have a solubility in water of less than 20 grams per 100 grams of water (g/100 g water), such as less than 10 g/100 g water. Or even less than 1 g/100 g water at 25° C. and atmospheric pressure. In some embodiments, the entrainers 120 may have a solubility in water of from $7 \times 10^{-3}$ g/100 g water to 20 g/100 g water, from $7 \times 10^{-3}$ g/100 g water to 10 g/100 g water, from $7 \times 10^{-3}$ g/100 g water to 1 g/100 g water, from 0.01 g/100 g water to 20 g/100 g/100 g water, from 0.01 g/100 g water to 10 g/100 g water, or from 0.01 g/100 g water to 1 g/100 g water, the solubility being measured at 25° C. and atmospheric pressure. The entrainers 120 may be selected to form an azeotrope with the aqueous composition 102 in which the azeotrope composition at the azeotrope temperature and the operating pressure of the distillation system 110 is within an immiscibility range of a mixture of the entrainer 120 and the aqueous composition 102.

The entrainers 120 may be chemically stable when combined with the aqueous composition 102. As used in this disclosure, the term "chemically stable" means that the entrainer does not undergo a chemical reaction to form another species when contacted with one or more of the constituents of the aqueous composition 102. The entrainers 120 may have reduced or negligible reactivity with water and the other constituents of the aqueous composition 102. Reaction of the entrainer 120 with water or other constituents of the aqueous composition 102 may result in loss of the entrainer 120 due to consumption of the entrainer 120 by the reaction or production of toxic compounds or compounds that are hazardous in an oil and gas processing environment. The entrainers 120 may not include compounds that are highly-toxic or are incompatible with oil and gas environments, such as compounds that undergo side reactions with acid gases or crude oil droplets in the aqueous composition 102. The entrainer 120 may not include halogen-containing compounds, amines, nitriles, acetals, aldehydes, vinyl ethers, or combinations of these. In some embodiments, the entrainer 120 may be substantially free of halogen-containing compounds, amines, nitriles, acetals, aldehydes, vinyl ethers, or combinations of these. As used in this disclosure, the term "substantially free" of a component means less than 1 wt. % of that component in a composition, reactor, vessel, or stream. For example, an entrainer 120 that is substantially free of halogens, amines, nitriles, acetals, aldehydes, vinyl ethers, or combinations of these may have less than 1 wt. % halogens, amines, nitriles, acetals, aldehydes, vinyl ethers, or combinations of these based on the total weight of the entrainer 120.

The entrainer may not include halogen compounds (compounds containing a halogen atom) because halogens may decompose into alcohol in the presence of water in acidic or basic conditions. The aqueous composition 102 may contain hydrogen sulfide which may decompose halogen-containing entrainers into thiols or thioethers. Entrainers containing amine(s) may react readily with dissolved carbon dioxide and hydrogen sulfide in the aqueous composition 102 to form ammonium salts or carbamates, which would then dissolve in the briny water of the aqueous composition 102. Entrainers containing nitrile(s) may decompose thermally by releasing trace amounts of cyanic acid, which is highly toxic, or chemically by reacting with hydrogen sulfide to yield thioamides. Entrainers containing acetal(s) may decompose to the corresponding aldehydes and alcohols. The aldehydes may subsequently decompose into the acids with the presence of oxygen in the water or into aldehyde hydrates, also known as gem-diols, which are soluble in water. Thus, the use of acetal or aldehyde containing entrainers would result in loss of the entrainer through side reactions and solubility in the water and possible introduction of free oxygen into the various streams. Entrainers containing vinyl ether(s) may hydrolyze with the residual acidity of the water into the corresponding aldehyde(s) and alcohols (or acid). Thus, entrainers containing halogens, amines, nitriles, vinyl ethers, acetals, aldehydes or a combination of these functionalities may be unsuitable for use as the entrainer in the methods and processes for desalinating aqueous compositions 102 of the present disclosure.

The entrainer 120 may include one or more than one chemical functionality selected from an alkane, an alkene, an aromatic, an ester, an alcohol, a thiol, a disulfide, a sulfide, an ether, a ketone, a nitro group, or combinations of these. The entrainer 120 may be selected from 2-methyl-1,3-butadiene; pentane; 2-methyl-2-butene; methylenecyclobutane; carbon disulfide; 1-hexene; ethyl formate; 4-methyl-2-pentene; 3-methyl-3-buten-1-ol; hexane; isopropyl ether; cis-1-butenyl ethyl ether; 1-butenyl methyl ether; benzene; cyclohexane; ethyl acetate; cyclohexene; methyl propanoate; propyl formate; isopropyl acetate; ethylbutyl ether; isopropylacetate; butyl ethyl ether; 1-heptene; 2,5-dimethylfuran; 2,2,4-trimethylpentane; heptane; isobutyl formate; methylisopropenyl ketone; diisobutylene; propyl acetate; 3-pentanone; allyl acetate; nitroethane; 2,6-dimethyl-4-heptanol; toluene; 1,2-propanediol diacetate; butyl isopropenyl ether; 2-methyl-2-butanol; methylisobutyl ketone; isobutyl acetate; 2-methylpropyl acetate; cyclopropyl methyl ketone; propyl propanoate; octane; isobutyl alcohol; 2-pentanol, or combinations of these entrainers. Table 1 provides the azeotropic temperature, azeotropic pressure, and the mass fraction of water in the vapor phase for hetero-azeotrope mixtures that include water and each of the previously recited entrainer compounds. The entrainer compounds as well as the hetero-azeotrope boiling temperature and mass fraction of water in the hetero-azeotrope vapor are provided in Table 1.

TABLE 1

Hetero-Azeotrope Boiling Temperatures and Mass Fraction of Water in the Vapor for Exemplary Entrainer Compounds

| Entrainer Compound | Hetero-Azeotrope Boiling Temp. (° C.) | Hetero-Azeotrope Pressure (kPa) | Mass Fraction of Water in Vapor |
|---|---|---|---|
| 2-Methyl-1,3-butadiene | 32.7 | 101.33 | 0.014287 |
| Pentane | 34.6 | — | 0.014 |
| 2-Methyl-2-butene | 36.6 | 101.33 | 0.01753 |
| Methylenecyclobutane | 40.0 | 101.33 | 0.005691 |
| Carbon disulfide | 43.6 | — | 0.02 |
| 1-Hexene | 45.0 | 63.35 | 0.0366 |
| Ethyl formate | 52.6 | — | 0.05 |
| Ethylformate | 52.6 | 101.33 | 0.017961 |
| 4-Methyl-2-pentene | 53.3 | — | 0.035 |
| 3-Methyl-3-buten-1-ol | 60.00 | 101.33 | 0.5788 |
| Hexane | 61.6 | 101.33 | 0.052903 |
| Isopropyl ether | 62.2 | — | 0.046 |
| Cis-1-Butenyl ethyl ether | 64.0 | — | 0.061 |
| 1-Butenyl methyl ether | 67.0 | — | 0.072 |
| Benzene | 69.2 | 101.33 | 0.089107 |
| Benzene | 69.4 | — | 0.089 |
| cyclohexane | 69.8 | — | 0.085 |
| Ethyl acetate | 70.4 | — | 0.081 |
| Ethyl acetate | 70.4 | 101.33 | 0.080152 |
| Cyclohexene | 70.8 | 101.33 | 0.089245 |
| Methyl propanoate | 71.6 | 101.33 | 0.08228 |
| Propyl formate | 71.7 | 101.33 | 0.083711 |
| Isopropyl acetate | 75.9 | — | 0.111 |

TABLE 1-continued

Hetero-Azeotrope Boiling Temperatures and Mass Fraction of Water in the Vapor for Exemplary Entrainer Compounds

| Entrainer Compound | Hetero-Azeotrope Boiling Temp. (° C.) | Hetero-Azeotrope Pressure (kPa) | Mass Fraction of Water in Vapor |
|---|---|---|---|
| Ethylbutyl ether | 76.6 | — | 0.119 |
| Isopropylacetate | 76.6 | 101.33 | 0.103583 |
| Butyl ethyl ether | 76.7 | 101.33 | 0.107913 |
| 1-Heptene | 77.05 | 101.33 | 0.1130 |
| 2,5-Dimethylfuran | 77.0 | — | 0.117 |
| 1-Heptene | 77.05 | 101.33 | 0.113 |
| 2,2,4-Trimethylpentane | 78.8 | 101.33 | 0.110968 |
| Heptane | 79.2 | — | 0.129 |
| Heptane | 79.2 | 101.33 | 0.128585 |
| Isobutylformate | 79.6 | 101.33 | 0.124254 |
| Methylisopropenyl ketone | 81.5 | — | 0.184 |
| Diisobutylene | 82.0 | — | 0.12 |
| Propyl acetate | 82.76 | 101.33 | 0.161837 |
| 3-Pentanone | 82.9 | 101.33 | 0.15901 |
| Allyl acetate | 83.0 | — | 0.167 |
| Nitroethane | 83.75 | 101.33 | 0.203587 |
| Methylpropyl ketone | 83.8 | — | 0.196 |
| Butyl formate | 83.8 | 101.33 | 0.169151 |
| 2,6-Dimethyl-4-heptanol | 83.9 | — | 0.143 |
| Toluene | 84.1 | 101.33 | 0.176408 |
| Toluene | 85.0 | — | 0.202 |
| 1,2-Propanediol diacetate | 85.0 | 59.41 | 0.80806 |
| Butyl Isopropenyl ether | 86.3 | — | 0.188 |
| 2-Methyl-2-butanol | 87.7 | 101.75 | 0.262545 |
| Methylisobutyl ketone | 87.9 | — | 0.24 |
| Isobutyl acetate | 87.9 | 101.33 | 0.218944 |
| 2-Methylpropyl acetate | 88.4 | — | 0.22 |
| Cyclopropyl methyl ketone | 88.5 | 101.19 | 0.339435 |
| Propyl propanoate | 88.9 | 101.33 | 0.231244 |
| Octane | 89.6 | 101.33 | 0.255214 |
| Isobutyl alcohol | 89.7 | — | 0.3 |
| 2-Pentanol | 90.0 | 92.49 | 0.38623 |

The data in Table 1 was obtained from J. Gmehling, J Menke, J. Krafczyk, K. Fischer, J. -C, Fontaine, and H. V. Kehianian, "Azeotropic Data for Binary Mixtures," *CRC Handbook of Chemistry and Physics*, 92nd Edition (2011) pp. 6-210 to 6-228.

As shown in Table 1, the mass fraction of water in the hetero-azeotrope vapor increases with increasing hetero-azeotrope boiling temperature.

The hetero-azeotrope mixture 122 may comprise, consist of, or consist essentially of the aqueous composition 102 and one or more entrainers 120. The hetero-azeotrope mixture 122 may include an amount of the entrainer 120 sufficient to form the hetero-azeotrope with the aqueous composition 102. The hetero-azeotrope mixture 122 may have from 10 volume percent (vol. %) to 95 vol. %, from 10 vol. % to 80 vol. %, from 40 vol. % to 95 vol. %, from 40 vol. % to 80 vol. %, from 60 vol. % to 95 vol. %, or from 60 vol. % to 80 vol. % aqueous composition 102 based on the total volume of the hetero-azeotrope mixture 122. A volume ratio of the aqueous composition 102 to the entrainers 120 may be defined as the volume percent of the aqueous composition 102 in the hetero-azeotrope mixture 122 divided by the total volume percent of all of the entrainers 120 in the hetero-azeotrope mixture 122. The hetero-azeotrope mixture 122 may have a volume ratio of the aqueous composition 102 to the entrainers 120 sufficient to form the hetero-azeotrope. For instance, the hetero-azeotrope mixture 122 may have a volume ratio of the aqueous composition 102 to the entrainers 120 of from 0.2 to 9.0, from 0.2 to 4.0, from 0.2 to 1.5, from 0.2 to 1.0, from 0.2 to 0.8, from 0.2 to 0.6, from 0.4 to 9.0, from 0.4 to 4.0, from 0.4 to 1.5, from 0.4 to 1.0, from 0.4 to 0.8, from 0.4 to 0.6, from 0.6 to 9.0, from 0.6 to 4.0, from 0.6 to 1.5, from 0.6 to 1.0, from 0.6 to 0.8, from 0.8 to 9.0, from 0.8 to 4.0, from 0.8 to 1.5, from 0.8 to 1.0, from 1.0 to 9.0, from 1.0 to 4.0, from 1.0 to 1.5, from 1.5 to 9.0, or from 1.5 to 4.0.

As previously discussed, the hetero-azeotrope boiling temperature of the hetero-azeotrope mixture 122 is a physical constant at a given pressure and sets the operating distillation temperature in the distillation system 110 at the operating distillation pressure. As used in this disclosure, the operating distillation pressure refers to the pressure in the distillation system 110 during operation of the distillation system 110. The hetero-azeotrope mixture 122 may have a hetero-azeotrope boiling temperature that is less than the boiling temperature of the aqueous composition 102 at the operating distillation pressure of the distillation system 110. The hetero-azeotrope mixture 122 having a hetero-azeotrope boiling temperature less than the boiling temperature of the aqueous composition 102 at the operating distillation pressure may enable the distillation to be carried out on the hetero-azeotrope mixture 122 with less energy compared to subjecting the aqueous composition 102 to conventional thermal distillation. In some embodiments, the hetero-azeotrope mixture 122 may have a hetero-azeotrope boiling temperature at the operating distillation pressure that is less than the boiling temperature of the aqueous composition 102 and the boiling temperature of the entrainer 120 at the operating distillation pressure. In some embodiments, the hetero-azeotrope mixture 122 may have a hetero-azeotrope boiling temperature at an operating distillation pressure equal to atmospheric pressure at sea level (101.325 kilopascals (kPa)) of less than or equal to 100° C., such as less than or equal to 95° C., less than or equal to 90° C., less than or equal to 85° C., or even less than or equal to 80° C. For instance, the hetero-azeotrope mixture 122 may have a hetero-azeotrope boiling temperature of from 40° C. to 100° C., from 50° C. to 95° C., from 50° C. to 90° C., from 50° C. to 85° C., from 50° C. to 80° C., from 60° C. to 95° C., from 60° C. to 90° C., from 60° C. to 85° C., or from 60° C. to 80° C. at an operating distillation pressure of 101.325 kPa. The hetero-azeotrope boiling temperature may increase with increasing pressure, such as increasing operating distillation pressure. Additionally, increasing the pressure may also change the ratio of water to entrainer in the hetero-azeotrope mixture 122. For example, increasing the pressure may result in an increase in the volume percent (as well as mole percent and mass percent) of water in the hetero-azeotrope at the hetero-azeotrope composition. Thus, increasing the operating distillation pressure can increase the proportion of desalinated water in the vapor phase during distillation of the hetero-azeotrope mixture 122.

The hetero-azeotrope mixture 122 may be a ternary hetero-azeotrope in which the aqueous composition 102 is combined with two entrainers, such as a first entrainer and a second entrainer. Formation of a ternary hetero-azeotrope mixture may enable the distillation temperature in the distillation system 110 to be further adjusted to a temperature that is in-between a first hetero-azeotrope boiling temperature and a second hetero-azeotrope boiling temperature. The first hetero-azeotrope boiling temperature is the hetero-azeotrope boiling temperature of a first hetero-azeotrope comprising the aqueous composition 102 and the first entrainer with the concentration of the second entrainer equal to zero, and the second hetero-azeotrope boiling temperature is a hetero-azeotrope boiling temperature of a second hetero-azeotrope comprising the aqueous composition 102 and the second entrainer with the concentration of the first entrainer equal to zero. The boiling temperature of the hetero-azeotrope mixture that includes a ternary azeotrope may be increased or decreased by increasing or decreasing the concentration of the first entrainer, the second entrainer or both. In some cases, the hetero-azeotrope mixture 122 may be a multi-heteroazeotrope that includes 2, 3, 4, or more than 4 entrainers.

Figure 4A:
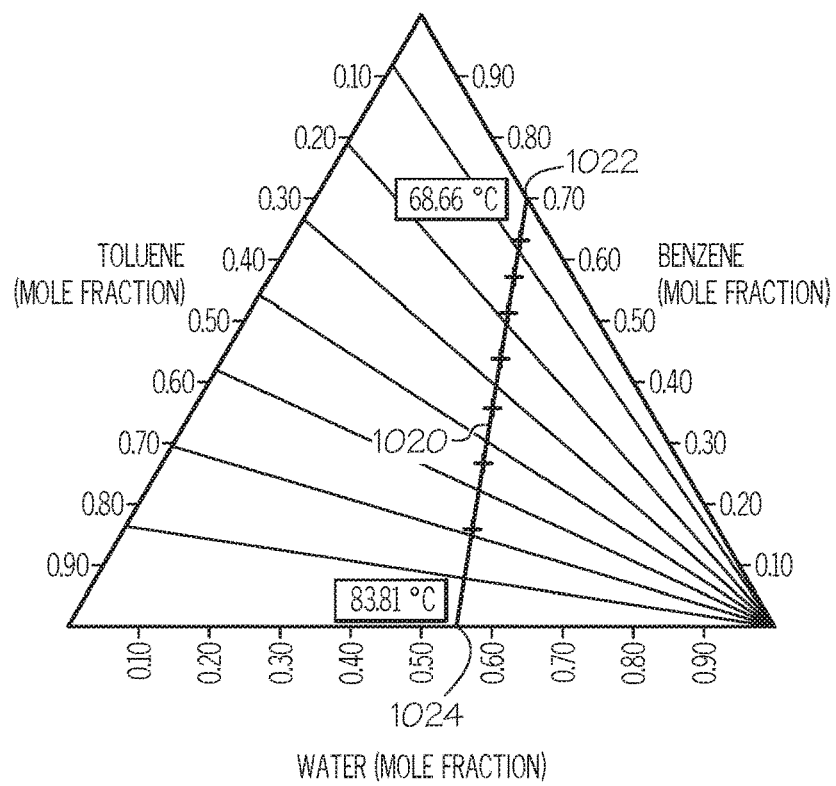
FIG. 4A graphically depicts a phase equilibrium diagram for a ternary hetero-azeotrope of water, benzene, and toluene at a pressure of 1 bar (100 kPa), according to one or more embodiments described in this disclosure.
Figure 4B:
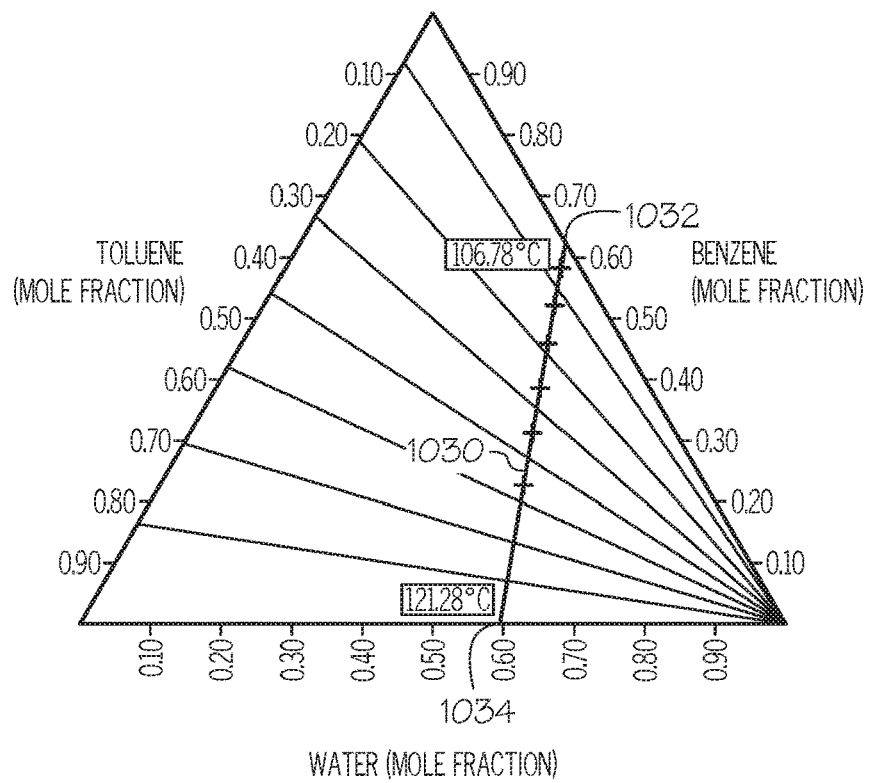
FIG. 4B graphically depicts a phase equilibrium diagram for a ternary hetero-azeotrope of water, benzene, and toluene at a pressure of 3.5 bar (350 kPa), according to one or more embodiments described in this disclosure.

Referring to FIGS. 4A and 4B, ternary phase equilibria diagrams for a ternary hetero-azeotrope formed from water, benzene, and toluene. The ternary phase equilibria diagrams were generated using Aspen Plus v9 modeling software. FIG. 4A represents the ternary phase equilibria at 1 bar (100 kilopascals (kPa), where 1 bar is equal to 100 kPa) of pressure, and FIG. 4B represents the ternary phase equilibria at a pressure of 3.5 bars (350 kPa) of pressure. Referring to FIG. 4A, at 1 bar, a first hetero-azeotrope boiling temperature of a first hetero-azeotrope comprising water and benzene occurs at 68.66° C. at point 1022 in FIG. 4, and a second hetero-azeotrope boiling temperature of a second hetero-azeotrope comprising water and toluene occurs at 83.81° C. at point 1024. Formation of a ternary hetero-azeotrope that includes water, toluene, and benzene may allow the boiling temperature to be adjusted within a range between the first hetero-azeotrope boiling temperature (68.66° C.) and the second hetero-azeotrope boiling temperature (83.81° C.). The line 1020 in FIG. 4A between point 1022 and point 1024 represents the range of the ternary hetero-azeotrope compositions having ternary hetero-azeotrope boiling temperatures between the first hetero-azeotrope boiling temperature and the second hetero-azeotrope boiling temperature. Thus, use of a ternary hetero-azeotrope that includes water, benzene, and toluene may enable the distillation temperature of the distillation system 110 to be varied within a range of from 68.66° C. and 83.81° C. at a pressure of 100 kPa.

Increasing the pressure may result in an increase in the hetero-azeotrope boiling temperature of the hetero-azeotrope mixture 122 and may also slightly change the composition of the hetero-azeotrope. Referring to FIG. 4B, the ternary phase equilibrium diagram for a water, toluene, and benzene mixture at 350 kPa is depicted. As shown by FIG. 4B, for the water, toluene, and benzene ternary hetero-azeotrope, increasing the pressure increases the first hetero-azeotrope boiling temperature at point 1032 to 106.78° C. and the second hetero-azeotrope mixture at point 1034 to 121.28° C. Thus, the range of hetero-azeotrope boiling temperatures for the water/benzene/toluene ternary mixture increases by about 40° C. for an increase of 250 kPa (comparing FIGS. 4A and 4B). Additionally, the increase in pressure shifts the range of ternary hetero-azeotrope compositions (lines 1020 and 1030) towards greater molar concentration of water. For the water/benzene/toluene ternary hetero-azeotrope mixture of FIGS. 4A and 4B, the composition of the ternary hetero-azeotrope increases in water by 5 mole percent (mol %) and decreases in benzene by approximately 10 mol % in response to an increase in pressure of 250 kPa. Thus, FIG. 4A and FIG. 4B show that increasing the pressure can increase the proportion of water in the ternary hetero-azeotrope, and thus the amount of water in the vapor phase. However, increasing the pressure also increases the ternary hetero-azeotrope boiling temperature, which may increase the energy input into the distillation system 110.

Figure 5:
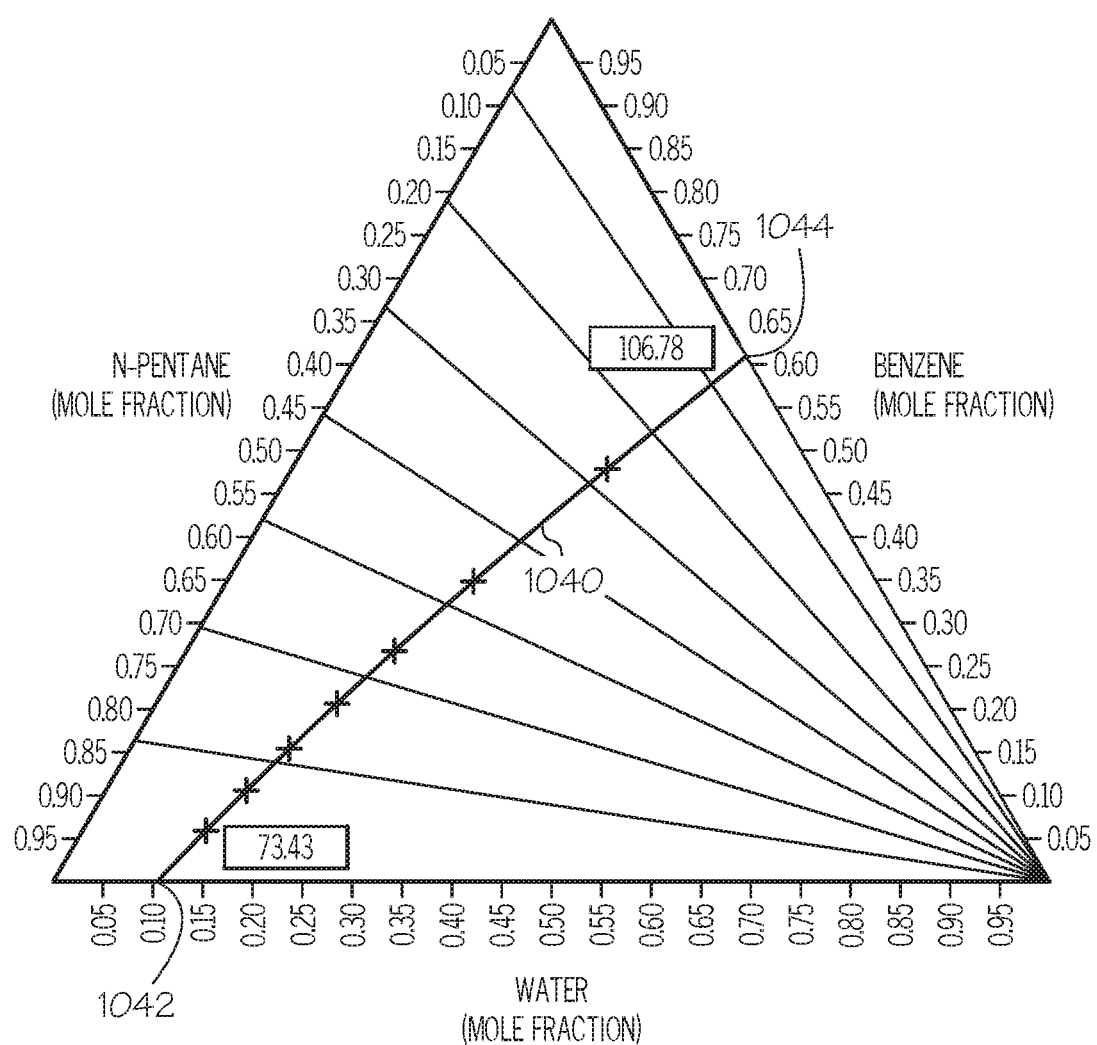
FIG. 5 graphically depicts a phase equilibrium diagram for a ternary hetero-azeotrope of water, benzene, and n-pentane at a pressure of 3.5 bar (350 kPa), according to one or more embodiments described in this disclosure.

Referring to FIG. 5, a ternary hetero-azeotrope may also be formed from the combination of water with benzene and n-pentane as the entrainers. At 3.5 bar (350 kPa), the first hetero-azeotrope boiling temperature of the first hetero-azeotrope comprising water and n-pentane occurs at 73.43° C. at point 1042 in FIG. 5, and the second hetero-azeotrope boiling temperature of the second hetero-azeotrope comprising water and benzene occurs at 106.78° C. at point 1044. In FIG. 5, the line 1040 between point 1042 and point 1044 represents the range of the ternary hetero-azeotrope compositions of water, benzene, and n-pentane having ternary hetero-azeotrope boiling temperatures between the first hetero-azeotrope boiling temperature and the second hetero-azeotrope boiling temperature. With a ternary hetero-azeotrope formed from water, benzene, and n-pentane, the distillation temperature may be varied within a range of from 73.43° C. to 106.78° C. at 350 kPa.

Figure 6:
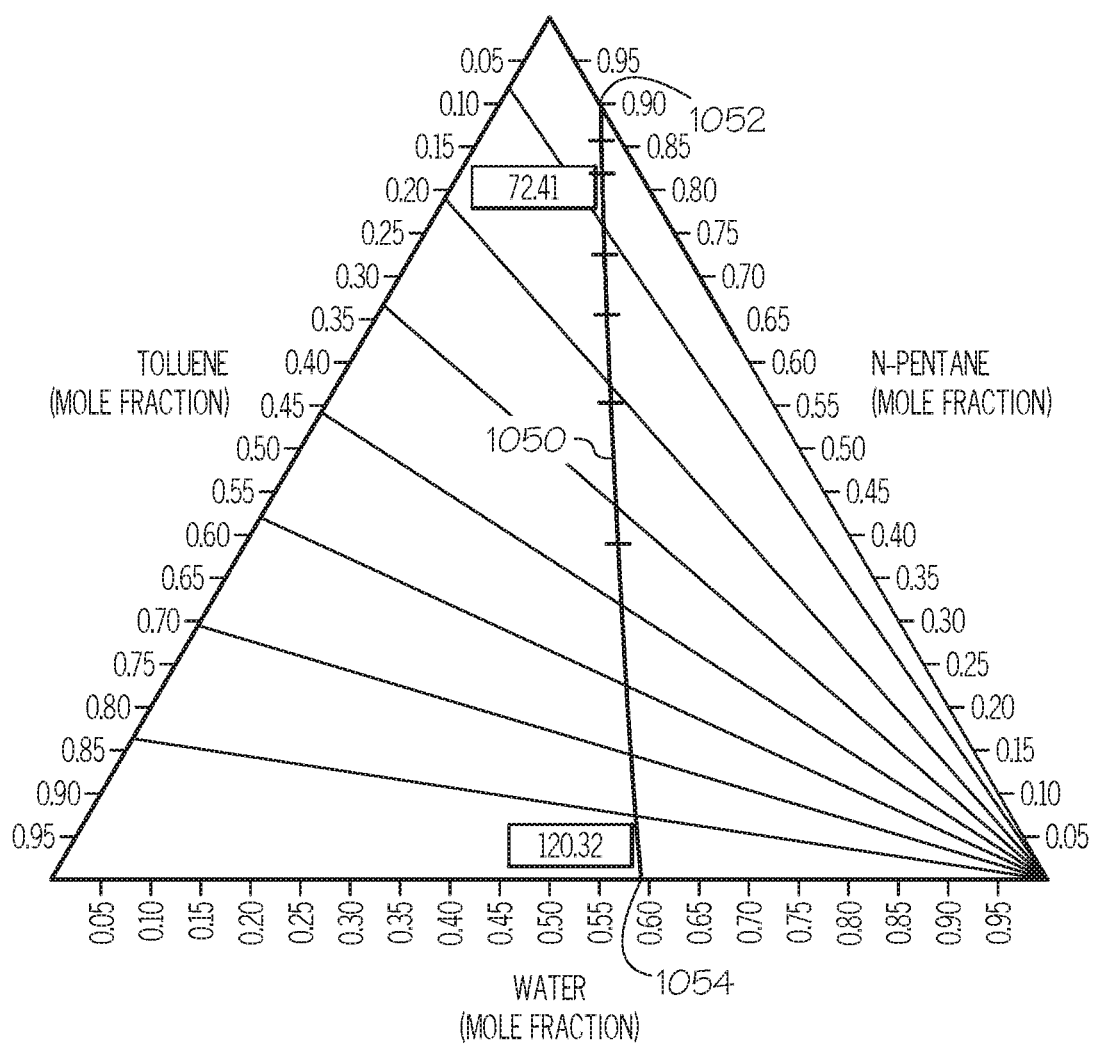
FIG. 6 graphically depicts a phase equilibrium diagram for a ternary hetero-azeotrope of water, toluene, and n-pentane at a pressure of 3.5 bar (350 kPa), according to one or more embodiments described in this disclosure.

Referring to FIG. 6, a ternary hetero-azeotrope may be formed from the combination of water with toluene and n-pentane as the entrainers. At 3.5 bar (350 kPa), the first hetero-azeotrope boiling temperature of the first hetero-azeotrope comprising water and n-pentane occurs at 72.41° C. at point 1052 in FIG. 6, and the second hetero-azeotrope boiling temperature of the second hetero-azeotrope comprising water and toluene occurs at 120.32° C. at point 1054. In FIG. 6, the line 1050 between point 1052 and point 1054 represents the range of the ternary hetero-azeotrope compositions of water, toluene, and n-pentane having ternary hetero-azeotrope boiling temperatures between the first hetero-azeotrope boiling temperature and the second hetero-azeotrope boiling temperature. With a ternary hetero-azeotrope formed from water, toluene, and n-pentane, the distillation temperature may be varied within a range of from 72.41° C. to 120.32° C. at 350 kPa. Although described in relation to water/benzene/toluene, water/benzene/n-pentane, and water/toluene/n-pentane ternary hetero-azeotropes, it is understood that other combinations of entrainers may provide a ternary hetero-azeotrope with the aqueous composition and the present disclosure is not intended to be limited to the specific ternary hetero-azeotrope combinations specifically recited.

The hetero-azeotrope mixture 122 may be formed by combining the aqueous composition 102 with the entrainers 120. In some embodiments, the aqueous composition 102 may be combined with the entrainers 120 to form the hetero-azeotrope mixture 122 in the distillation system 110. Referring to FIG. 1, the aqueous composition 102 may be combined with the entrainers 120 in the distillation vessel 112 of the distillation system 110. As shown in FIG. 1, the distillation vessel 112 of the distillation system 110 may include an aqueous composition inlet 126 and a make-up entrainer inlet 128. The aqueous composition 102 may be supplied to the distillation vessel 112 through the aqueous composition inlet 126. The entrainers 120 may also be provided to the distillation vessel 112 by entrainer recycle stream 148, which recycles the entrainers 120 from the condensate receiver 140, with additional make-up entrainer 121 added from the make-up entrainer inlet 128. The hetero-azeotrope mixture 122 may be a multi-phase mixture in the distillation vessel 112 of the distillation system. Alternatively or additionally, the aqueous composition 102 and the entrainer 120 may be combined to form the hetero-azeotrope mixture 122 upstream of the distillation system 110, such as in a pre-mix vessel (not shown) or other preliminary process, such as the feedstream crystallizer 312, which will be described subsequently in this disclosure in reference to FIG. 10.

Referring again to FIG. 1, desalinated water may be separated from the hetero-azeotrope mixture 122 through hetero-azeotropic distillation in the distillation system 110. The hetero-azeotrope mixture 122 may be subjected to distillation in the distillation system 110, which results in separation of the hetero-azeotrope mixture 122 into the multi-phase condensate 132 and the distillation bottoms liquid 124. As previously discussed, the hetero-azeotrope mixture 122 may have a hetero-azeotrope boiling temperature which is a fixed physical constant at a given pressure based on the composition of the hetero-azeotrope mixture 122, such as the type of entrainer(s) 120 used or the proportions of components of a ternary hetero-azeotrope. The hetero-azeotrope mixture 122 may be subjected to distillation at a distillation temperature equal to the hetero-azeotrope boiling temperature of the hetero-azeotrope mixture 122 at the operating distillation pressure. The hetero-azeotrope mixture 122 may be subjected to distillation at a distillation temperature that is less than or equal to the boiling temperature of the aqueous composition 102 (without the entrainer) at the operating distillation pressure of the distillation system 110. The hetero-azeotrope mixture 122 may be subjected to distillation at a distillation temperature of less than or equal to 100° C., less than or equal to 95° C., less than or equal to 90° C., less than or equal to 85° C., or even less than or equal to 80° C. at the operating distillation pressure. In some embodiments, the hetero-azeotrope mixture 122 may be subjected to hetero-azeotropic distillation at a distillation temperature of from 40° C. to 100° C., from 50° C. to 95° C., from 50° C. to 90° C., from 50° C. to 85° C., from 50° C. to 80° C., from 60° C. to 95° C., from 60° C. to 90° C., from 60° C. to 85° C., or from 60° C. to 80° C. at the operating distillation pressure. The distillation temperature may vary depending on the operating distillation pressure of the distillation system 110.

The distillation of the hetero-azeotrope mixture 122 may be carried out at an operating distillation pressure sufficient for use in the oil and gas industry. The operating distillation pressure at which the hetero-azeotrope mixture 122 is subjected to distillation may be from 100 kPa (1 bar) to 1000 kPa (10 bar), or from 350 kPa (3.5 bar) to 1000 kPa (10 bar). The operating distillation pressure may be adjusted to increase or decrease the hetero-azeotrope temperature and hetero-azeotrope composition of the hetero-azeotrope mixture 122. For instance, the distillation temperature may be increased or decreased by increasing or decreasing the operating distillation pressure of the distillation system 110. Increasing or decreasing the operating distillation pressure may also modify the hetero-azeotrope composition of the hetero-azeotrope mixture 122, such as modifying the mass fraction of water in the vapor phase. As discussed in relation to FIG. 4B, increasing the operating distillation pressure may increase the hetero-azeotrope boiling temperature and may also increase the mass fraction of water in the vapor phase during distillation. The distillation temperature may also be increased or decreased through selection of the entrainer 120.

The distillation system 110 for subjecting the hetero-azeotrope mixture 122 to hetero-azeotropic distillation may include a distillation vessel 112, a heat source 116 in thermal communication with the distillation vessel 112, and a condenser 130 in fluid communication with a vapor space 114 of the distillation vessel 112. The distillation vessel 112 may be a pressure-vessel capable of withstanding the operating distillation pressures within the operating range of the distillation system 110, such as operating distillation pressures of from 100 kPa to 1000 kPa. In some aspects, the distillation vessel 112 may be a flash pot fluidly coupled to the condenser 130. In some aspects, the distillation vessel 112 may include a demister (not shown). The demister may be used to reduce or prevent droplets of the liquid hetero-azeotrope mixture 122, which may include the salts and other contaminants, from propagating through the distillation system 110 to the condenser 130 to reduce or prevent passage of the salt and other contaminants through into the condensate receiver 140 and potentially contaminating the desalinated water produced.

Figure 7:
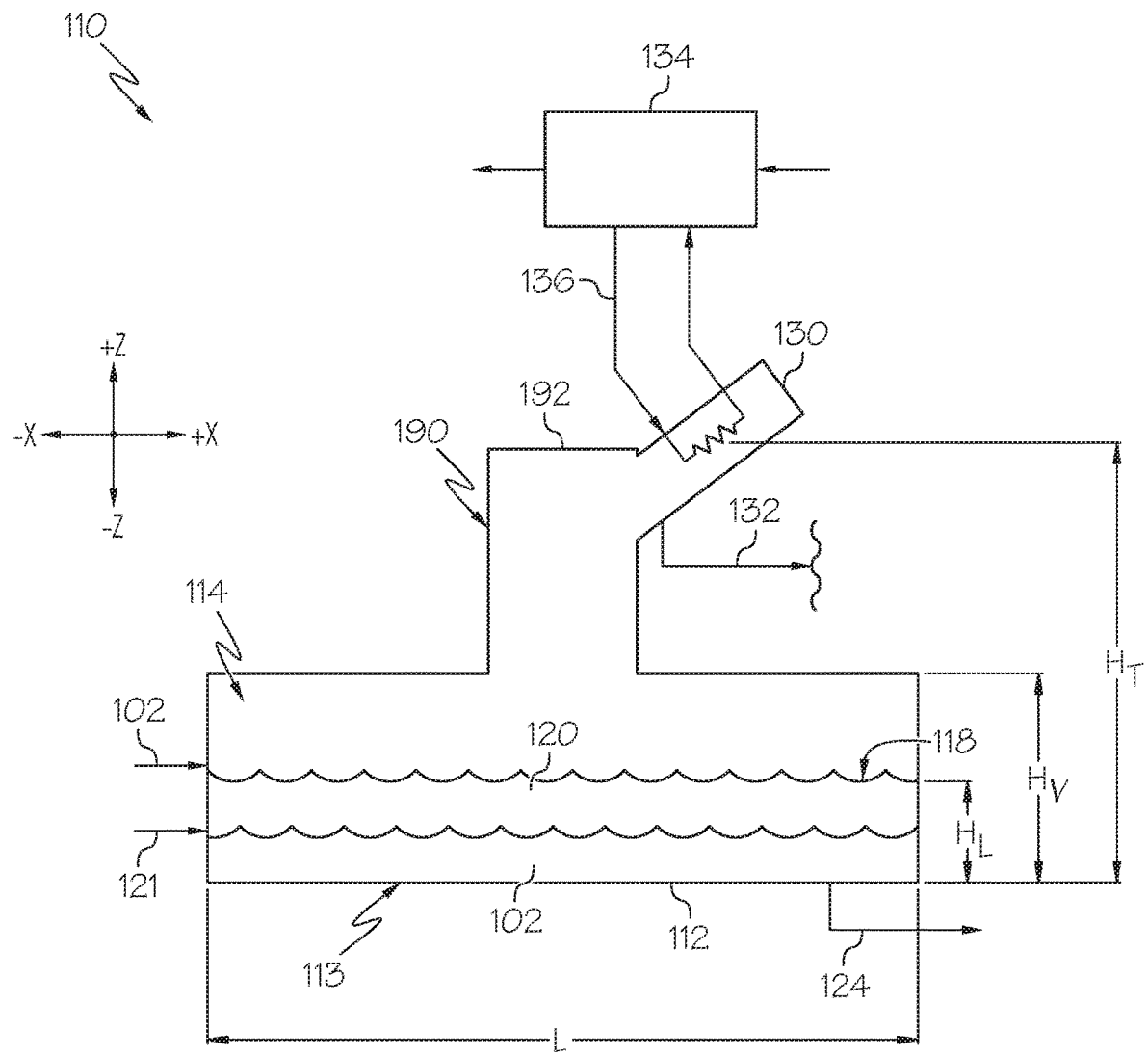
FIG. 7 schematically depicts a distillation system of the system of FIG. 1, according to one or more embodiments described in this disclosure.

Referring to FIG. 7, the distillation system 110 may include the distillation vessel 112 and at least one short-path distillation column 190 in fluid communication with the vapor space 114 of the distillation vessel 112. The distillation vessel 112 may have a vessel length L, which may be a distance measured in the +/−X direction of the coordinate axis of FIG. 7, and a vessel height $H_V$, which may be a dimension of the distillation vessel 112 measured in the +/−Z direction of the coordinate axis of FIG. 7. In some embodiments, the distillation vessel 112 may be cylindrical in shape so that the vessel height $H_V$ may be a diameter of the distillation vessel 112. The distillation vessel 112 may have an aspect ratio defined as the vessel length L divided by the vessel height $H_V$. The distillation vessel 112 may have an aspect ratio $L/H_V$ of from 2 to 5, from 2 to 4.5, from 2 to 4, from 2 to 3.5, from 2.5 to 5, from 2.5 to 4.5, from 2.5 to 4, or even from 2.5 to 3.5.

As previously discussed, the distillation system 110 may include at least one short-path distillation column 190 in fluid communication with the vapor space 114 of the distillation vessel 112. The distillation system 110 may include a single short-path distillation column 190. Although schematically depicted in FIG. 7 as having a single short-path distillation column 190, the distillation system 110 may also include a plurality of short-path distillation columns 190 arranged in parallel, where each of the short-path distillation columns 190 may be in fluid communication with the vapor space 114 of the distillation vessel 112. For instance, the distillation system 110 may include 2, 3, 4, or more than 4 short-path distillation columns 190 in fluid communication with the distillation vessel 112.

Each of the short-path distillation columns 190 may have a number of theoretical stages of from 1 to 5, such as from 1 to 4, from 1 to 3, from 2 to 5, from 2 to 4, from 2 to 3, from 3 to 5, or from 3 to 4. Short-path distillation may be utilized to distill thermally unstable compounds at increased temperature and reduced pressure or to purify very small amounts of chemicals. Short-path distillation may be characterized by a reduced distance that the distillate must travel before condensing at the condenser 130 compared to conventional distillation. In other words, the short-path distillation column 190 may have a reduced distance between ebullition of the hetero-azeotrope mixture 122 and the condensation of the vapor phase at the condenser 130 compared to conventional distillation processes. Reducing the distance between ebullition of the liquid and condensation of the hetero-azeotrope vapor phase may reduce the energy load associated with transferring the hetero-azeotrope vapor phase from the distillation vessel 112 to the condenser 130.

Assuming the condenser 130 is positioned at the top 192 of the short path distillation column 190, the distance that the distillate travels before condensing can be described in terms of a short-path ratio ($H_L:H_T$), which can be defined as a ratio of a height ($H_L$) of a vapor-liquid interface 118 from the bottom 113 of the distillation vessel 112 to a total height ($H_T$) of the short-path distillation column 190, which is measured between the bottom 113 of the distillation vessel 112 and the top 192 of the distillation column 190. The short-path distillation column 190 may have a short-path ratio sufficient to reduce the energy associated with transferring the vapor phase to the condenser 130 and into the condensate receiver 140 (FIG. 1). In some embodiments, the short-path distillation column 190 may have a short-path ratio ($H_L/H_T$) of from 0.2 to 0.5, from 0.2 to 0.45, from 0.2 to 0.4, from 0.25 to 0.5, from 0.25 to 0.45, from 0.25 to 0.4, from 0.3 to 0.5, from 0.3 to 0.45, or from 0.3 to 0.4.

As previously discussed, the distillation vessel 112 of the distillation system 110 may be in thermal communication with a heat source 116 (FIG. 1). The heat source 116 may include waste heat from petroleum drilling, production, or refining operations. In petroleum drilling, production, and refining operations, waste heat may be readily available and may provide a reduced-cost source of energy for heating the hetero-azeotrope mixture 122 in the distillation system 110. Additionally or alternatively, the heat source 116 may include a heat pump to further raise the temperature of the heat source 116 to a temperature sufficient to heat the hetero-azeotrope mixture 122 to the hetero-azeotrope boiling temperature. The heat source 116 may also include heat from other reduced cost heat sources, such as solar or geothermal heat. For example, in some embodiments, the method for desalinating an aqueous stream of the present disclosure may be used to desalinate seawater at a location distant from any petroleum drilling, production, or refining facilities. In these embodiments, solar or geothermal heat sources may be utilized to provide heat to the distillation system 110.

As shown in FIG. 7, the condenser 130 may be in fluid communication with the short-path distillation column 190. The condenser 130 may be cooled to reduce the temperature of the hetero-azeotrope vapor, which may cause the hetero-azeotrope vapor to condense. The condenser 130 may be in thermal communication with a condenser heat exchanger 134, which may be operable to provide a cooling fluid 136 to the condenser 130. The condenser heat exchanger 134 may be configured to recover heat from the cooling fluid returned from the condenser 130. The condenser 130 may be cooled by passing cooling water, such as municipal water, well water, seawater, the incoming aqueous composition 102, or other process water through the condenser 130. In the condenser 130, the hetero-azeotrope vapor may be cooled to condense the hetero-azeotrope vapor to produce the multi-phase condensate 132. The condenser 130 may cool the hetero-azeotrope vapor to a temperature that is less than or equal to the hetero-azeotrope boiling temperature of the hetero-azeotrope mixture 122.

Figure 8A:
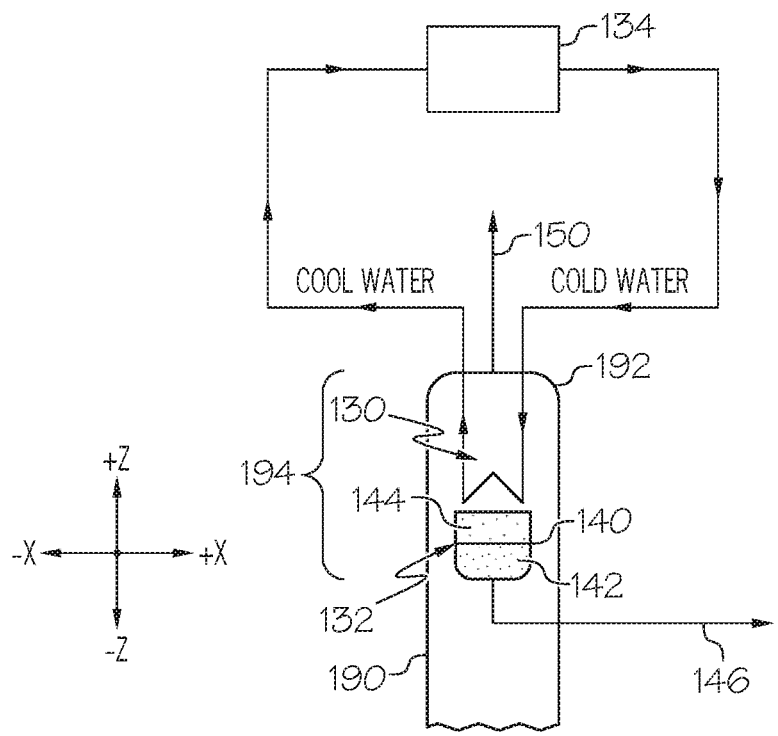
FIG. 8A schematically depicts an embodiment of a configuration of a condenser and a condensate receiver relative to a distillation column of the system of FIG. 1, according to one or more embodiments described in this disclosure.

Although not shown in FIG. 7, the condensate receiver 140 (FIG. 1) may be in fluid communication with the condenser 130 and may be configured to receive the multi-phase condensate 132 from the condenser 130. Referring to FIGS. 8A-8D, many configurations or arrangements may be available for positioning the condenser 130 and condensate receiver 140 relative to the short-path distillation column 190. Referring to FIG. 8A, the condenser 130 may be disposed inside of an uppermost portion 194 of the short-path distillation column 190, which may be the end of the short-path distillation column 190 proximate the top 192. In these configurations, the condensate receiver 140 may be positioned within the short-path distillation column 190 and directly below the condenser 130. In operation, hetero-azeotrope vapor may be condensed by the condenser 130 and the multi-phase condensate 132 may flow downward (in the −Z direction of the coordinate axis of FIG. 8A) to the condensate receiver 140. The aqueous phase 142 of the multi-phase condensate 132 may collect in the bottom of the condensate receiver 140, and at least a portion of the aqueous phase 142, which includes the desalinated water, may be removed from the condensate receiver 140 through desalinated water stream 146. In FIG. 8A, the condensate receiver 140 may be open-topped or may have one or more weirs so that the entrainer-rich phase 144 on top of the aqueous phase 142 can overflow the condensate receiver 140 to be refluxed back to the short-path distillation column 190.

Figure 8B:
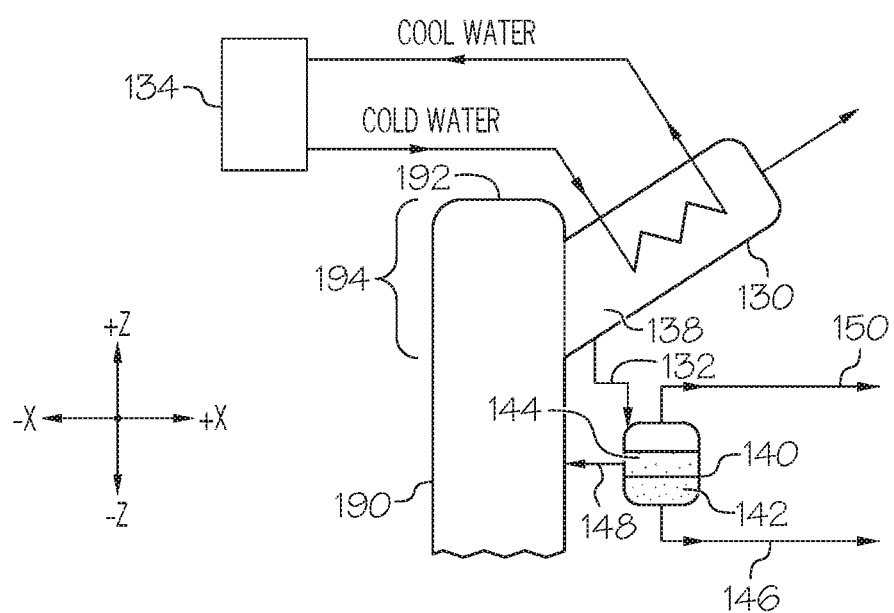
FIG. 8B schematically depicts another embodiment of a configuration of a condenser and a condensate receiver relative to a distillation column of the system of FIG. 1, according to one or more embodiments described in this disclosure.

Referring now to FIG. 8B, the condenser 130 may extend upward at an angle from the uppermost portion 194 of the short-path distillation column 190. In these arrangements, the condensate receiver 140 may be positioned outside of the short-path distillation column 190 and in fluid communication with a lowermost end 138 of the condenser 130 so that the multi-phase condensate 132 flows downward along the walls of the condenser 130 and collects in the condensate receiver 140. The lowermost end 138 of the condenser 130 may be proximate the short-path distillation column 190. As shown in FIG. 8B, a portion of the aqueous phase 142 may be removed from the condensate receiver 140 in the desalinated water stream 146. At least a portion of the entrainer-rich phase 144 may be refluxed back to the short-path distillation column 190 through the entrainer recycle stream 148. In some instances, all of the entrainer-rich phase 144 may be refluxed back to the short-path distillation column 190.

Figure 8C:
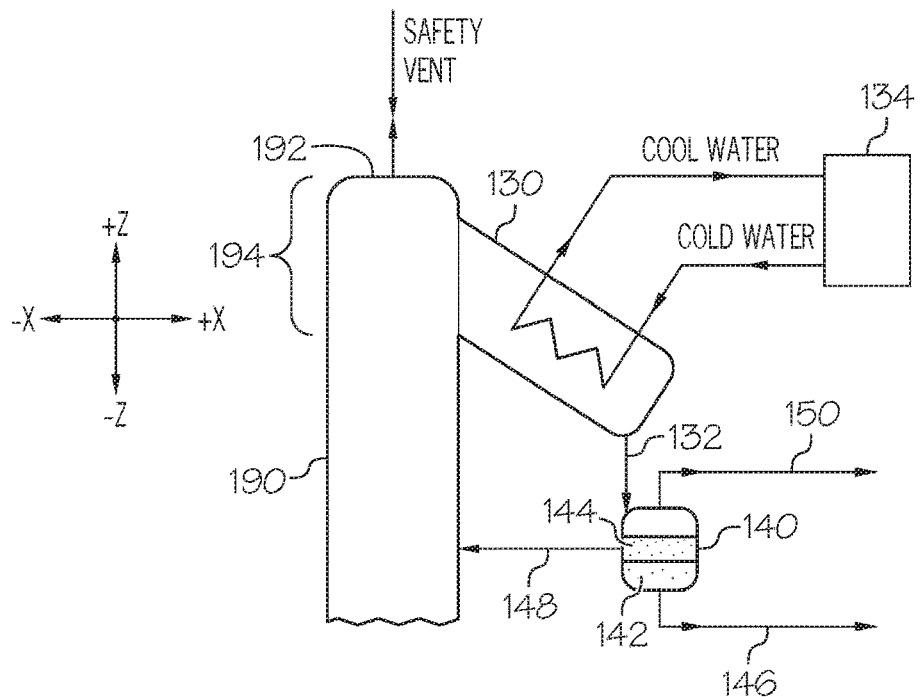
FIG. 8C schematically depicts yet another embodiment of a configuration of a condenser and a condensate receiver relative to a distillation column of the system of FIG. 1, according to one or more embodiments described in this disclosure.

Referring to FIG. 8C, the condenser 130 may extend downward at an angle from the uppermost portion 194 of the short-path distillation column 190. In these configurations, the lowermost end 138 of the condenser 130 may be positioned away from the short-path distillation column 190. The condensate receiver 140 may be positioned outside of the short-path distillation column 190 and in fluid communication with a lowermost end 138 of the condenser 130 so that the multi-phase condensate 132 flows downward along the walls of the condenser 130 and collects in the condensate receiver 140. As shown in FIG. 8C, the aqueous phase 142 may be removed from the condensate receiver 140 in the desalinated water stream 146. At least a portion of the entrainer-rich phase 144 may be refluxed back to the short-path distillation column 190 through the entrainer recycle stream 148.

Figure 8D:
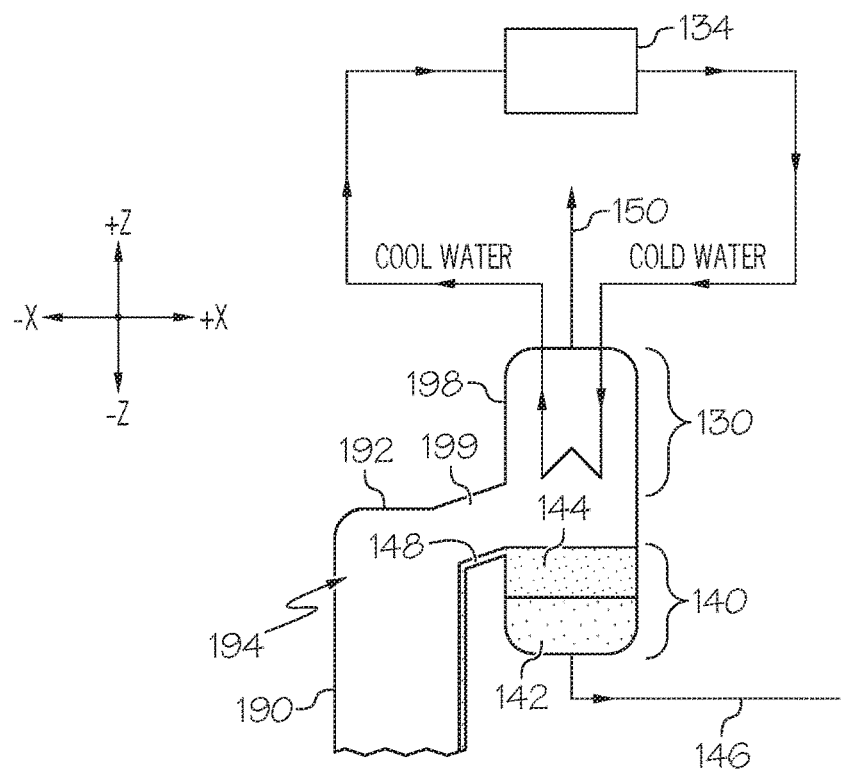
FIG. 8D schematically depicts still another embodiment of a configuration of a condenser and a condensate receiver relative to a distillation column of the system of FIG. 1, according to one or more embodiments described in this disclosure.

Referring now to FIG. 8D, the condenser 130 and condensate receiver 140 may be integrated into a single condenser vessel 198 fluidly coupled to the uppermost portion 194 of the short-path distillation column 190 by a channel 199. The condenser 130 may be disposed within the condenser vessel 198 and positioned above (in the +Z direction of the coordinate axis of FIG. 8D) the channel 199, and the condensate receiver 140 may be positioned below the channel 199 (in the –Z direction of the coordinate axis of FIG. 8D). The channel 199 may extend directly from the short-path distillation column 190 to the condenser vessel 198 and may have a length of less than 1 meter (m), such as less than 0.5 m, less than 0.4 m, less than 0.3 m, less than 0.2 m, less than 0.1 m, or even less than 0.05 m. As shown in FIG. 8D, the aqueous phase 142 may be removed from the condensate receiver 140 in the desalinated water stream 146. At least a portion of the entrainer-rich phase 144 may be refluxed back to the short-path distillation column 190 by overflowing from the condensate receiver 140 into the channel 199, flowing through the channel 199, and passing back into the short-path distillation column 190. Other configurations and arrangements of the condenser 130 and condensate receiver 140 are contemplated by this disclosure.

Referring again to FIG. 1, the condenser 130 may condense the hetero-azeotrope vapor into a multi-phase condensate 132. The multi-phase condensate 132 may be collected in the condensate receiver 140, in which the multi-phase condensate 132 may separate into at least two distinct phases, which at least includes the aqueous phase 142 and the entrainer-rich phase 144. The aqueous phase 142 may include desalinated water. The desalinated water in the aqueous phase 142 may have a salinity of less than 1 g/L based on the total volume of the aqueous phase 142, such as less than 0.5 g/L, less than 0.1 g/L, less than 0.01 g/L, or even less than 0.001 g/L based on the total volume of the aqueous phase 142. In some embodiments, the desalinated water in the aqueous phase 142 may be free of salts. The aqueous phase 142 may include some organic compounds, such as small quantities (less than 5 wt. %) of the entrainers or other organic compounds from the aqueous composition 102 that are condensed in the condenser 130 and may be at least partially soluble in the aqueous phase 142. For instance, the aqueous phase 142 may have less than 20 wt. %, less than 10 wt. %, or even less than 1 wt. % organic compounds based on the total weight of the aqueous phase 142.

The entrainer-rich phase 144 may include the entrainer 120 condensed in the condenser 130. The entrainer-rich phase 144 may also include small concentrations of other organic compounds from the aqueous composition 102 that condense in the condenser 130. The aqueous phase 142 and the entrainer-rich phase 144 may be immiscible so that they separate into at least two distinct liquid phases in the condensate receiver 140. In some embodiments, the aqueous phase 142 may have a greater density than the entrainer-rich phase 144, which may cause the aqueous phase 142 to sink to the bottom of the condensate receiver 140 and the entrainer-rich phase 144 to float on top of the aqueous phase 142. Although FIG. 1 shows the aqueous phase 142 as having a greater density than the entrainer-rich phase 144, in some embodiments, the entrainer-rich phase 144 may have a greater density than the aqueous phase 142 and may settle to the bottom of the condensate receiver 140 with the aqueous phase 142 floating on top of the entrainer-rich phase 144. The density of the entrainer-rich phase 144 relative to the aqueous phase 142 may depend on the density of the entrainer 120 introduced to form the hetero-azeotrope mixture 122.

Referring again to FIG. 1, as previously discussed, the condensate receiver 140 may include a separation system to separate the aqueous phase 142 and the entrainer-rich phase 144 from the multi-phase condensate 132. The aqueous phase 142, the entrainer-rich phase 144, or both may be separated from the multi-phase condensate 132. For example, the aqueous phase 142 may be separated from the multi-phase condensate 132 by withdrawing at least a portion of the aqueous phase 142 out of the condensate receiver 140 as desalinated water stream 146. The entrainer-rich phase 144 may be separated from the multi-phase condensate 132 by withdrawing at least a portion of the entrainer-rich phase 144 from the condensate receiver as the entrainer recycle stream 148. In some embodiments, the aqueous phase 142, the entrainer-rich phase 144, or both may be separated from the multi-phase condensate 132 by decantation. Other separation processes may also be utilized to separate the aqueous phase 142 or entrainer-rich phase 144 from the multi-phase condensate 132.

The separation system may include a level control system 152 operable to control the level of the aqueous phase 142, the entrainer-rich phase 144, or both in the condensate receiver 140. The level control system 152 may include a level sensor (not shown) and one or more control valves (not shown) to control the flowrates of the desalinated water stream 146, the entrainer recycle stream 148, or both to maintain the levels of liquid phases within the condensate receiver 140. The level control system 152 may be operable to control the level of the aqueous phase 142 in the condensate receiver 140 in order to maintain a thin layer of the entrainer-rich phase 144 on top of the aqueous phase 142. Alternatively or additionally, the level control system 152 may be operable to control a withdrawal rate of the aqueous phase 142 from the multi-phase condensate 132 in the condensate receiver 140. The condensate receiver 140 may also include a vent or vapor outlet for venting desorbed gases 150 from the condensate receiver 140.

Referring still to FIG. 1, the aqueous phase 142 may be withdrawn from the condensate receiver 140 through desalinated water stream 146. The desalinated water of the desalinated water stream 146 may be directed to other processes without any further treatment or purification. For instance, the desalinated water of the desalinated water stream 146 may be used as wash water for desalting crude oil without any further treatment.

The desalinated water stream 146 may be subjected to a further water treatment process downstream of the condensate receiver 140 to remove organic materials and other contaminants from the desalinated water stream 146. As shown in FIG. 1, the desalinated water stream 146 may be passed to a water treatment process 180, which may be operable to remove one or more than one contaminants from the desalinated water stream 146 to produce purified desalinated water 182. The water treatment process 180 may include, but is not limited to, reverse osmosis, adsorption on activated carbon or other adsorbent, chemical treatment, nano-filtration, other water treatment process, or combinations of these treatment processes. In some embodiments, the method for desalinating an aqueous composition may include contacting the desalinated water stream 146 with activated carbon. The water treatment process 180 may remove organic compounds from the desalinated water stream 146 to purify and polish the desalinated water stream 146 to produce the purified desalinated water 182. The purified desalinated water 182 from the water treatment process 180 may be suitable for anthropological or agricultural use, such as by meeting water purity standards for anthropological or agricultural use.

As previously discussed, the entrainer-rich phase 144 may be recycled back to the distillation system 110 to provide at least a portion of the entrainer of the hetero-azeotrope mixture 122. The entrainer-rich phase 144 may be recycled back to the distillation system 110 through entrainer recycle stream 148. The entrainer-rich phase 144 may be withdrawn from the condensate receiver 140 as the entrainer recycle stream 148. The entrainer recycle stream 148 may be refluxed back to the short-path distillation column 190 of the distillation system 110, as shown in FIGS. 8A-8D. Alternatively or additionally, all or a portion of the entrainer recycle stream 148 may be passed back to the distillation vessel 112 of the distillation system 110 or to a pre-mix tank (not shown) upstream of the distillation vessel 112 to be combined with the aqueous composition 102 to form the hetero-azeotrope mixture 122, as shown in FIG. 1.

Some of the entrainer from the multi-phase condensate 132 may be lost from the system 100 through the desalinated water stream 146 or from the vent for removing desorbed gases 150 or other organic compounds having a boiling temperature less than the hetero-azeotrope boiling temperature of the hetero-azeotrope mixture 122. Although the entrainer may be considered immiscible with water, the entrainer may have very low solubility in water, which may result in small amounts (less than 20 g/100 g water, less than 10 g/100 g water, or even less than 1 g/100 g water) of the entrainer being present in the aqueous phase 142. As a result, these small amounts of entrainer 120 may be lost from the system 100 through the desalinated water stream 146, which is passed out of the system 100. Small amounts of entrainer 120 may also be passed out of the system 100 through the distillation bottoms liquid 124, which will be described subsequently in this disclosure. To compensate, the distillation system 110 may include a make-up entrainer stream 121, which may be operable to introduce the entrainer 120 to the distillation vessel 112 to make up for the entrainer lost through the desalinated water stream 146 or distillation bottoms liquid 124.

Referring again to FIG. 1, the distillation system 110 may also produce a distillation bottom liquid 124, which may include a mixture of water and salts and may have salinity greater than the salinity of the aqueous composition 102. The distillation bottoms liquid 124 may also include organic compounds, such as a small portion of the entrainer 120 that dissolves in the 102 in the distillation vessel 112, oil droplets, organic contaminants from the aqueous composition 102, other organic compounds, or combinations of these. The distillation bottoms liquid 124 may also include suspended solids, such as sand or rust particles, and the inorganic contaminants from the aqueous composition 102, which have been described previously in this disclosure. The distillation bottoms liquid 124 may have a salinity of greater than or equal to 30 g/L, such as greater than or equal to 50 g/L, greater than or equal to 100 g/L, greater than or equal to 150 g/L, or even greater than or equal to 200 g/L. In some embodiments, the distillation bottoms liquid 124 may have salinity of from 30 g/L to 500 g/L, from 50 g/L to 500 g/L, from 50 g/L to 400 g/L, from 50 g/L to 300 g/L, from 100 g/L to 500 g/L, from 100 g/L to 400 g/L, from 100 g/L to 300 g/L, from 150 g/L to 500 g/L, from 150 g/L to 400 g/L, from 200 g/L to 500 g/L, from 200 g/L to 400 g/L, or from 200 g/L to 300 g/L.

Referring again to FIG. 1, the distillation bottoms liquid 124 may be withdrawn from the distillation vessel 112 of the distillation system 110. The distillation bottoms liquid 124 may be further processed downstream of the distillation system 110. The distillation bottoms liquid 124 may be passed to a crystallization process 160, which may be operable to separate at least a portion of the salt from the distillation bottoms liquid 124 to produce a salt product 170 and a brine composition 172 having salinity less than the distillation bottoms liquid 124. For example, when the salinity of the distillation bottoms liquid 124 is greater than 150 g/L or even greater than or equal to 200 g/L, the distillation bottoms liquid 124 may be passed to the crystallization process 160 for separating salt from the distillation bottoms liquid 124 to reduce the salinity of the distillation bottoms liquid 124. When the distillation bottoms liquid 124 has a lesser salinity, such as a salinity less than 200 g/L or less than 150 g/L, the distillation bottoms liquid 124 may be passed out of the system 100 without being treated in the crystallization process 160. In some embodiments, the distillation bottoms liquid 124 may be passed through a heat exchanger or heat pump to remove heat from the distillation bottoms liquid 124 prior to passing the distillation bottoms liquid 124 to the crystallization process 160.

The crystallization process 160 may be a cooling effect crystallization process in which crystallization of the salts in the distillation bottoms liquid 124 is accomplished by reducing the temperature of the distillation bottoms liquid 124 to reduce the solubility of the salts in the distillation bottoms liquid 124. The crystallization process 160 may include a crystallizer 161 that may include a cooling jacket 162 or other system from removing heat from the distillation bottoms liquid 124 to reduce the temperature of the distillation bottoms liquid 124, The cooling jacket 162 may be fluidly coupled to a crystallizer heat exchanger 164 which may be operable to remove heat from the cooling fluid returned from the cooling jacket 162. The crystallizer heat exchanger 164 may include a heat pump for removing heat from the cooling fluid. Alternatively or additionally, the crystallizer heat exchanger 164 may include a heat exchanger in which a cooling fluid returned from the cooling jacket 162 is brought into thermal communication with a cold source, such as a secondary cooling fluid having a lesser temperature compared to the primary cooling fluid, to reduce the temperature of the cooling fluid. In some embodiments, the crystallizer 161 may be a double-walled crystallizer and the crystallization process 160 may be cooled using a direct cold source, such as a heat exchanger operating with a cooling fluid in a double-walled crystallizer 161. The crystallization process 160 may separate the distillation bottoms liquid 124 into the salt product 170 and the brine composition 172. The brine composition 172 may be passed out of the system 100. The brine composition 172 may be combined with one or more aqueous streams to form the aqueous composition 102 or at least a portion of the aqueous composition 102 introduced to the system 100.

Figure 9:
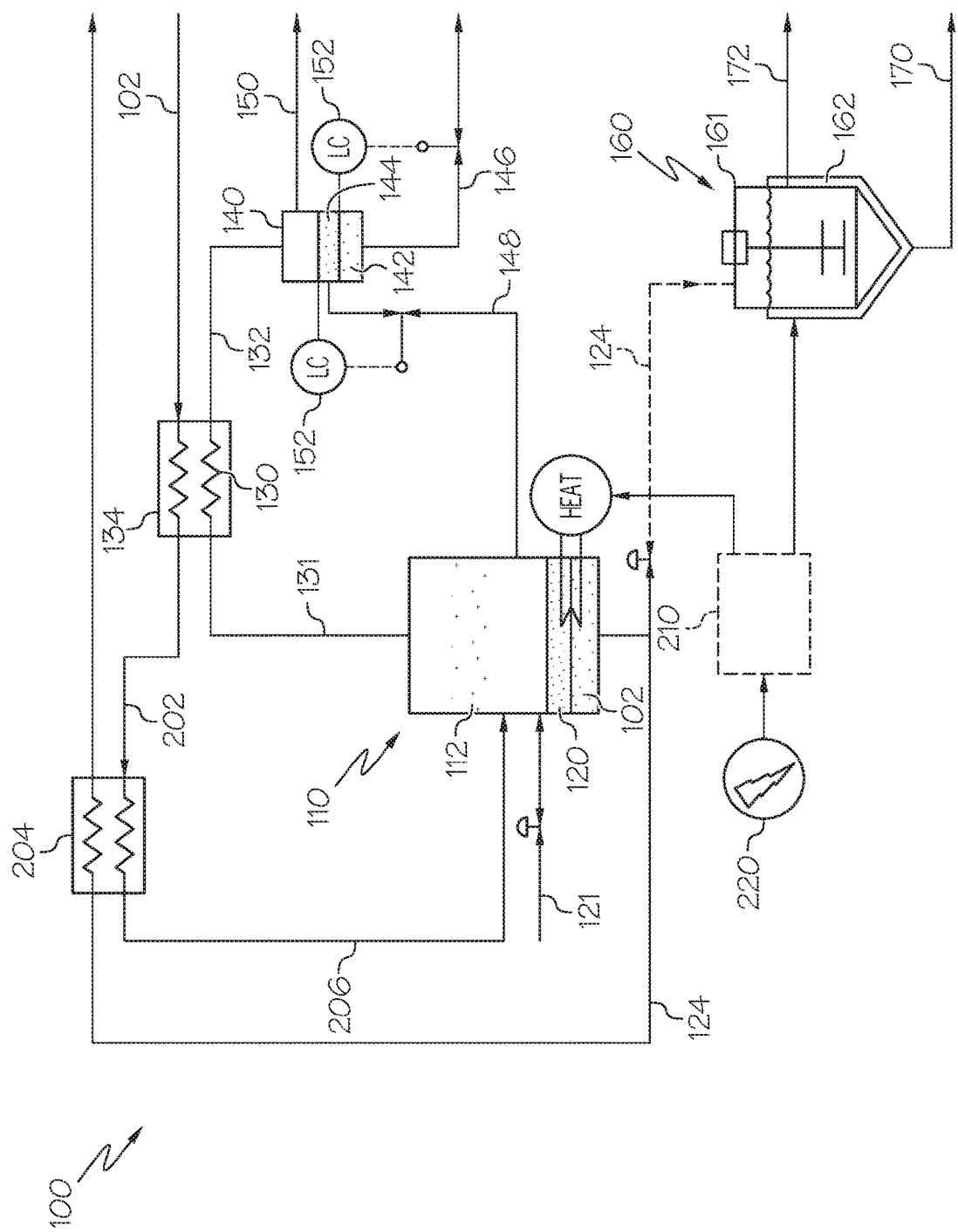
FIG. 9 schematically depicts another embodiment of a system for conducting a process for desalinating an aqueous composition including heat management and recovery from a distillation process of the system, according to one or more embodiments described in this disclosure.

Referring now to FIG. 9, the system 100 may include various heat management systems for heat balancing the system 100 to improve the energy efficiency of the system. For example, the condenser 130 may include the condenser heat exchanger 134, which may be operable to cool and condense the hetero-azeotrope vapors from the distillation vessel 112 using the aqueous composition 102 introduced to the system 100. In operation, the condenser heat exchanger 134 may pass the aqueous composition 102, which is at a temperature less than the hetero-azeotrope boiling temperature, in countercurrent flow relative to the hetero-azeotrope vapors, which are initially at a greater temperature than the hetero-azeotrope boiling temperature. In the condenser heat exchanger 134, heat may be transferred from the hetero-azeotrope vapors to the aqueous composition 102, which increases the temperature of the aqueous composition 102 to produce a first heated aqueous stream. The heat removal from the hetero-azeotrope vapors may reduce the temperature of the hetero-azeotrope vapors, which may cause the vapors to condense to produce the multi-phase condensate 132. Transferring heat to the aqueous composition 102 may recover heat from the distillation system 110, which may be passed back to the distillation system 110 through the first heated aqueous stream 202.

Additional heat from the distillation system 110 may be further recovered from the distillation bottoms liquid 124 by passing the distillation bottoms liquid 124 through heat exchanger 204 in countercurrent flow relative to the first heated aqueous stream 202. In heat exchanger 204, heat may be transferred from the distillation bottoms liquid 124 to the first heated aqueous stream 202 to produce a second heated aqueous stream 206 having a temperature greater than a temperature of the first heated aqueous stream 202. Heat removal from the distillation bottoms liquid 124 may cool the distillation bottoms liquid 124 to a temperature suitable for further processing or disposal of the distillation bottoms liquid 124. The second heated aqueous stream 206 may be passed to the distillation vessel 112. Recovery of heat from the hetero-azeotrope vapors, the distillation bottoms liquid 124, or both may decrease the energy consumption of the distillation system 110, which may increase the overall energy efficiency of the system 100.

As previously discussed, waste heat from petroleum drilling, production, or refining operations may be used to provide a cheap source of energy for operating the distillation system 110. Additionally, as shown in FIG. 9, a heat pump 210 may also be incorporated into the system 100 to recover heat for the distillation system 110 and pass the heat back to the distillation vessel 112. In FIG. 9, the heat pump 210 may operate to remove heat from a cooling fluid passed through the cooling jacket 162 of the crystallizer 161 and transfer the heat to a heating fluid which is passed to the distillation vessel 112 for heating the hetero-azeotrope mixture 122 to the hetero-azeotrope boiling temperature. Supplemental energy 220 may be input to the heat pump 210 to meet the energy demand and account for thermal losses in the system 100. The supplemental energy 220 may include electricity, which may be readily available in most petroleum drilling, production, and refining operations, or other sources of energy, such as solar, wind, geothermal, hydroelectric, or combinations of these. In some embodiments, the supplemental energy 220 may include co-energy sharing between two facilities or with neighboring industries.

When the salinity of the aqueous composition 102 is greater than 200 g/L, the greater concentration of salts of the aqueous composition 102 may disturb or prevent the formation of the hetero-azeotrope and disrupt the hetero-azeotropic distillation carried out in the distillation system 110. Therefore, method of desalinating the aqueous composition 102 may include reducing the salinity of the aqueous composition 102 or the hetero-azeotrope mixture 122 to produce a reduced-salinity hetero-azeotrope mixture and a feedstream salt product. After reducing the salinity of the hetero-azeotrope mixture 122 to produce the reduced-salinity hetero-azeotrope mixture, the method may further include subjecting the reduced-salinity hetero-azeotrope mixture to distillation in the distillation system 110 to produce the desalinated water.

Figure 10:
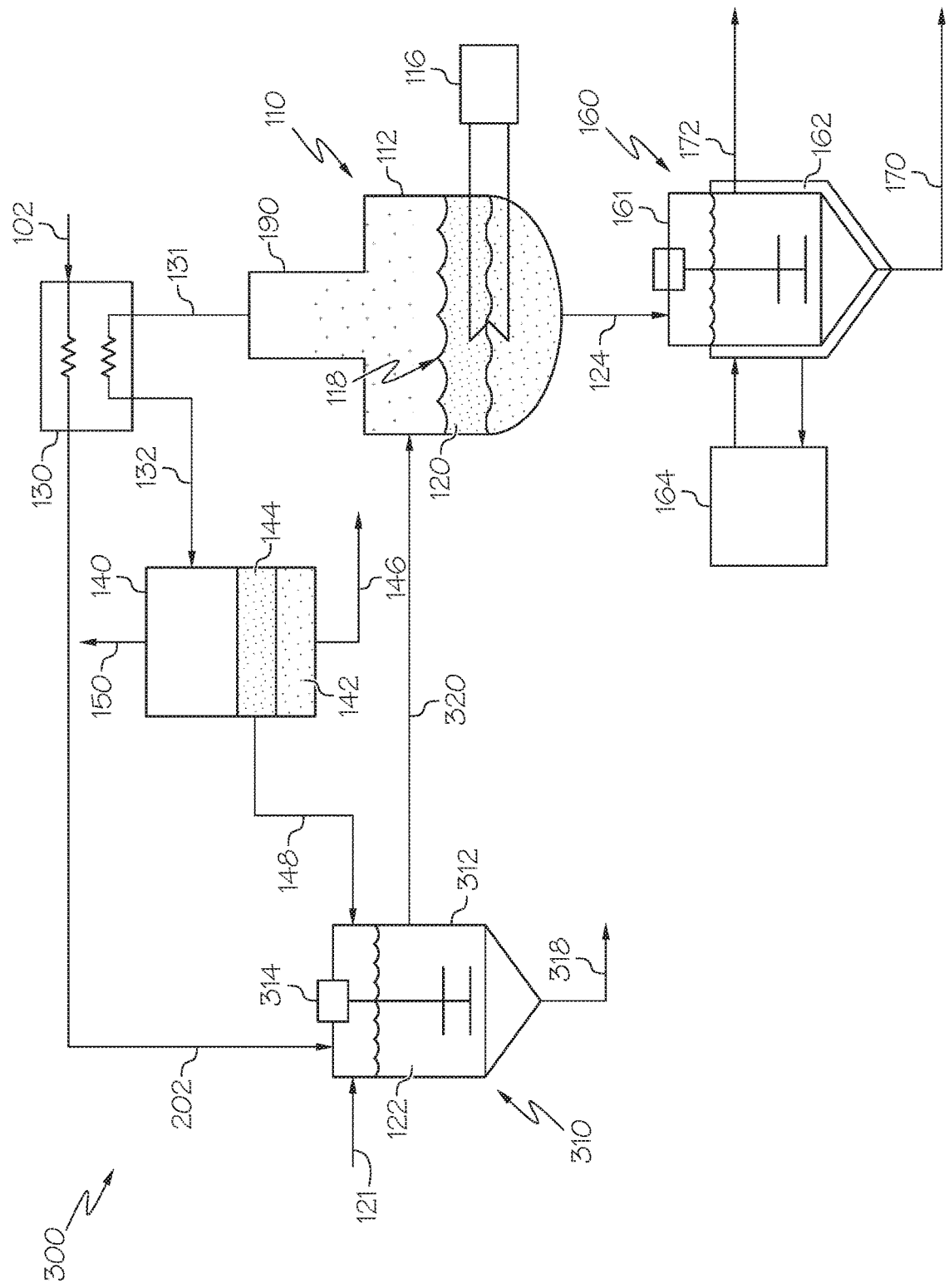
FIG. 10 schematically depicts another embodiment of a system for desalinating an aqueous stream that includes a distillation feedstream crystallization process, according to one or more embodiments described in this disclosure.

Referring now to FIG. 10, a system 300 for desalinating the aqueous composition 102 that has high salinity greater than 200 g/L, may include distillation feedstream crystallization process 310 for removing salt from and reducing the salinity of the hetero-azeotrope mixture 122. The distillation feedstream crystallization process 310 may include a feedstream crystallizer 312 configured to receive the aqueous composition 102 or the first heated aqueous stream 202. The feedstream crystallizer 312 may be configured to receive the entrainer recycle stream 148 from the condensate receiver 140 and to receive the make-up entrainer stream 121. The feedstream crystallizer 312 may be operable to form the hetero-azeotrope mixture 122 by combining the aqueous composition 102 (or first heated aqueous stream 202) and the entrainer, which may be passed to the feedstream crystallizer 312 in the entrainer recycle stream 148, the make-up entrainer stream 121, or both. The feedstream crystallizer 312 may include an agitator 314, which may facilitate combination of the entrainer and the aqueous composition 102 (or first heated aqueous stream 202) to produce the hetero-azeotrope mixture 122.

The distillation feedstream crystallization process 310 may be operable to reduce a salinity of the hetero-azeotrope mixture 122 by crystallizing at least a portion of the salts in the hetero-azeotrope mixture 122 and separating the crystallized salts from the hetero-azeotrope mixture 122 to produce a feedstream salt product 318 and a reduced-salinity hetero-azeotrope mixture 320. In some embodiments, the distillation feedstream crystallization process 310 may be configured to crystallize salts from the hetero-azeotrope mixture 122 through anti-solvent effect crystallization. Antisolvent effect crystallization refers to a process of precipitating salts from a brine solution by introducing an organic solvent that reduces the solubility of the salts in the brine solution. In the distillation feedstream crystallization process 310, the addition of the entrainer (e.g., entrainer recycle stream 148, the make-up entrainer stream 121, or both) to the aqueous composition 102 (or first heated aqueous stream 202) may reduce the solubility of salts in the aqueous composition 102 or first heated aqueous stream 202, which may cause the salts to precipitate in the feedstream crystallizer 312 due to the anti-solvent effect. Alternatively or additionally, the distillation feedstream crystallization process 310 may be operable to reduce the salinity of the hetero-azeotrope mixture 122 through cooling effect crystallization. As previously discussed, cooling effect crystallization relies on reducing the solubility of the salts in the hetero-azeotrope mixture 122 by reducing the temperature of the hetero-azeotrope mixture 122. When cooling effect crystallization is employed, the feedstream crystallizer 312 may include a cooling jacket fluidly coupled to a cooling source for cooling the feedstream crystallizer 312. The distillation feedstream crystallization process 310 may be configured to operate using a combination of anti-solvent effect crystallization and cooling effect crystallization to reduce the salinity of the hetero-azeotrope mixture 122. Other methods and processes may be used in place of or in combination with crystallization to reduce the salinity of the hetero-azeotrope mixture 122 prior to hetero-azeotropic distillation (upstream of the distillation system 110).

The feedstream salt product 318 may include one or a plurality of the salts present in the aqueous composition 102 introduced to the system 300. The feedstream salt product 318 may be further processed downstream of the distillation feedstream crystallization process 310 to remove contaminants, such as organic compounds, residual water, heavy metal contaminants, or other contaminants. The reduced salinity hetero-azeotrope mixture 320 may have a reduced salinity compared to the aqueous composition 102. The reduced salinity hetero-azeotrope mixture 320 may have salinity that does not disrupt or prevent formation of the hetero-azeotrope during distillation in the distillation system 110. For instance, the reduced salinity hetero-azeotrope mixture 320 may have salinity of less than 200 g/L, such as less than 175 g/L, or even less than 150 g/L.

Referring still to FIG. 10, in operation of system 300, the aqueous composition 102 may be passed through the condenser 130 to remove heat from the hetero-azeotrope vapors. Passing the aqueous composition 102 through the condenser 130 may transfer heat into the aqueous composition 102 to produce the first heated aqueous stream 202 having a temperature greater than the temperature of the aqueous composition 102. In some embodiments, the aqueous composition 102 may bypass the condenser 130 and be passed directly to the feedstream crystallizer 312. The first heated aqueous stream 202 may be passed to the feedstream crystallizer 312 of the distillation feedstream crystallization process 310, where the first heated aqueous stream 202 may be combined with the entrainer from the entrainer recycle stream 148, the make-up entrainer stream 121, or both to form the hetero-azeotrope mixture 122. In the feedstream crystallizer 312, the hetero-azeotrope mixture 122 may be subjected to crystallization to remove salt from the hetero-azeotrope mixture 122, thereby decreasing the salinity of the hetero-azeotrope mixture 122 to produce the reduced salinity hetero-azeotrope mixture 320. The crystallized salt may be passed out of the feedstream crystallizer 312 as the feedstream salt product 318. The reduced salinity hetero-azeotrope mixture 320 may be passed from the distillation feedstream crystallization process 310 to the distillation system 110, where the reduced salinity hetero-azeotrope mixture 320 may be subjected to hetero-azeotropic distillation in the distillation system 110 as previously described in relation to FIG. 1.

As shown in FIG. 10, the hetero-azeotrope vapor 131 from the hetero-azeotropic distillation may be passed from the distillation vessel 112 or short-path distillation column 190 to the condenser 130 where the hetero-azeotrope vapor 131 is condensed to form the multi-phase condensate 132. The multi-phase condensate 132 may be passed to the condensate receiver 140, where the multi-phase condensate 132 may be separated into the aqueous phase 142 and the entrainer-rich phase 144. In system 300, at least a portion of the entrainer-rich phase 144 may be passed back to the feedstream crystallizer 312 of the distillation feedstream crystallization process 310 as the entrainer recycle stream 148 to produce the hetero-azeotrope mixture 122. At least a second portion of the entrainer-rich phase 144 may be refluxed back to the distillation system 110. The distillation bottoms liquid 124 may be passed to the crystallization process 160 as previously described in relation to FIG. 1.

Figure 11:
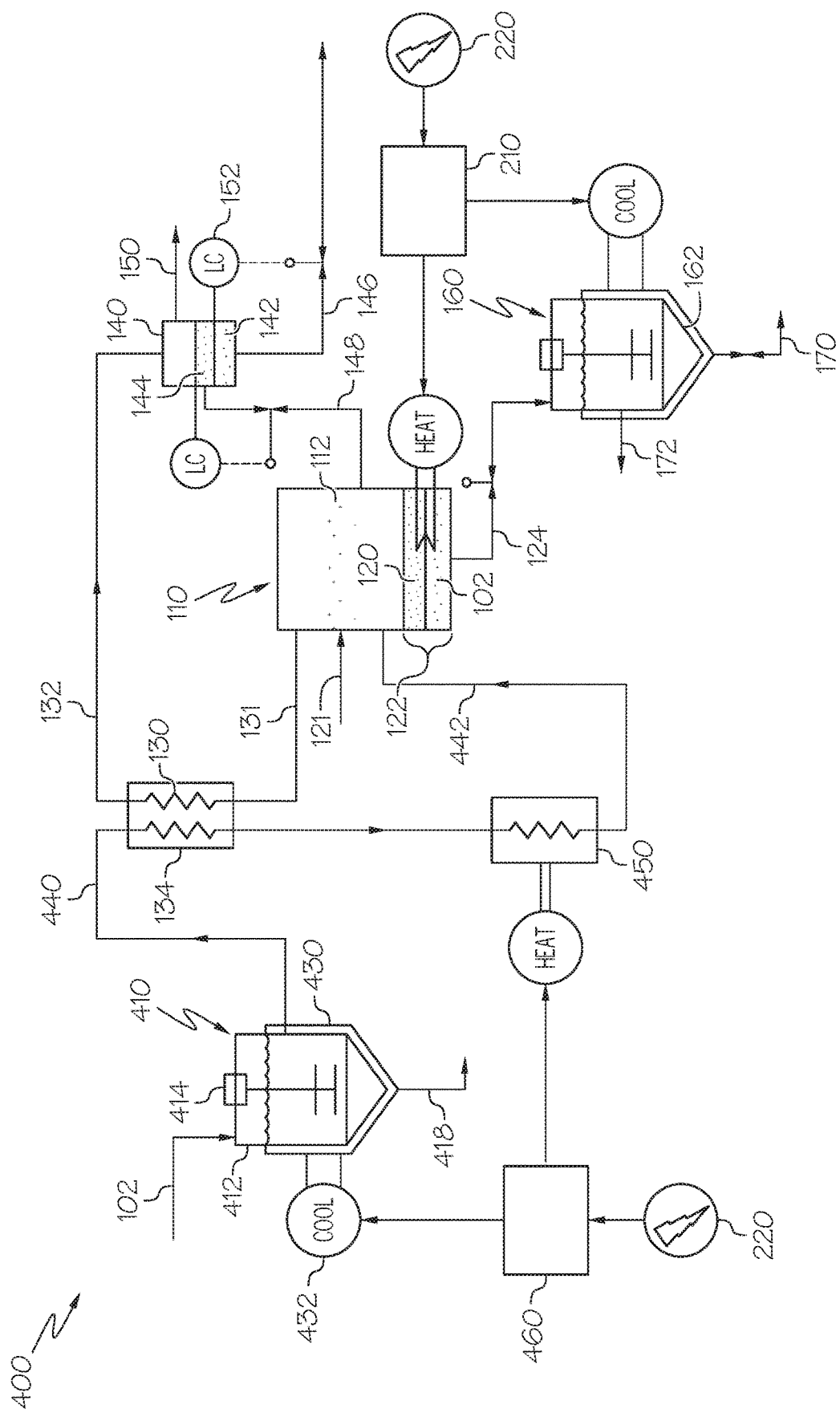
FIG. 11 schematically depicts an embodiment of the system of FIG. 10 including heat management and recovery from a distillation process of the system, according to one or more embodiments described in this disclosure.

Referring to FIG. 11, the method may include reducing a salinity of the aqueous composition 102 prior to combining the aqueous composition 102 with the entrainer 120 to form the hetero-azeotrope mixture 122. The aqueous composition 102 may be passed initially to an aqueous composition crystallization process 410 in which the salinity of the aqueous composition 102 may be reduced by crystallizing salts from the aqueous composition 102 through cooling effect crystallization. The aqueous composition crystallization process 410 may include an aqueous composition crystallizer 412 having an agitator 414 and a cooling jacket 430. The cooling jacket 430 may be in operable communication with a cooling source 432, such as a cooling fluid source, for passing a cooling fluid through the cooling jacket 430. The cooling source 432 may be a heat exchanger, heat pump, cooling fluid source, or combinations of these. Cooling fluid sources may include water sources, such as municipal water, well water, seawater, produced water, process water sources, or other sources of cooling water. In some embodiments, the cooling source 432 may be closed loop cooling circuit. The cooling source 432 may include a heat pump 460 which may be operable to remove heat from a cooling fluid circulated through the cooling jacket 430. In some embodiments, the aqueous composition crystallizer 412 may not be in fluid communication with a make-up entrainer stream. Instead, the make-up entrainer stream may be introduced to the distillation vessel 112 downstream of the aqueous composition crystallization process 410.

The aqueous composition crystallization process 410 may be operable to remove salts from the aqueous composition 102 to produce an aqueous composition salt product 418 and a reduced-salinity aqueous composition 440. The aqueous composition salt product 418 may include one or a plurality of the salts present in the aqueous composition 102 introduced to the system 400. The aqueous composition salt product 418 may be further processed downstream of the aqueous composition crystallization process 410 to remove contaminants, such as organic compounds, residual water, heavy metal contaminants, or other contaminants. In some embodiments, the aqueous composition salt product 418 may be removed and recovered from the system 400.

The reduced-salinity aqueous composition 440 may have a reduced salinity compared to the aqueous composition 102. The reduced-salinity aqueous composition 440 may have salinity that does not disrupt or prevent formation of the hetero-azeotrope during distillation in the distillation system 110. The reduced-salinity aqueous composition 440 may have salinity of less than 200 g/L, such as less than 175 g/L, or even less than 150 g/L. The reduced-salinity aqueous composition 440 may be passed out of the aqueous composition crystallization process 410 and may be passed to the distillation system 110.

The reduced-salinity aqueous composition 440 may be passed through one or more heat exchangers, such as the condenser 130, the heat exchanger 450 coupled to heat pump 460, other heat exchanger, or combinations of heat exchangers, to recover heat from the distillation system 110 and improve the energy efficiency of the system 400. Passing the reduced-salinity aqueous composition 440 through the condenser 130, heat exchanger 450, other heat exchanger, or combinations of these may increase the temperature of the reduced-salinity aqueous composition 440 to produce a heated reduced-salinity aqueous composition 442, which may then be passed to the distillation system 110. The reduced-salinity aqueous composition 440 or the heated reduced-salinity aqueous composition 442 may be combined with the entrainer 120 in the distillation vessel 112 to form the hetero-azeotrope mixture 122. The make-up entrainer stream 121 may be fluidly coupled to the distillation vessel 112. The entrainer 120 may be supplied by the entrainer recycle stream 148 recycled from the condensate receiver 140 to the distillation vessel 112, from the make-up entrainer stream 121 introduced to the distillation vessel 112, or both. In some embodiments, the make-up entrainer may be introduced to the aqueous composition crystallizer 412. In these embodiments, the amount of make-up entrainer added to the aqueous composition 102 in the aqueous composition crystallizer 412 may not be sufficient by itself to effect antisolvent crystallization of the aqueous composition 102.

Although the distillation system 110, crystallization process 160, and feedstream crystallization processes (distillation feedstream crystallization process 310 and aqueous composition crystallization process 410) are described in this disclosure in terms of single unit operations, it is understood that any of these processes may include multiple processes operated in parallel or in series to produce the desalinated water. For example, in some embodiments the distillation system 110 may include a plurality of distillation vessels 112 and a plurality of short-path distillation columns 190. The plurality of distillation vessels 112 and short-path distillation columns 190 may be operated in series or in parallel. Each of the crystallization processes described in the present disclosure may also include multiple crystallizers operated in series or in parallel. Additionally, in some embodiments, the distillation system 110 may include multiple distillation vessels 112 and multiple short-path distillation columns 190 operated in parallel or in series and a single crystallization process 160 capable of crystallizing the distillation bottoms liquid 124 from one or all of the plurality of distillation vessels 112. Other configurations, combinations, and arrangements of the unit operations described in the present disclosure for producing desalinated water from an aqueous composition 102 comprising a salt are contemplated. The number of processes operated in parallel or in series may depend on the production rate of desalinated water.

The systems and methods described in the present disclosure may produce desalinated water for use as process water in petroleum drilling, production, or refining operations. For example, the desalinated water produced by the systems and methods of the present disclosure may be used for desalting crude oil. The desalinated water may be treated to remove the residual organic compounds to produce treated desalinated water that may be suitable for use in drilling operations, such as for use in drilling fluids or injection fluids for example, or in fire suppression systems, stripping columns, or other refining uses. With additional treatments and purification, the treated desalinated water may be suitable for various anthropologic or agricultural uses as well.

EXAMPLES

The following examples illustrate the separation of desalinated water from an aqueous stream originating from a petroleum processing operation through hetero-azeotrope distillation and investigate the effects of various parameters on the distillation temperature and separation efficiency of the hetero-azeotrope distillation process.

Experimental Apparatus

Figure 12:
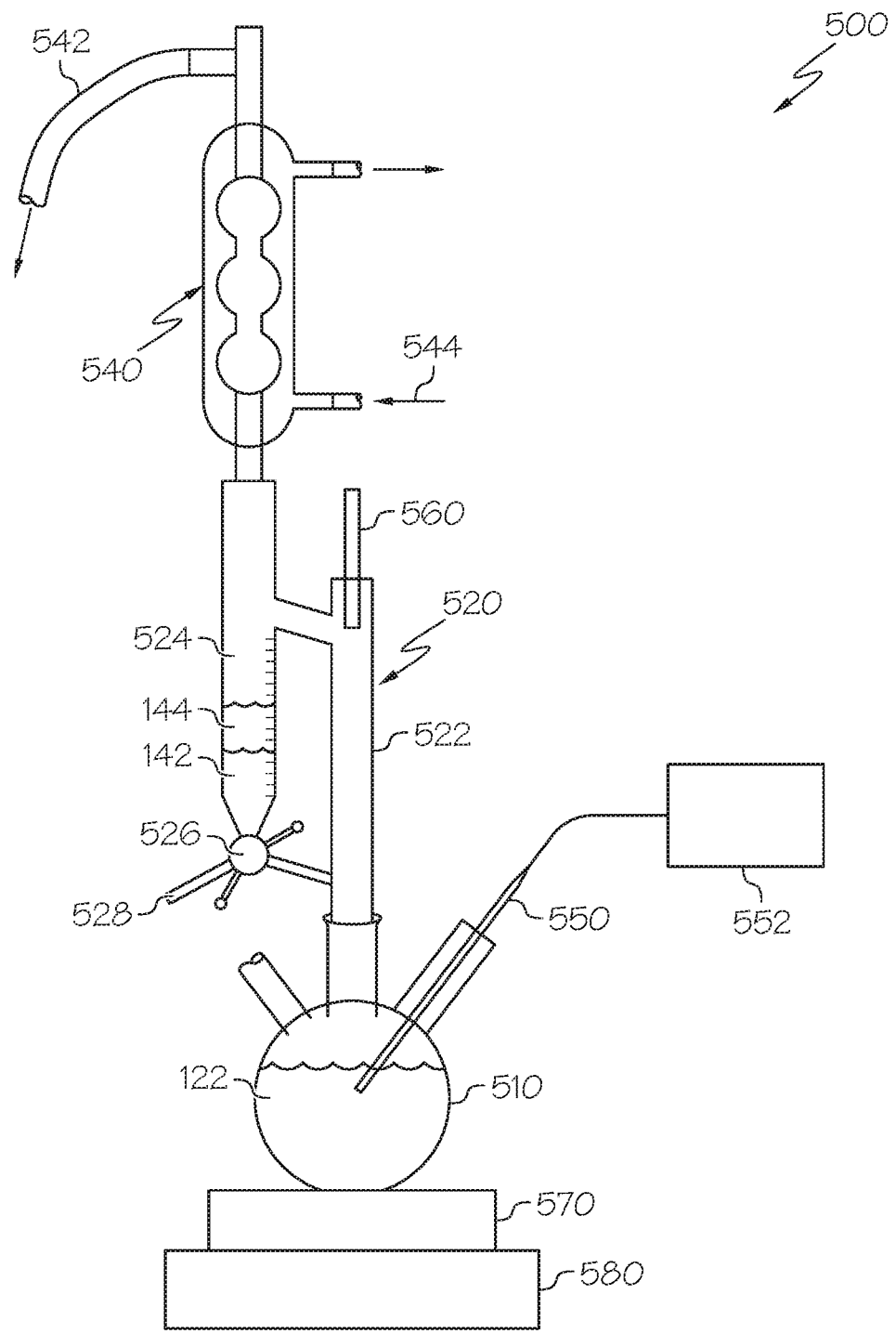
FIG. 12 schematically depicts an experimental apparatus for conducting the experiments in Examples 1 through 5, according to one or more embodiments described in this disclosure.

Referring to FIG. 12, an experimental hetero-azeotrope distillation system 500 for conducting the experiments in the following examples is schematically depicted. The experimental hetero-azeotrope distillation system 500 included a three-necked round-bottom flask 510 fitted with a Dean-Stark apparatus 520 and a bulb condenser 540. The potential uncondensed gases 542, such as desorbed gases or uncondensed entrainer, was collected at the top of the condenser 540 and directed to an exhaust system equipped with treatment systems to remove organics and other contaminants. The flask 510 was configured to contain the hetero-azeotrope mixture 122 and the temperature of the hetero-azeotrope mixture was measured using a K-type thermocouple 550 connected to an electronic read-out 552. The temperature of the hetero-azeotrope vapor entering the Dean-Stark apparatus 520 was measured using a colored alcohol thermometer 560 situated at the top of the Dean-Stark apparatus 520. The Dean-Stark apparatus 520 included a column 522 extending from the flask 510 and a condensate receiver 524 fluidly coupled to the column 522 and configured to collect the condensate from the bulb condenser 540. The condensate included the aqueous phase 142 (desalinated water) and, optionally, the entrainer-rich phase 144. The Dean-Stark apparatus 520 included a three-way tap 526, which could be switched "Off" to collect the condensate including the aqueous phase 142 (desalinated water) and, optionally, the entrainer-rich phase 144, "On-Out" to collect the aqueous phase 142 (desalinated water) from spout 528, or "On-In" to steer the aqueous phase 142 (distilled water) and/or the entrainer-rich phase 144 back into the flask 510. A cooling fluid 544 was passed through the bulb condenser 540 to cool the hetero-azeotrope vapors to promote condensation. The experimental hetero-azeotrope distillation system 500 included a heating device 570 for heating the flask 510 and an external stirrer 580.

Example 1: Effects of the Volume Fraction of Aqueous Composition on the Thermal Behavior and Distillation Rate of the Hetero-Azeotrope Mixture In Example 1, the effects of variation in the volume fraction of the aqueous composition in a binary hetero-azeotropic mixture were investigated. In Example 1, a fixed amount of 206 mL of toluene was used as the entrainer. The aqueous composition of Example 1 was collected from an oily, briny water stream produced by a Gas Oil Separation Plant (GOSP) for processing crude oil. The aqueous composition had a salinity of 107 g/L. The volume fractions of the aqueous composition in each hetero-azeotrope mixture of Example 1 are provided in Table 2. The temperatures of the vapor phase, the temperature of the hetero-azeotrope mixture 122 (bulk liquid), and the amount of water collected in the Dean-Stark apparatus 520 were measured and plotted as functions of time (x-axis) in FIGS. 13, 14, 15, and 16.

Figure 13:
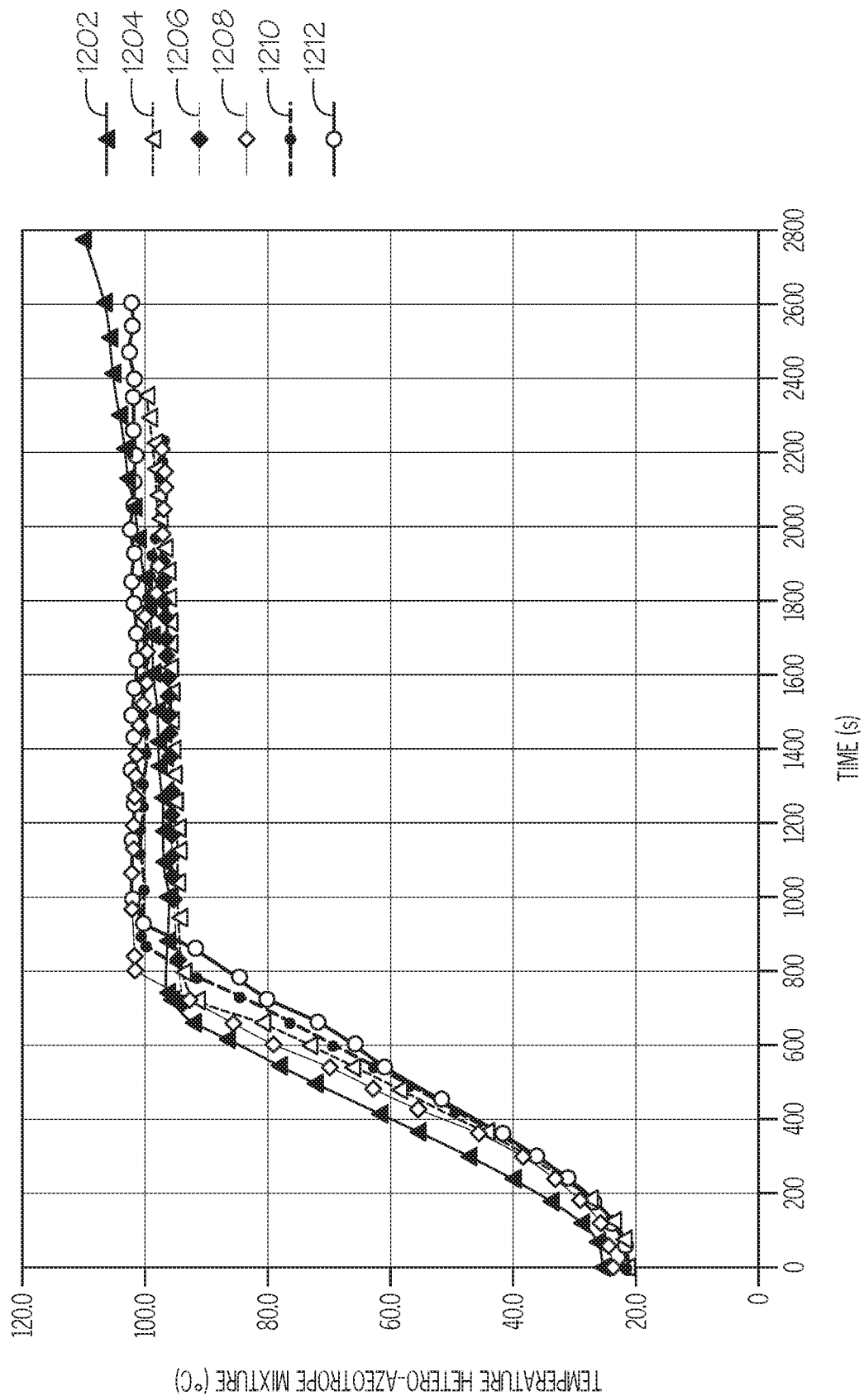
FIG. 13 graphically depicts a bulk temperature of a hetero-azeotrope mixture (y-axis) as a function of time (x-axis) for a plurality of hetero-azeotrope mixtures that include a fixed amount of toluene entrainer with varying amounts of an aqueous composition, according to one or more embodiments described in this disclosure.

Referring to FIG. 13, the temperature of the hetero-azeotrope mixture 122 in the bulk liquid (y-axis) is graphically depicted as a function of the time (y-axis) in seconds. FIG. 13 shows the evolution of the temperature of the hetero-azeotrope mixture with time to the boiling temperature. Before the temperature stabilized at the boiling temperature, the heating rate of the hetero-azeotrope mixture was determined from the initial slope of the curves and was found to average about 0.11±0.01 degrees Celsius per second (° C./s). As shown by FIG. 13, the volume fraction of the aqueous composition in the binary hetero-azeotrope mixture had little or no effect on the temperature-changing rate of the hetero-azeotrope mixture.

Figure 14:
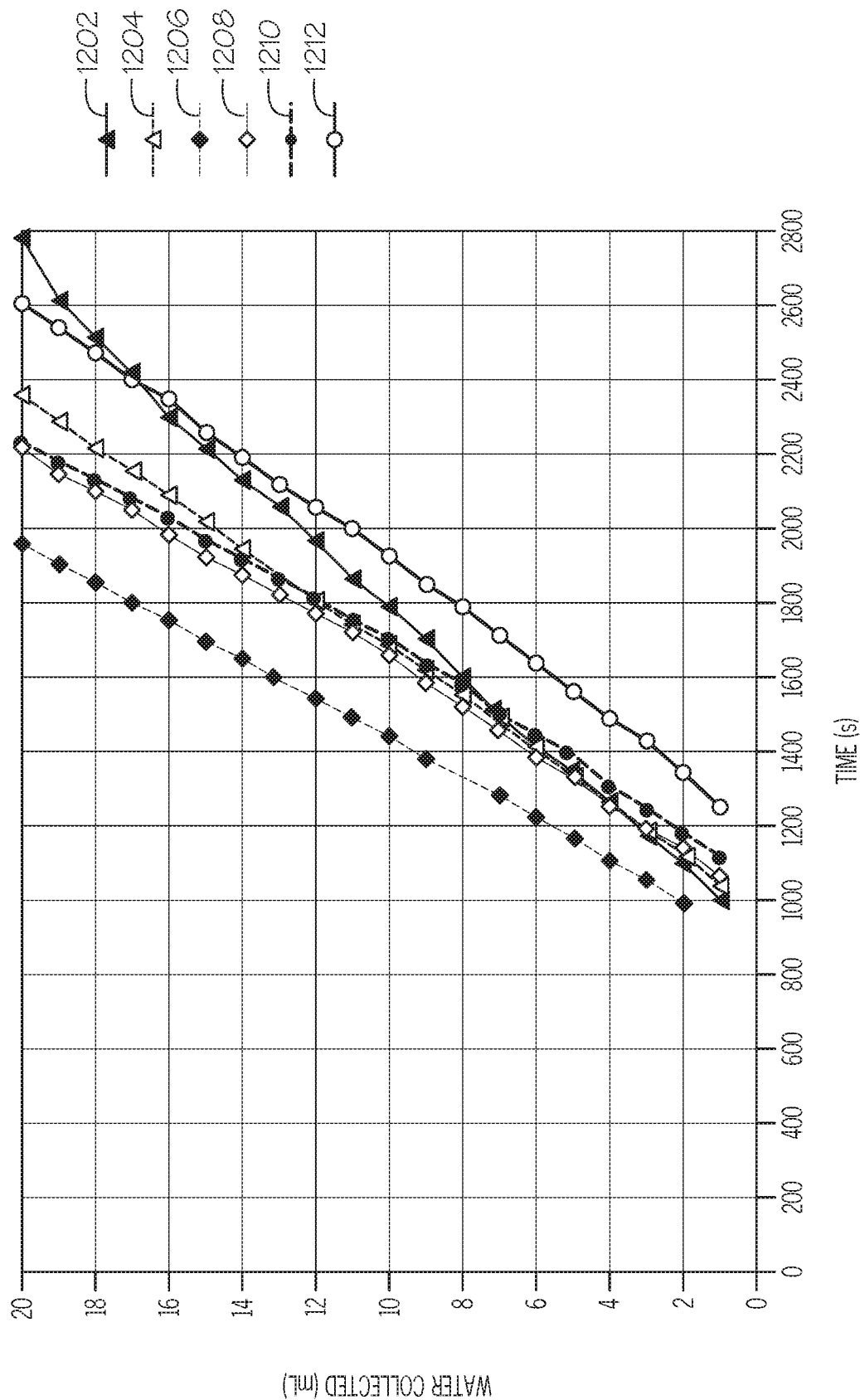
FIG. 14 graphically depicts a volume of desalinated water collected (y-axis) as a function of time (x-axis) for the plurality of hetero-azeotrope mixtures of FIG. 13, according to one or more embodiments described in this disclosure.

Once the temperature stabilized, desalinated water condensed by the bulb condenser 540 was collected in the condensate receiver 524 of the Dean-Stark apparatus 520. The volume of the desalinated water collected was recorded as a function of time. Referring to FIG. 14, the volume of desalinated water collected (y-axis) was plotted as a function of time (x-axis) starting at the time when the temperature reached the boiling temperature (about 1000 seconds). The rate of distillation was graphically determined from FIG. 14 for each of the hetero-azeotrope mixtures of Example 1. The rates of distillation in units of milliliters per hour (mL/hr) for each hetero-azeotrope mixture in Example 1 are provided in Table 2.

TABLE 2

Volume Percent of Aqueous Composition and Rate of Distillation for the Water/Toluene Hetero-Azeotrope Mixtures of Example 1

| Mixture ID | Reference Number in FIGS. 13-16 | Volume Percent of Aqueous Composition (%) | Rate of Distillation (mL/hr) |
| --- | --- | --- | --- |
| 1A | 1202 | 9.6 | 39.96 |
| 1B | 1204 | 13.8 | 52.20 |
| 1C | 1206 | 17.6 | 67.68 |
| 1D | 1208 | 21.1 | 59.76 |
| 1E | 1210 | 24.3 | 61.20 |
| 1F | 1212 | 27.2 | 51.12 |

The rate of distillation was greatest when the water/toluene hetero-azeotrope mixture had a volume percent of the aqueous composition of 17.6 vol. %. This is illustrated graphically in FIG. 14 by the greater slope of data series 1206, which corresponds to the volume percent of the aqueous composition of 17.6 vol. %, relative to the other data sets. The volume percent of aqueous composition of 17.6 vol. % can be considered the hetero-azeotrope volume percent of the aqueous composition. As shown in Table 2, decreasing the volume percent of the aqueous composition in the mixture below the hetero-azeotrope volume percent of the aqueous composition in the mixture caused the rate of distillation to significantly decrease. For example, when the volume fraction of the aqueous composition was reduced by half from 17.6 vol. % to 9.6 vol. %, the distillation rate decreased by 41%. The rate of distillation also decreases when the volume percent of the aqueous composition is greater than the hetero-azeotrope volume percent of water (17.6% vol.), but the decrease in the rate of distillation is less compared to the decrease in rate of distillation for volume percentages of the aqueous composition below the hetero-azeotrope volume percent. For example, when the volume percent of the aqueous composition is increased from 17.6 vol. % to 24.3 vol. %, the rate of distillation only decreased by 9%.

Figure 15:
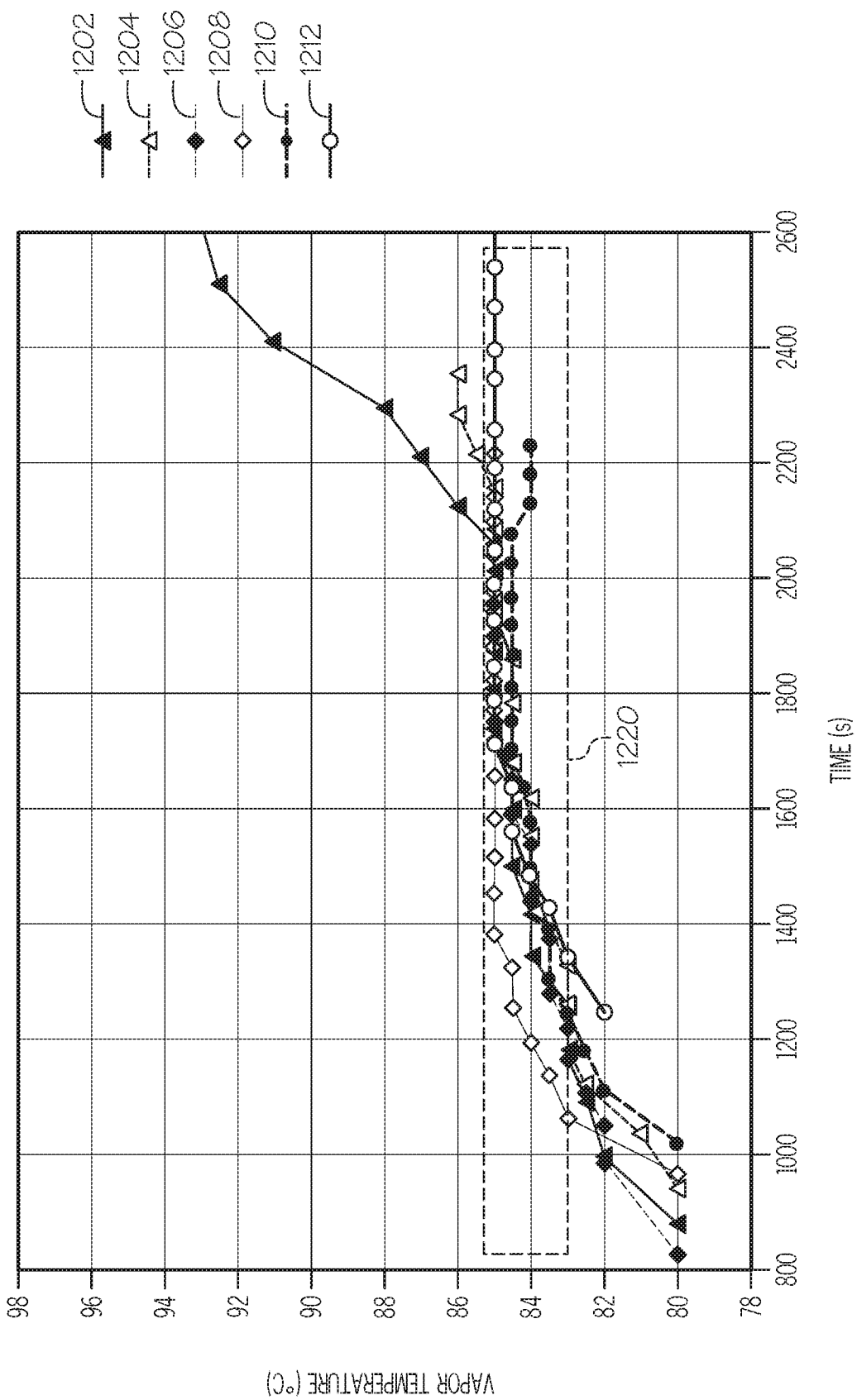
FIG. 15 graphically depicts a temperature of the vapor phase (y-axis) as a function of time (x-axis) for the hetero-azeotrope mixtures of FIG. 13, according to one or more embodiments described in this disclosure.

FIG. 15 graphically depicts the temperature of the vapor phase (y-axis) for each hetero-azeotrope mixture of Example 1 as a function of time (x-axis). The hetero-azeotrope boiling point temperature of a Toluene/Water hetero-azeotrope is known to be in the range of 83° C. to 85° C. and is indicated in FIG. 15 by the rectangle 1220. Regardless of the composition, the vapor phase temperatures for the hetero-azeotrope mixtures of Example 1 all stabilized in the range of the hetero-azeotrope boiling temperature of a Toluene/Water hetero-azeotrope, which indicates that the vapor composition is at the hetero-azeotropic composition (approximately 20% weight in water). In other words, the amount of the aqueous composition in the hetero-azeotrope mixture 122 has very little or no effect on the temperature and composition of the vapor phase after stabilization.

For Sample 1A in which the volume percent of the aqueous composition was 9.6 vol. %, the vapor phase temperature began to increase after 2100 seconds. At this point in time, the volume percent of the aqueous composition remaining in the flask 510 for Sample 1A was only 3.7 vol. % (about 8 mL). The mass concentration of salts in the aqueous composition in the hetero-azeotrope mixture increased from 107 g/L of dissolved salt in Sample 1A at time equal to zero (9.6 vol. % aqueous composition) to 296 g/L of dissolved salt in the 8 mL of the aqueous composition remaining at time equal to 2100 seconds. Although some precipitated salts were observed in the flask during the experiment starting at time equal to about 1600 seconds, the precipitation of salt was more significant after cooling the remaining water-depleted bulk liquid to room temperature.

Figure 16:
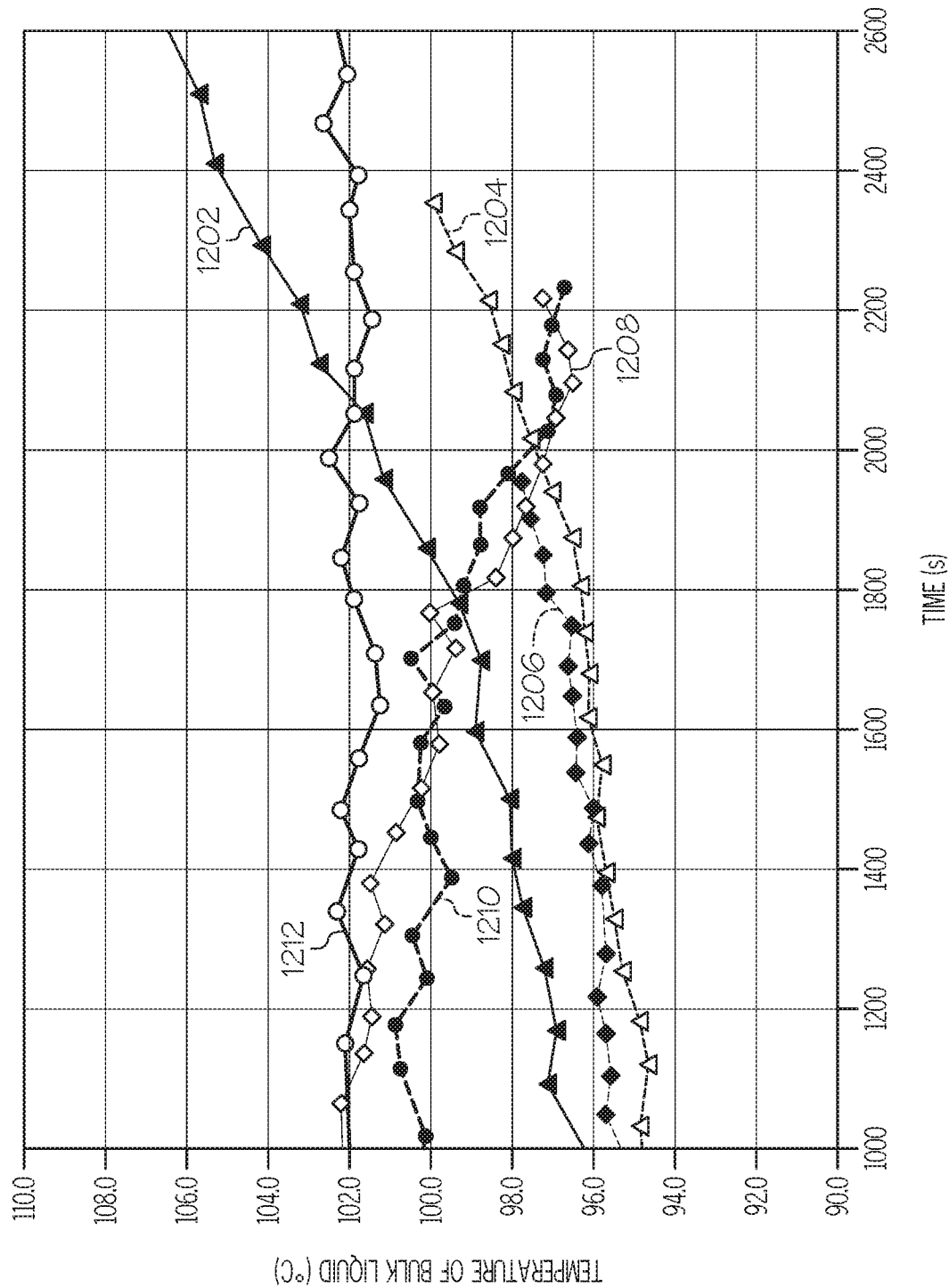
FIG. 16 graphically depicts the bulk temperature of the hetero-azeotrope mixtures of FIG. 13 (y-axis) as a function of time (x-axis) for the time period after the start of vaporization of the hetero-azeotrope mixtures, according to one or more embodiments described in this disclosure.

Referring now to FIG. 16, the temperature of the hetero-azeotrope mixture 122 (bulk liquid) (y-axis) is graphically depicted as a function of time (x-axis) for time greater than 1000 seconds, which illustrates the temperature behavior of the hetero-azeotrope mixture (bulk liquid) after ebullition began. For Sample 1A 1202 (9.6 vol. % aqueous composition), the hetero-azeotrope mixture began to vaporize at a temperature of 96° C.±1° C. However, in Sample 1A, the excess toluene, which has a boiling temperature of 110° C., resulted in a steady increase in the temperature of the bulk liquid at a temperature-changing rate of $3.96 \times 10^{-3} \pm 0.01 \times 10^{-3}$ ° C./s, during ebullition of the hetero-azeotrope mixture. For Samples 1B (1204) and 1C (1206) (13.8 vol. % and 17.6 vol. % aqueous composition respectively), the hetero-azeotrope vaporized when the temperature of the hetero-azeotrope mixture reached 94° C.±1° C. For samples 1B and 1C, the temperature behavior of the bulk liquid after time equal to 1000 seconds was controlled by ebullition of the hetero-azeotrope, which resulted in temperature-changing rates of $2.35 \times 10^{-3} \pm 0.01 \times 10^{-3}$ ° C./s for Sample 1B and $2.43 \times 10^{-3} \pm 0.01 \times 10^{-3}$ ° C./s for Sample 1C, respectively. These temperature-changing rates for Samples 1B and 1C were less than the temperature-changing rate for Sample 1A, which had an excess of toluene. This indicates that the temperature-changing of Samples 1B and 1C was controlled by ebullition of the hetero-azeotrope rather than being governed by excess toluene or excess water.

Still referring to FIG. 16, for Samples 1D (1208) and 1E (1210) (21.1 vol. % and 24.3 vol. % aqueous composition, respectively), the thermal behavior of the hetero-azeotrope mixture (bulk liquid) was influenced by the excess aqueous composition, which had a boiling temperature of 104° C. The hetero-azeotrope vaporized when the hetero-azeotrope mixture approached temperatures of 102° C.±1° C. for Sample 1D and 100° C.±1° C. for Sample 1E. The temperature of the hetero-azeotrope mixture began to decrease after about 800 seconds for Sample 1D and after around 1200 seconds for Sample 1E. For Samples 1D and 1E, the temperature-changing rates are not constant with time because the variations in the composition of the hetero-azeotrope mixture with time are more complex. Not intending to be bound by any particular theory, it is believed that distillation of the hetero-azeotrope mixtures of Samples 1D and 1E having concentrations of the aqueous composition of 21.1 vol. % and 24.3 vol. %, respectively, changed the composition, and therefore the temperature, of the liquid with time in the direction of a mixture having a composition closer to the hetero-azeotropic composition for a toluene/water heteroazeotrope.

For Sample 1F (1212) having 27.2 vol. % aqueous composition in the hetero-azeotrope mixture, the excess of aqueous composition in the hetero-azeotrope mixture resulted in the temperature of the hetero-azeotrope mixture remaining stable at 102° C.±1° C. in the system during the whole duration of the experiment. The hetero-azeotrope vaporized when the bulk temperature approached 102° C.±1° C. No other significant changes were observed in this case.

Example 2: Effects of the Volume Fraction of Entrainer on the Thermal Behavior of the Hetero-Azeotrope Mixture In Example 2, the effects of the volume fraction of the entrainer on the thermal behavior and distillation rate of the binary hetero-azeotropic mixture were investigated. In Example 2, a fixed amount of 44 mL of the oily, briny water stream from Example 1 having a salinity of 107 g/L was used as the aqueous composition. Varying amounts of toluene were added to the 44 mL of the aqueous composition to prepare the hetero-azeotrope mixtures of Example 2. The volume fractions of the entrainer in each hetero-azeotrope mixtures of Example 2 are provided in Table 3. The temperatures of the vapor phase, the temperature of the hetero-azeotrope mixture 122 (bulk liquid), and the amount of water collected in the Dean-Stark apparatus 520 were measured and plotted as functions of time (x-axis) in FIGS. 17, 18, 19, and 20.

Figure 17:
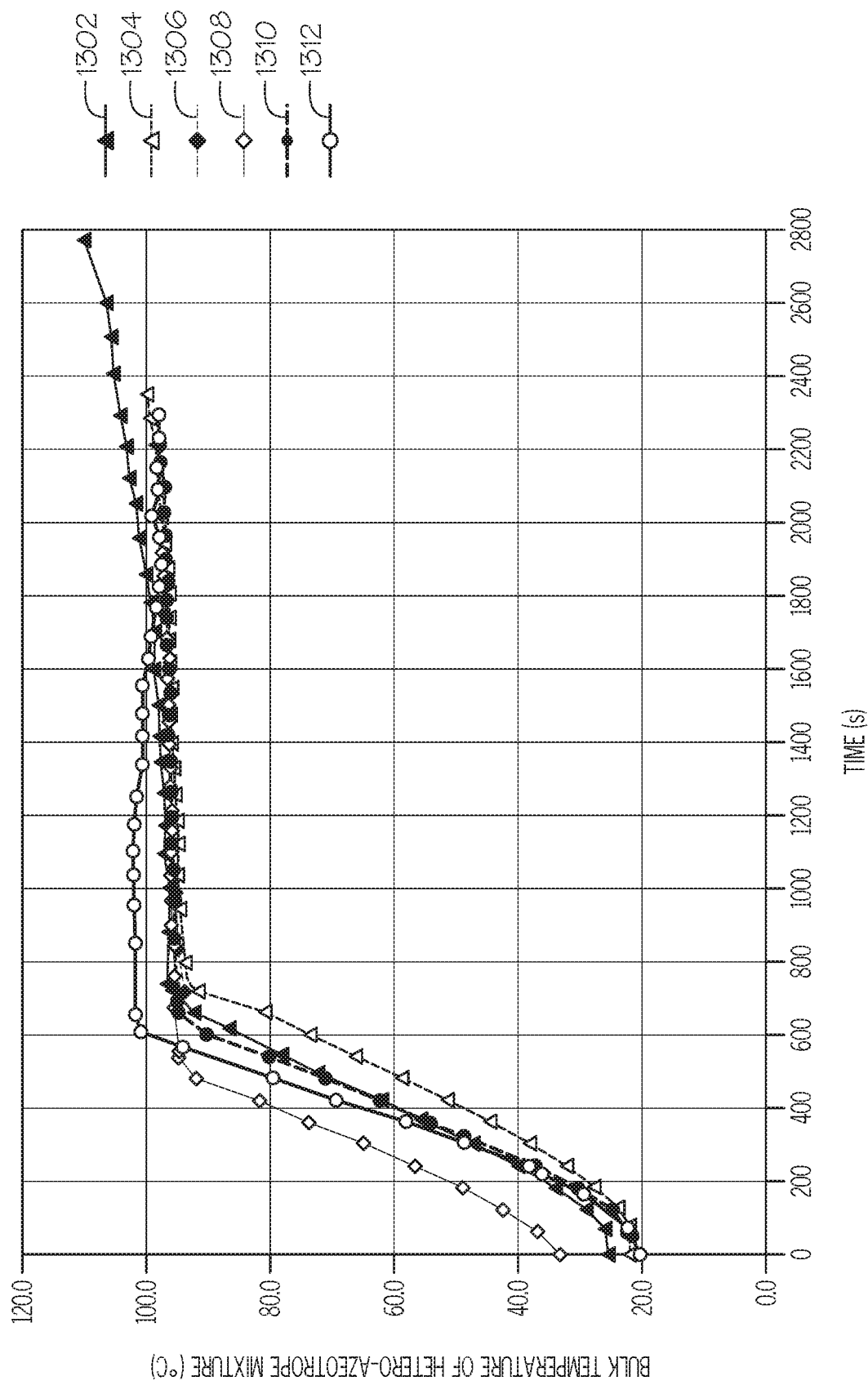
FIG. 17 graphically depicts a bulk temperature of a hetero-azeotrope mixture (y-axis) as a function of time (x-axis) for a plurality of hetero-azeotrope mixtures including a fixed amount of aqueous composition with varying amounts of toluene entrainer, according to one or more embodiments described in this disclosure.

FIG. 17 graphically depicts the evolution of the bulk temperature with time to the boiling point temperature of the hetero-azeotrope mixture 122. The temperature-changing rates of each of the hetero-azeotrope mixtures, before stabilization of the temperature, were determined from the initial slope of the curves in FIG. 17. The average initial temperature-changing rate was determined to be 0.17° C./s±0.09° C./s before stabilization of the temperature. It was found that the volume percent of the entrainer had very little or no effect on the temperature-changing rate of the hetero-azeotrope mixtures before ebullition.

Figure 18:
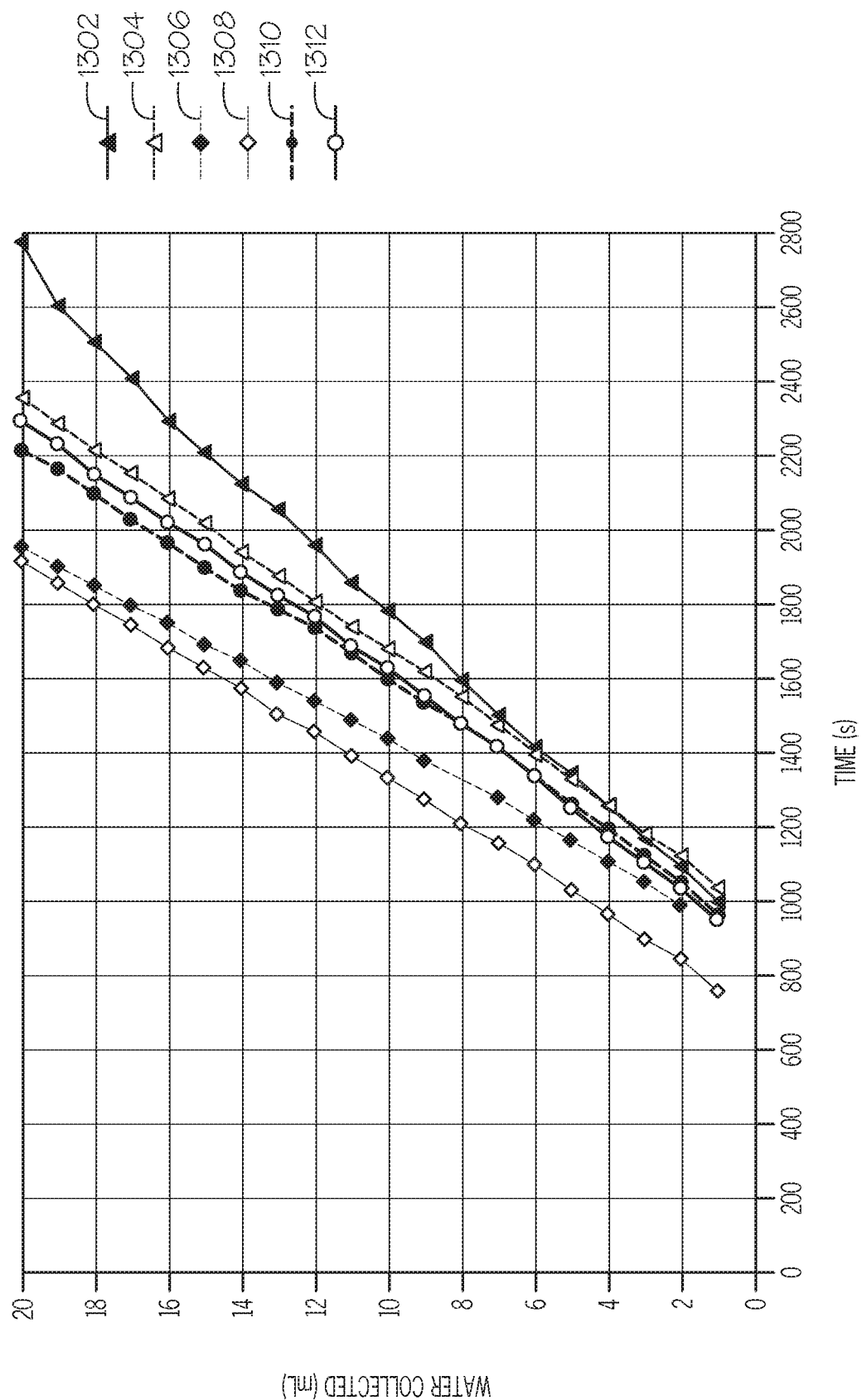
FIG. 18 graphically depicts a volume of desalinated water collected (y-axis) as a function of time (x-axis) for the plurality of hetero-azeotrope mixtures of FIG. 17, according to one or more embodiments described in this disclosure.

Once the temperature stabilized, desalinated water condensed by the bulb condenser 540 was collected in the condensate receiver 524 of the Dean-Stark apparatus 520. The volume of the desalinated water collected was recorded as a function of time. Referring to FIG. 18, the volume of desalinated water collected (y-axis) was plotted as a function of time (x-axis) starting at the time when the temperature reached the boiling temperature (about 1000 seconds). The rate of distillation was graphically determined from FIG. 18 for each of the hetero-azeotrope mixtures of Example 2. The rates of distillation in units of milliliters per hour (mL/hr) for each hetero-azeotrope mixture in Example 2 are provided in Table 3.

TABLE 3

Volume Percent of Entrainer and Rate of Distillation for the Water/Toluene Hetero-Azeotrope Mixtures of Example 2

| Mixture ID | Reference Number in FIGS. 17-20 | Volume Percent of Entrainer (%) | Rate of Distillation (mL/hr) |
| --- | --- | --- | --- |
| 2A | 1302 | 90.0 | 39.96 |
| 2B | 1304 | 86.2 | 52.20 |
| 2C | 1306 | 82.4 | 67.67 |
| 2D | 1308 | 77.3 | 59.76 |
| 2E | 1310 | 70.1 | 55.44 |
| 2F | 1312 | 53.7 | 51.12 |

Although the compositions of Samples 2A-2F of Example 2 are different than the compositions of Example 1, the trend in the rate of distillation is similar to trend observed in Example 1. For the hetero-azeotrope mixtures of Example 2, the rate of distillation was greatest at the hetero-azeotropic composition of the binary toluene/water mixture, which was observed for Sample 2C having 82.4 vol. % toluene entrainer. Increasing the volume percent of toluene, as in Samples 2A and 2B resulted in significant decreases in the rate of distillation. For example, increasing volume percent of toluene is raised from 82.4 vol. % to 90.0 vol. % decreased the distillation rate by 41%. Although the rate of distillation also decreased when the volume fraction of toluene was decreased to less than the hetero-azeotropic volume fraction of toluene (less than 82.4 vol. %) as in Samples 2D to 2F, the decrease in the rate of distillation was not as significant compared to increasing the volume percent of toluene to greater than the hetero-azeotropic composition. For example, decreasing the volume fraction of toluene from 82.4 vol. % to 70.1 vol. % (Sample 2E) resulted in a decrease in the rate of distillation of only 18%.

Figure 19:
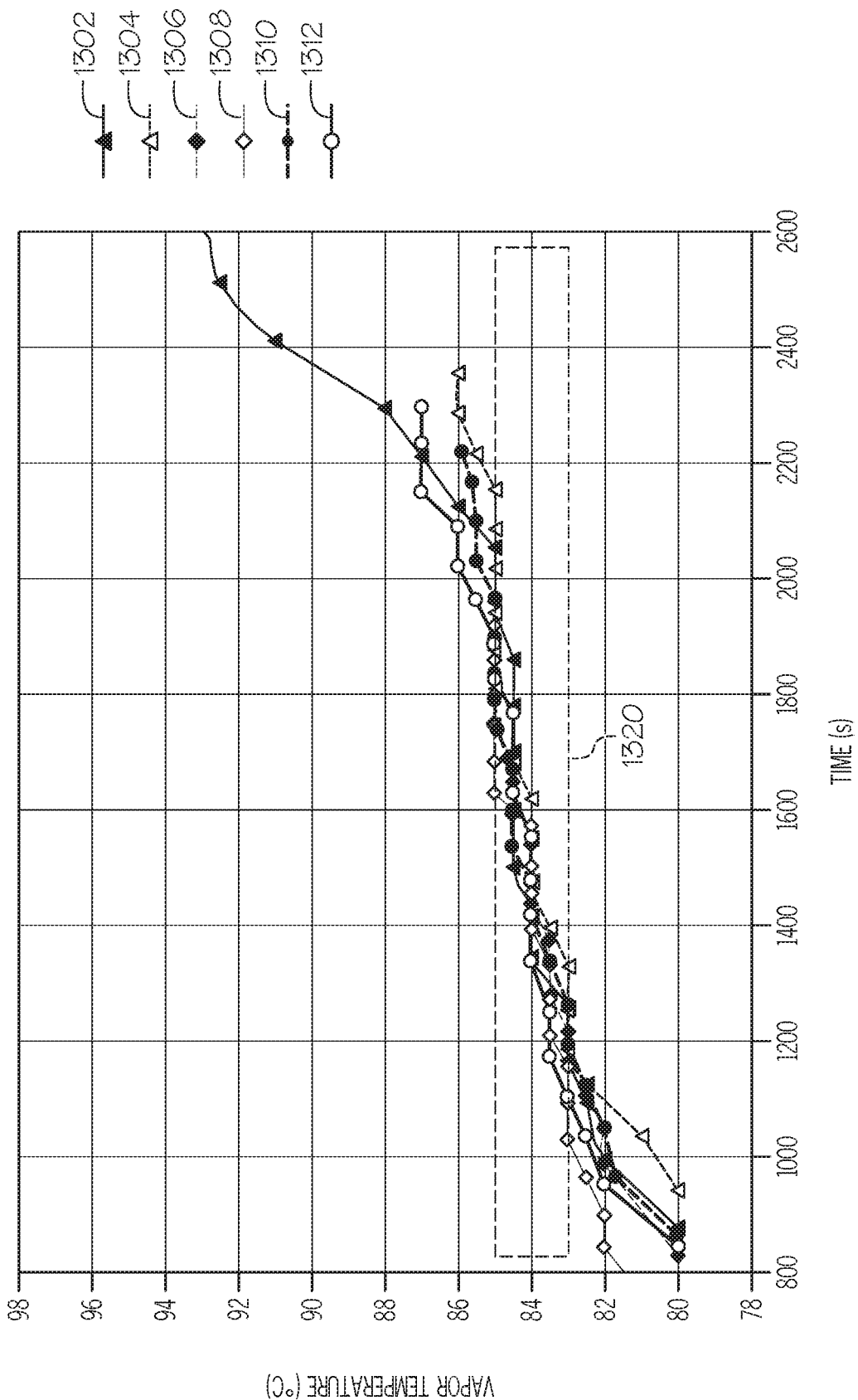
FIG. 19 graphically depicts a temperature of the vapor phase (y-axis) as a function of time (x-axis) for the hetero-azeotrope mixtures of FIG. 17, according to one or more embodiments described in this disclosure.

FIG. 19 graphically depicts the temperature of the vapor phase (y-axis) for each hetero-azeotrope mixture of Example 2 as a function of time (x-axis). The hetero-azeotrope boiling point temperature of a toluene/water hetero-azeotrope is known to be in the range of 83° C. to 85° C. and is indicated in FIG. 19 by the rectangle 1320. Regardless of the composition, the vapor phase temperatures for the hetero-azeotrope mixtures of Example 2 all stabilized in the range of the hetero-azeotrope boiling temperature of a Toluene/Water hetero-azeotrope, which indicates that the vapor composition is at the hetero-azeotropic composition (approximately 20% by weight water). In other words, the amount of toluene entrainer in the hetero-azeotrope mixture 122 has very little or no effect on the temperature and composition of the vapor phase after stabilization.

In Example 2 in which the volume percent of toluene was changed, no precipitation of salts in the hetero-azeotrope mixtures was observed. In Example 2, the mass concentration of dissolved salts in the hetero-azeotrope mixtures reached a maximum of 197 g/L, which is less than the solubility limit of the salts in water, which may be about 350 g/L at 25° C.

Figure 20:
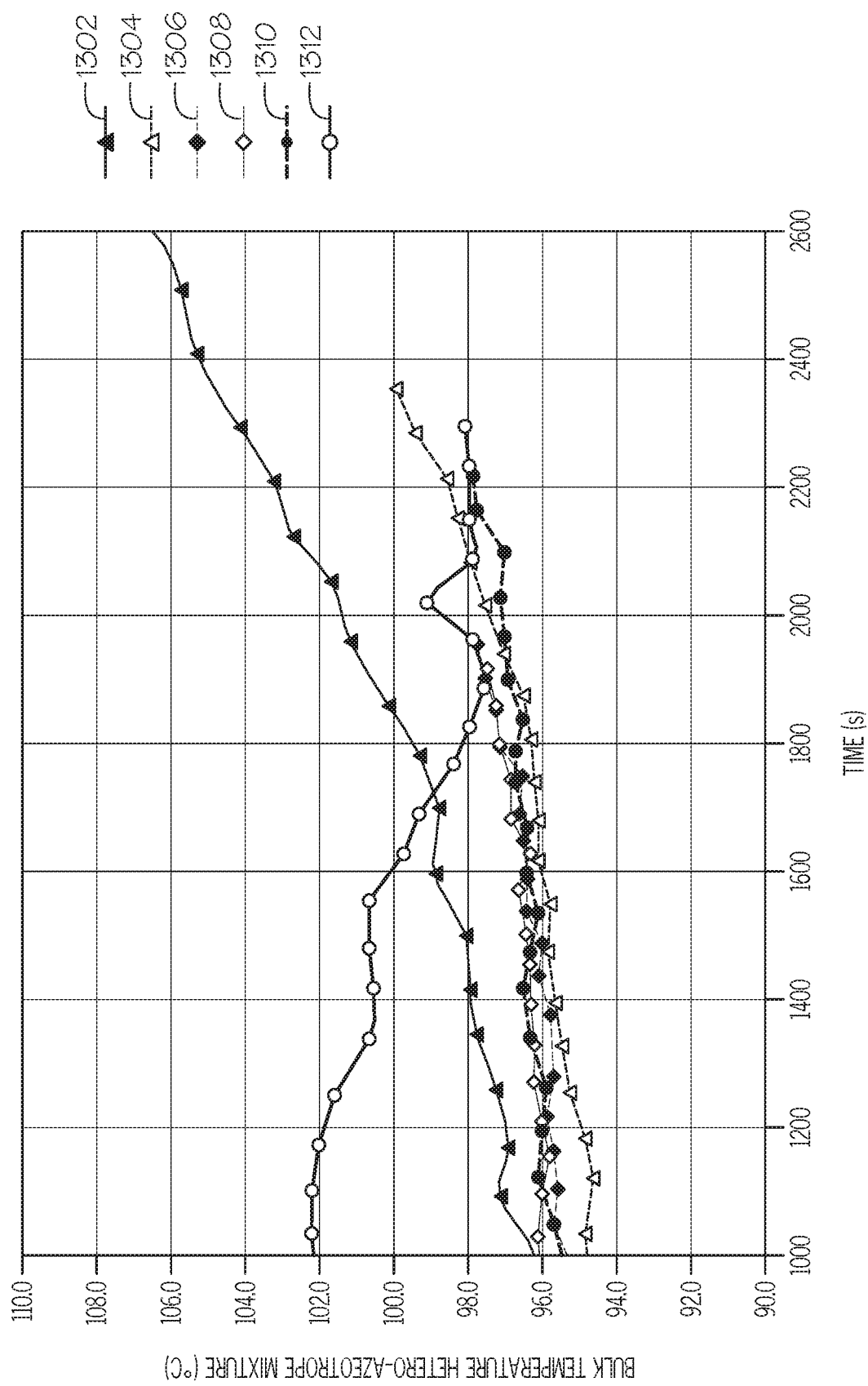
FIG. 20 graphically depicts the bulk temperature of the hetero-azeotrope mixtures of FIG. 17 (y-axis) as a function of time (x-axis) for the time period after the start of vaporization of the hetero-azeotrope mixtures, according to one or more embodiments described in this disclosure.

Referring now to FIG. 20, the temperatures of the hetero-azeotrope mixtures 122 (bulk liquid) (y-axis) of Example 2 are graphically depicted as functions of time (x-axis) for time greater than 1000 seconds, which illustrates the temperature behavior of the hetero-azeotrope mixtures (bulk liquid) of Example 2 after ebullition began. For Sample 2F having 53.7 vol. % of toluene entrainer in the hetero-azeotrope mixture, the hetero-azeotrope mixture vaporized as soon as the bulk temperature reached 102° C.±1° C. Following the start of ebullition, the excess water, which had a boiling temperature of 104° C., influenced the thermal behavior of the hetero-azeotrope mixture. The decrease in the temperature of the hetero-azeotrope mixture of Sample 2F occurred after approximately 1200 seconds. For Sample 2F, the temperature of the hetero-azeotrope mixture does not vary linearly with time. Not intending to be bound by any particular theory, it is believed that distillation of the hetero-azeotrope mixture of Sample 2F having 53.7 vol. % toluene changed the composition, and therefore the temperature, of the liquid with time in the direction of a mixture having a composition closer to the hetero-azeotropic composition for a toluene/water hetero-azeotrope.

Referring to FIG. 20, for Sample 2A having 90.0 vol. % toluene entrainer, the hetero-azeotrope vaporized as soon as the bulk temperature of the hetero-azeotrope mixture reached 96° C.±1° C. Following the start of ebullition, the excess of toluene, which has a boiling point temperature of 110° C., governed the thermal behavior resulting in an increase in the bulk temperature of the hetero-azeotrope mixture. The temperature-changing rate for the hetero-azeotrope mixture of Sample 2A was determined to be $3.96 \times 10^{-3}$° C./s±$0.01 \times 10^{-3}$° C./s, during the ebullition of the hetero-azeotrope.

Referring still to FIG. 20, for Samples 2B through 2E, which represent the range of from 70.1 vol. % to 86.2 vol. % toluene in the hetero-azeotrope mixture, each of the hetero-azeotrope mixtures began to vaporize when the bulk temperature of the hetero-azeotrope mixture reached 95° C.±1° C. In this range of toluene volume percent, ebullition of the hetero-azeotrope controlled the thermal behavior of the hetero-azeotrope mixture. The temperature-changing rates for Samples 2B, 2C, 2D, and 2E were determined to be $2.43 \times 10^{-3}$° C./s±$0.01 \times 10^{-3}$° C./s (2B), $2.35 \times 10^{-3}$° C./s±$0.01 \times 10^{-3}$° C./s (2C), $1.37 \times 10^{-3}$° C./s±$0.01 \times 10^{-3}$° C./s (2D), and $1.48 \times 10^{-3}$° C./s±$0.01 \times 10^{-3}$° C./s (2E).

As a summary of Examples 1 and 2, the vapor temperatures for the hetero-azeotrope mixtures of Examples 1 and 2 comprising toluene and the aqueous composition having a salinity of 107 g/L were all in the range of from 83° C. to 85° C., which is in the vicinity of the known hetero-azeotrope boiling temperature of 84° C. for the toluene/water hetero-azeotrope. Thus, the amount of the aqueous composition and the amount of entrainer do not affect the formation of the hetero-azeotrope. However, the relative amounts of the aqueous composition and the entrainer can affect the bulk temperature of the hetero-azeotrope mixture and the energy consumption of the distillation process. The minimum bulk temperature of the hetero-azeotrope mixture was observed when the relative amount of the aqueous composition and the entrainer (toluene) was at, or close to, the hetero-azeotropic composition (44 mL of aqueous composition and 206 mL of toluene, which corresponds to 17.6 vol. % aqueous composition and 82.4 vol. % toluene). It was also found that this optimal minimum bulk temperature of the hetero-azeotrope mixture was stable with a small deviation in the quantity of water, from −25% vol to 0% vol, and a large variation in the amount of toluene, from −50% vol to +33% vol. The effect of the volume of water on the bulk temperature required for the distillation of the hetero-azeotrope was found to be stronger than the effect of the volume of entrainer (toluene).

Example 3: Effect of Salinity of the Aqueous Composition on the Thermal Behavior and Distillation Rate of the Hetero-Azeotrope Mixture In Example 3, the effects of salinity of the aqueous composition on the thermal behavior and distillation rate of the hetero azeotrope mixture were investigated. Distillation was performed on a hetero-azeotrope mixture having a fixed ratio of the aqueous compositions to the toluene entrainer. The aqueous compositions used in Example 3 included distilled water (Sample 3A) and 3 different produced water samples collected from three different petroleum production operations and having three different salinities (Samples 3B, 3C, and 3D). The average salinity for each of the aqueous compositions of Example 3 is provided in Table 4. The amount of water collected in the Dean-Stark apparatus 520, the temperatures of the vapor phase, and the temperature of the hetero-azeotrope mixture 122 (bulk liquid) were measured and plotted as functions of time (x-axis) in FIGS. 21, 23, and 24.

Figure 21:
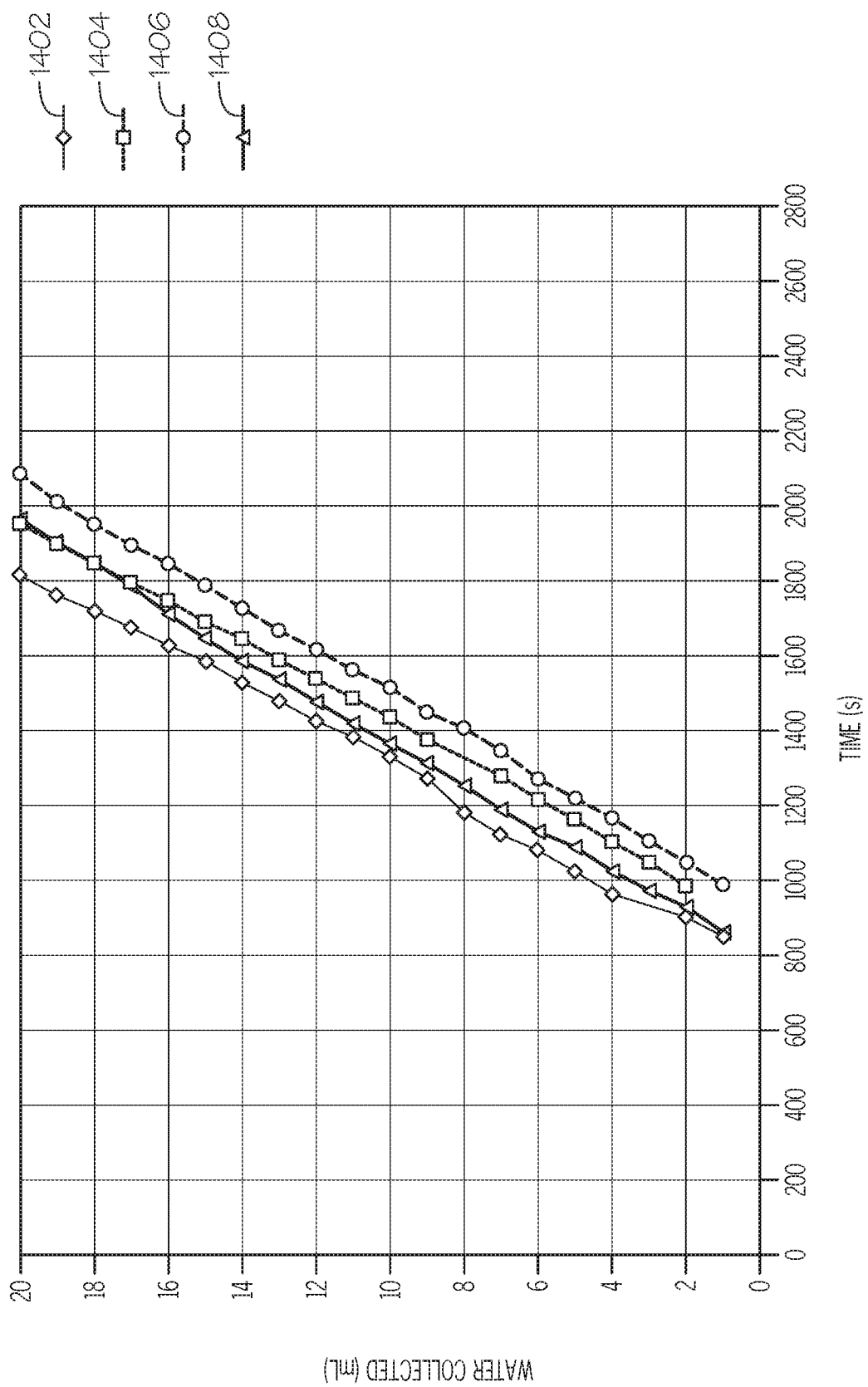
FIG. 21 graphically depicts a volume of desalinated water collected (y-axis) as a function of time (x-axis) for a plurality of hetero-azeotrope mixtures that include toluene entrainer combined with aqueous compositions of varying salinity, according to one or more embodiments described in this disclosure.

Once the temperature stabilized, desalinated water condensed by the bulb condenser 540 was collected in the condensate receiver 524 of the Dean-Stark apparatus 520. The volume of the desalinated water collected was recorded as a function of time. Referring to FIG. 21, the volume of desalinated water collected (y-axis) was plotted as a function of time (x-axis) starting at the time when the temperature reached the boiling temperature (at time just greater than about 800 seconds). Before the temperature stabilized, the temperature-changing rate for the hetero-azeotrope mixtures of Example 3 were determined to be 0.12° C./s±0.01° C./s.

FIG. 21 graphically depicts the amount of water collected (y-axis) as a function of time (d-axis). The rate of distillation was graphically determined from FIG. 21 for each of the hetero-azeotrope mixtures of Example 3. The rates of distillation in units of milliliters per hour (mL/hr) for each hetero-azeotrope mixture in Example 3 are provided in Table 4.

TABLE 4

Salinity and Rate of Distillation for the Hetero-Azeotrope Mixtures of Example 3

Figure 23:
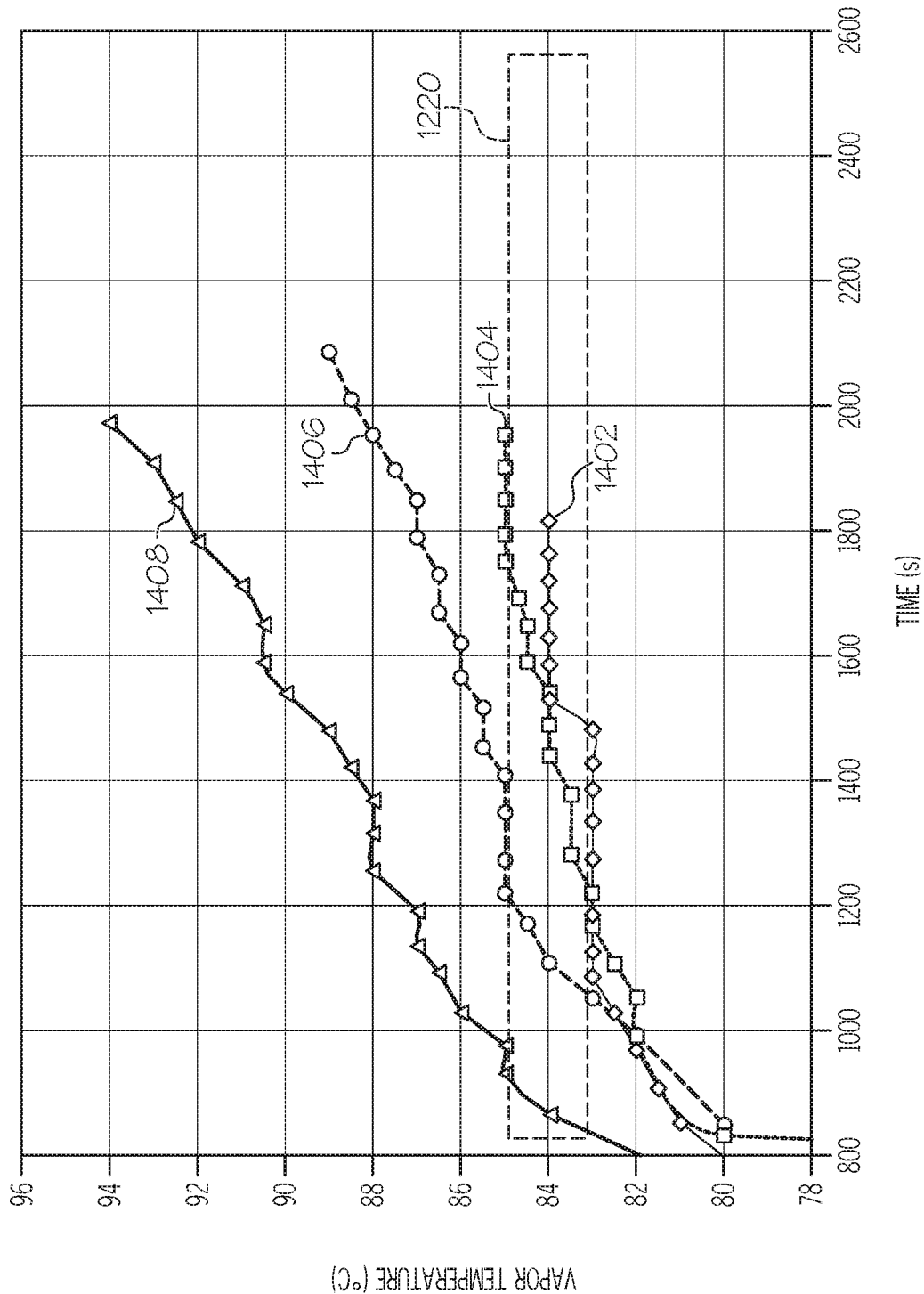
FIG. 23 graphically depicts a temperature of the vapor phase (y-axis) as a function of time (x-axis) for the hetero-azeotrope mixtures of FIG. 21, according to one or more embodiments described in this disclosure.
Figure 24:
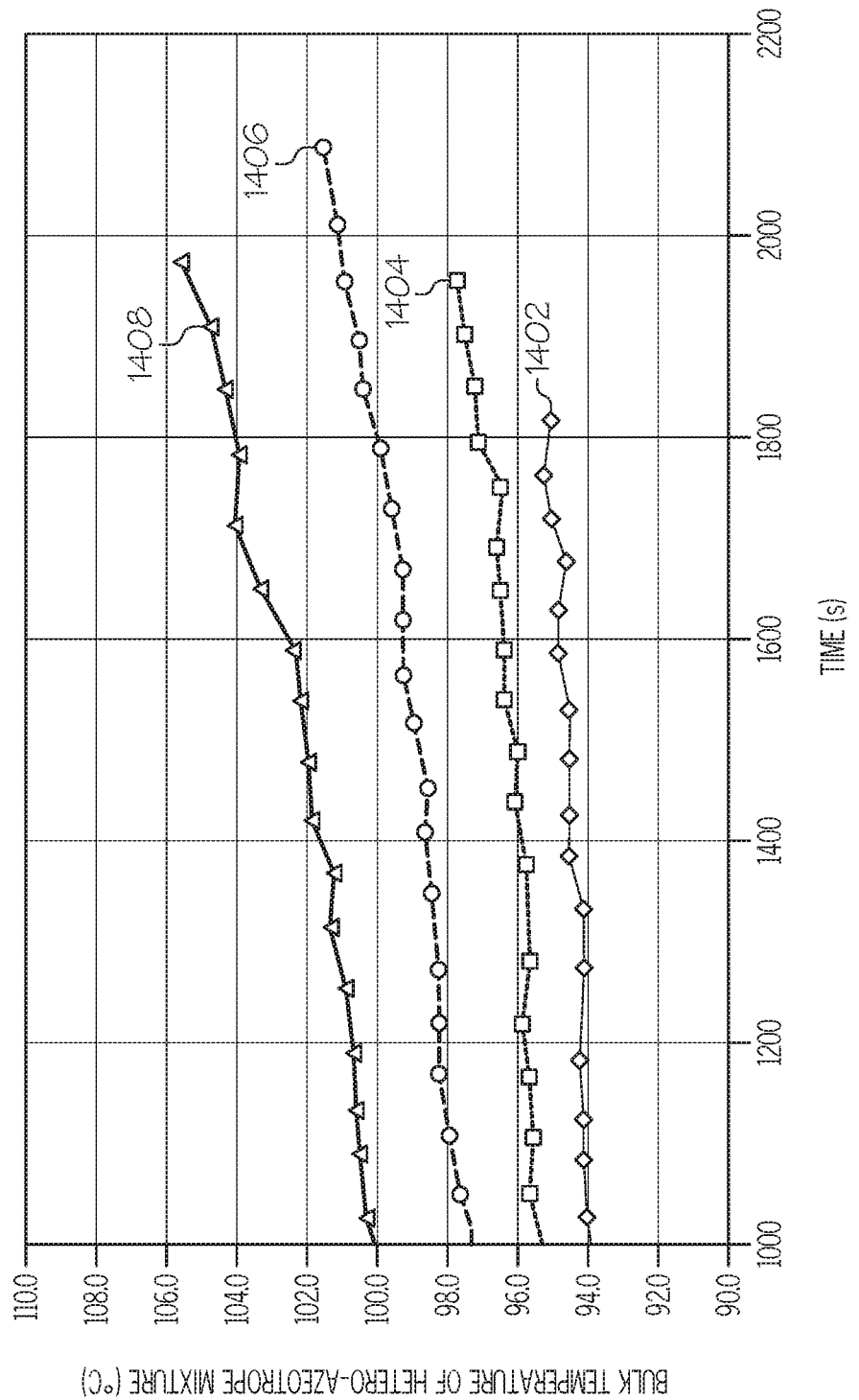
FIG. 24 graphically depicts the bulk temperature of the hetero-azeotrope mixtures of FIG. 21 (y-axis) as a function of time (x-axis) for the time period after the start of vaporization of the hetero-azeotrope mixtures, according to one or more embodiments described in this disclosure.

| Sample ID | Reference Number in FIGS. 21, 23, 24 | Salinity Range (g/L) | Average Salinity (g/L) | Rate of Distillation (mL/hr) |
|---|---|---|---|---|
| 3A | 1402 | 0 | 0 | 68.40 |
| 3B | 1404 | 92-123 | 107 | 67.68 |
| 3C | 1406 | 169-216 | 192 | 63.36 |
| 3D | 1408 | 274-336 | 305 | 62.28 |

Figure 22:
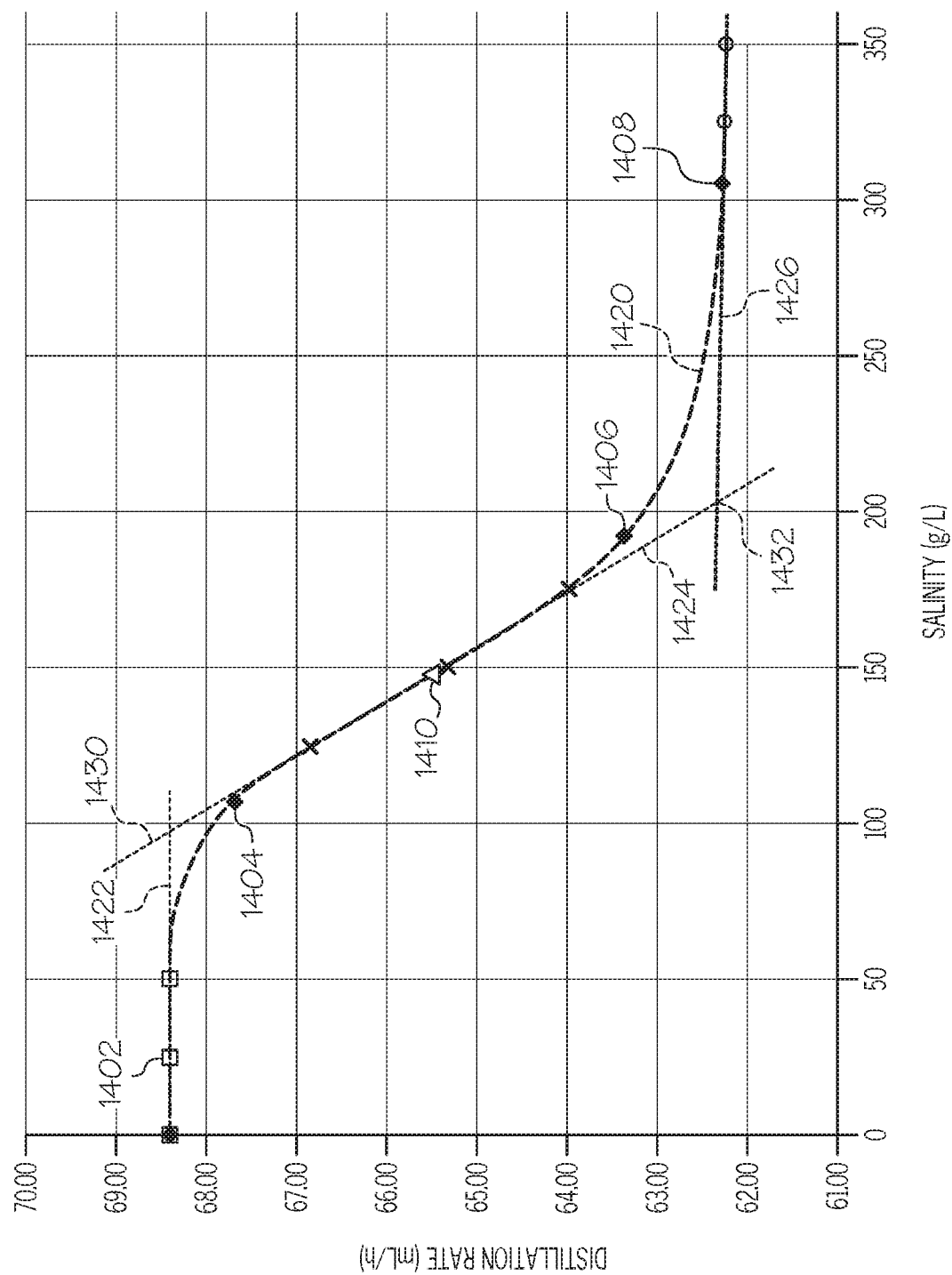
FIG. 22 graphically depicts a distillation rate (y-axis) as a function of salinity of the aqueous composition (x-axis) for the hetero-azeotrope mixtures of FIG. 21, according to one or more embodiments described in this disclosure.

Referring to FIG. 22, the distillation rate (y-axis) as a function of salinity (x-axis) from the data in Table 4 is graphically depicted. In FIG. 22, a curve 1420 was fitted to the experimental data. The best curve fitting for these data points was a standard 4-parameter logistic equation expressed by the following Equation 1 (EQU. 1):

$$y = d + \frac{(a-d)}{\left(1 + \left(\frac{x}{c}\right)^b\right)} \quad \text{EQU. 1}$$

In EQU. 1, y is the rate of distillation, x is the average salinity, and a, b, c, d are the curve fitting parameters. The fitting target is the lowest sum of squared absolute error (Err.). The curve fitting resulted in the values for a, b, c, and d in Table 5.

TABLE 5

Curve Fitting Parameters for Distillation
Rate Curve of Example 3 Shown in FIG. 22

| Parameter | Value |
| --- | --- |
| a | 68.40 |
| b | 5.97 |
| c | 150.34 |
| d | 62.19 |
| Err. | $5.05 \times 10^{-29}$ |

As shown in FIG. 22, the salinity of the aqueous composition affects the rate of distillation. As the salinity of the aqueous composition increases from 0 g/L to above 300 g/L, the rate of distillation decreases by about 9%. Two characteristic points of curve were graphically determined by locating the intersections of three tangential lines. First tangential line 1422 was drawn tangent to curve 1420 at the start of curve 1420 at Sample 3A 1402, for which the salinity is 0 g/L. The second tangential line 1424 was drawn tangent to curve 1420 at the inflection point 1410 of the curve 1420. The third tangential line 1426 was drawn tangent to curve 1420 at the end point of the curve represented by Sample 3D 1408 (average salinity of 305 g/L). The first intersection 1430 provides an estimation of a starting point of the deceleration of the distillation rate, which may occur at a salinity of the aqueous phase of about 98 g/L. The second intersection 1432 estimates an ending point of the decrease in distillation rate, which may occur at a salinity of the aqueous phase of about 202 g/L, leading to a stabilization of the distillation rate.

These same transition points are observed in the evolution of the vapor temperature for each of the hetero-azeotrope mixtures of Example 3. FIG. 23 graphically depicts the temperature of the vapor phase (y-axis) for each hetero-azeotrope mixture of Example 3 as a function of time (x-axis) starting at time greater than about 800 seconds. The hetero-azeotrope boiling point temperature of a toluene/water hetero-azeotrope is known to be in the range of 83° C. to 85° C. and is indicated in FIG. 23 by the rectangle 1220. For Sample 3A (1402, salinity of 0 g/L) and Sample 3B (1404, average salinity of 107 g/L), the temperature of the vapor phase was maintained within the range of 83° C. to 85° C., which indicated that the toluene/water hetero-azeotrope was the product being distilled.

For Sample 3C (1406), the temperature of the vapor phase started out in the range of 83° C. to 85° C., which indicates that the initial distillation involved distillation of the toluene/water hetero-azeotrope. At around 1100 seconds, salts precipitation was observed when the concentration of salts in the hetero-azeotrope mixture of Sample 3C reached 206 g/L. After approximately 1400 seconds, the vapor temperature increased and the concentration of salts in the aqueous composition reached 235 g/L. This observation suggested that the vapor composition is going away from the vapor composition of the toluene/water hetero-azeotrope when the salt concentration reaches about 235 g/L.

Still referring to FIG. 23, for Sample 3D (1408, salinity of 305 g/L), the vapor temperature continuously increased throughout the distillation. This result demonstrates that the greater salinity of Sample 3D, which was in excess of 235 g/L, disrupted the formation of the hetero-azeotrope and no hetero-azeotrope was formed during the experiment. At around 1100 seconds, salts precipitation was observed when the salt concentration of the solution reached 353 g/L.

Referring now to FIG. 24, the temperatures of the hetero-azeotrope mixtures 122 (bulk liquid) (y-axis) of Example 3 are graphically depicted as functions of time (x-axis) for time greater than 1000 seconds. FIG. 24 graphically demonstrates that the stabilized temperature of the hetero-azeotrope mixture increases with increasing salinity of the aqueous composition.

In summary, from Example 3, it was discovered that the salinity of the aqueous composition has a significant effect on the distillation of the hetero-azeotrope mixture. The vapor temperature does not stabilize near the boiling point temperature of the hetero-azeotrope, such as at a temperature of about 84° C. for a toluene/water azeotrope, when the aqueous composition has salinity equal to or greater than 202 g/L. Example 3 demonstrates that salinity of the aqueous composition of greater than about 202 g/L interferes with formation of the hetero-azeotrope resulting in failure to form the hetero-azeotrope.

Example 4: Ternary Hetero-Azeotrope

In Example 4, the performance of a ternary hetero-azeotrope on the hetero-azeotrope distillation process compared to a binary hetero-azeotrope was evaluated. For Example 4, the ternary hetero-azeotrope mixtures of Example 4 included the aqueous composition described in Example 1 (salinity equal to 107 g/L) and toluene and n-pentane as the entrainers. The total volume of each of the ternary hetero-azeotrope mixtures of Example 4 was 250 mL and three different volumetric fractions of the aqueous composition, toluene, and n-pentane were evaluated. These specific compositions for Example 4 were chosen based on the ternary hetero-azeotrope phase equilibrium diagram of FIG. 29, which is at ambient pressure (about 101.3 kPa). The compositions of Example 4 are provided in Table 6. In particular, the compositions for Example 4 were selected to be compositions along the line 1530 in FIG. 29, which are within the azeotrope envelope between the pentane/water and the toluene/water hetero-azeotropes. The amount of water collected in the Dean-Stark apparatus 520, the temperatures of the vapor phase, and the temperature of the hetero-azeotrope mixture 122 (bulk liquid) were measured and plotted as functions of time (x-axis) in FIGS. 25, 26, 27, and 28.

TABLE 6

Volume Percent of Entrainers and Rate of Distillation
for the Water/Toluene/N-Pentane Ternary Hetero-
Azeotrope Mixtures of Example 4

| Sample ID | Ref. No. In FIGS. 25-28 | Aqueous Composition (vol. %) | Toluene (vol. %) | N-pentane (vol. %) | Rate of Distillation (mL/hr) |
| --- | --- | --- | --- | --- | --- |
| 4A | 1502 | 100.0 | 0.0 | 0.0 | — |
| 4B | 1504 | 60.0 | 22.0 | 18.0 | 13.03 |
| 4C | 1506 | 32.0 | 37.6 | 30.4 | 7.09 |
| 4D | 1508 | 9.6 | 49.8 | 40.4 | 5.40 |

Figure 25:
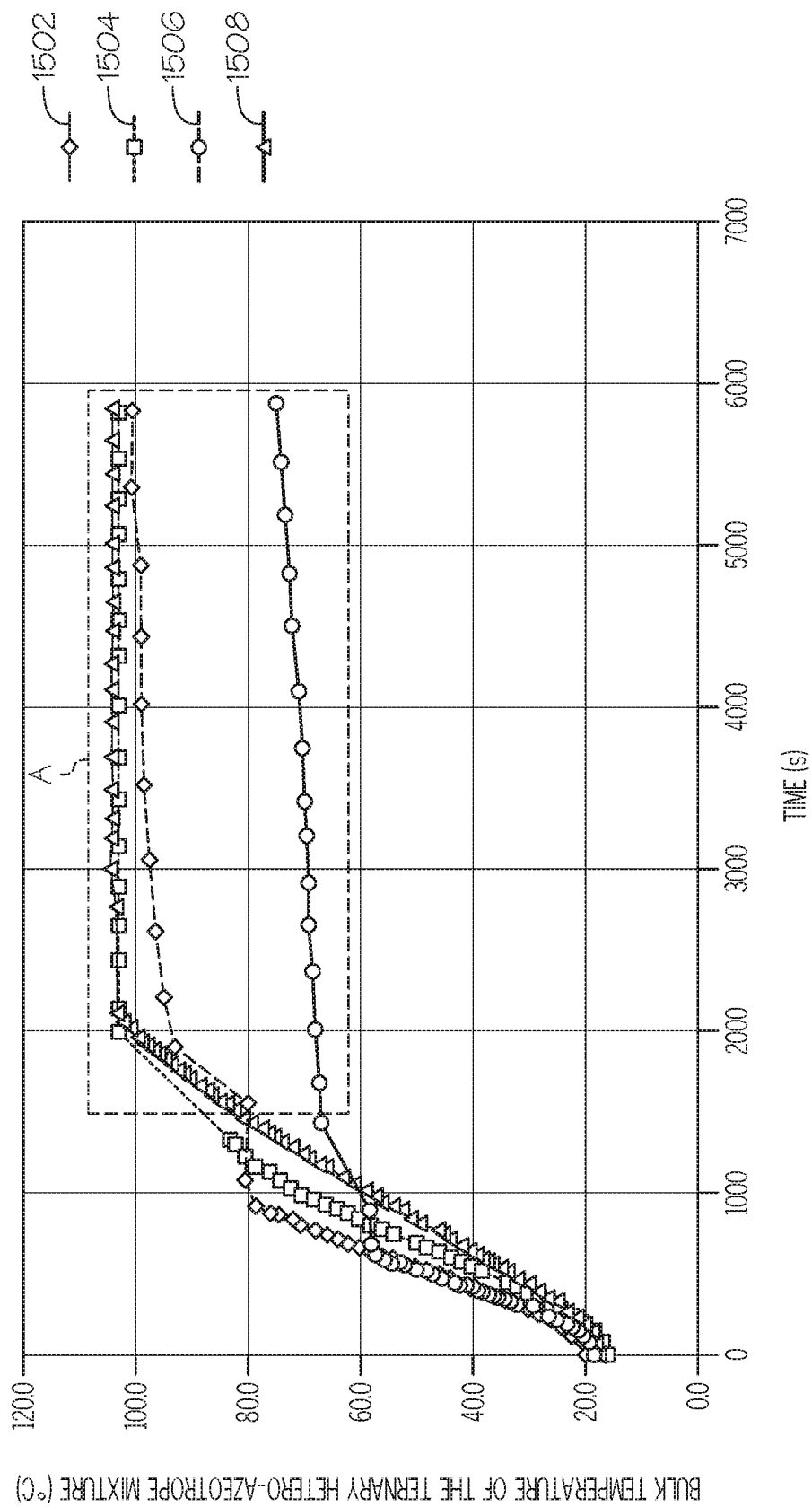
FIG. 25 graphically depicts a bulk temperature of a ternary hetero-azeotrope mixture (y-axis) as a function of time (x-axis) for a plurality of ternary hetero-azeotrope mixtures including an aqueous composition and toluene and n-pentane as entrainers, according to one or more embodiments described in this disclosure.

FIG. 25 graphically depicts the evolution of the bulk temperature of the ternary heteroazeotrope mixtures of Example 4 (y-axis) with time (x-axis) to the boiling point temperature for each of the ternary hetero-azeotrope mixtures. The temperature-changing rates of each of the ternary hetero-azeotrope mixtures, before stabilization of the temperature, were determined from the initial slope of the curves in FIG. 25. The average initial temperature-changing rate was determined to be 0.06° C./s±0.01° C./s before stabilization of the temperature. It was found that the composition of the ternary mixture had very little or no effect on the temperature-changing rate of the hetero-azeotrope mixtures before stabilization of the temperature.

Figure 26:
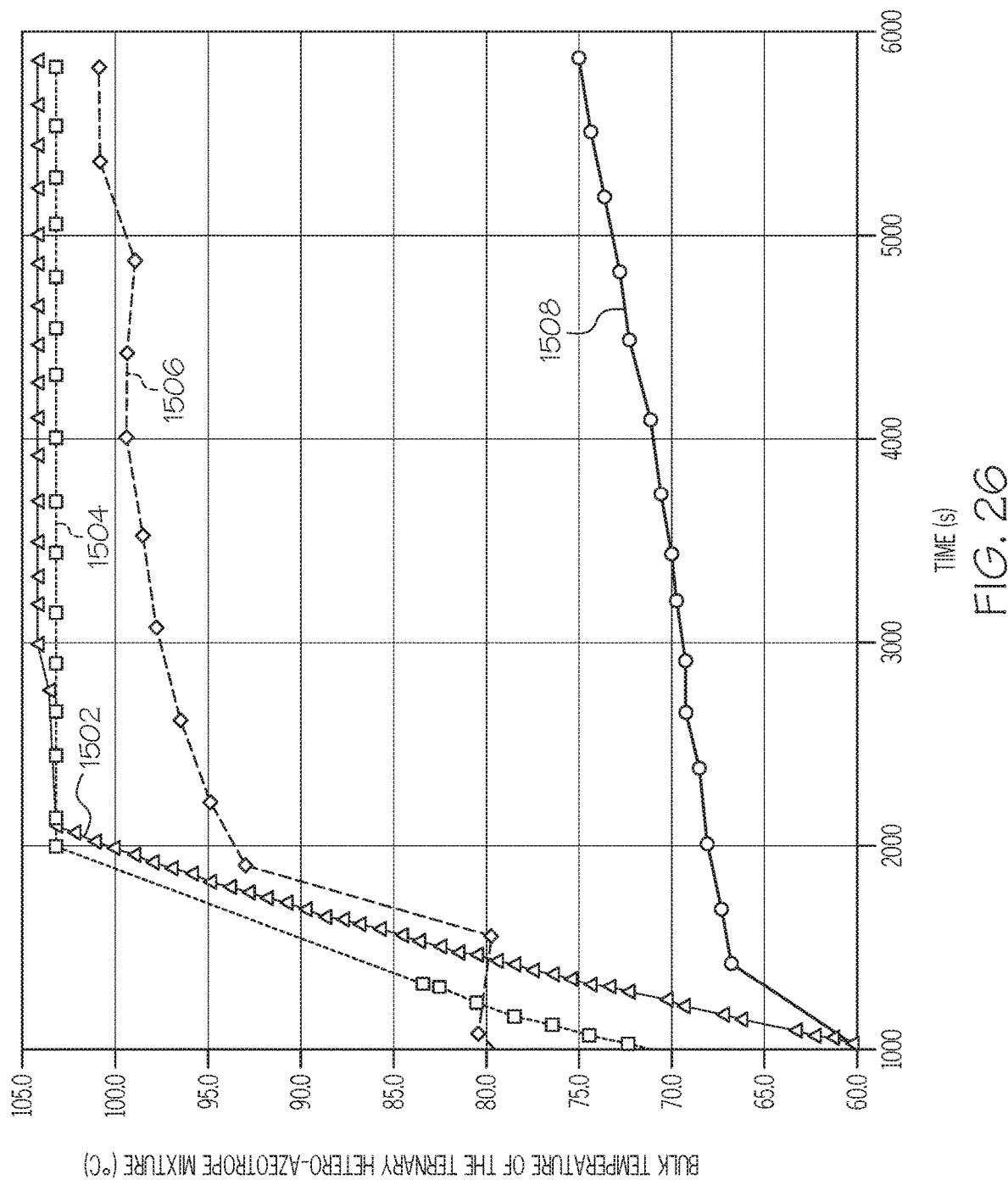
FIG. 26 graphically depicts the bulk temperature of the hetero-azeotrope mixtures of FIG. 25 (y-axis) as a function of time (x-axis) for time after the start of vaporization of the hetero-azeotrope mixtures, according to one or more embodiments described in this disclosure.

Referring now to FIG. 26, the temperatures of the ternary hetero-azeotrope mixtures (bulk liquid) (y-axis) are graphically depicted as functions of time (x-axis) for time greater than 1000 seconds (region A in FIG. 25), which illustrates the temperature behavior of the ternary hetero-azeotrope mixtures (bulk liquid) of Example 4 after reaching the initial boiling point temperature. Sample 4A designated by reference number 1502 in FIG. 26 represents the thermal behavior of the aqueous composition by itself with no entrainers.

For Sample 4B (1504) having 60 vol % aqueous composition, the ternary hetero-azeotrope mixture was observed to start vaporizing when the temperature reached 104° C.±1° C. As shown in FIG. 26, the temperature of the bulk liquid of the ternary hetero-azeotrope of Sample 4B was constant throughout the experiment. It is believed that this constant boiling temperature for the ternary hetero-azeotrope mixture of Sample 4B was the result of the excess amount of aqueous composition remaining in the flask 510. For Sample 4C (1506), which included 37.6 vol. % aqueous composition, the ternary hetero-azeotrope mixture started vaporizing at around 80° C.±1° C. At around 1900 seconds, the temperature rapidly increased by about 10° C. It is believed that this increase in temperature of the ternary hetero-azeotrope mixture of Sample 4C may be due to shifting of the composition of the feed mixture caused by flooding of the condensate receiver 524 of the Dean-Stark apparatus 520 during the experiment. When the condensate is collected in the condensate receiver 524, water started to move towards the bottom of the condensate receiver 524 while the lighter toluene and pentane accumulated in the upper section of the condensate receiver 524. Thus, when the condensate receiver floods, only the toluene/pentane mixture is recycled back to the ternary hetero-azeotrope mixture in the flask 510. Once flooding of the condensate receiver 524 commenced, the temperature of the ternary hetero-azeotrope mixture in the flask 510 continued to increase with time at a temperature-changing rate of $1.77 \times 10^{-3} \pm 0.01 \times 10^{-3}$° C./s. For Sample 4D (1508) having 9.6 vol % aqueous composition, the ternary hetero-azeotropic mixture began to vaporize at around 60° C.±1° C. The temperature continued to increase which is believed to be the result of the excess amount of the homogenous mixture of toluene and pentane left in the flask 510. The temperature-changing rate for Sample 4D was estimated to be $1.8 \times 10^{-3} \pm 0.01 \times 10^{-3}$° C./s during the ebullition of the ternary hetero-azeotrope mixture.

Figure 27:
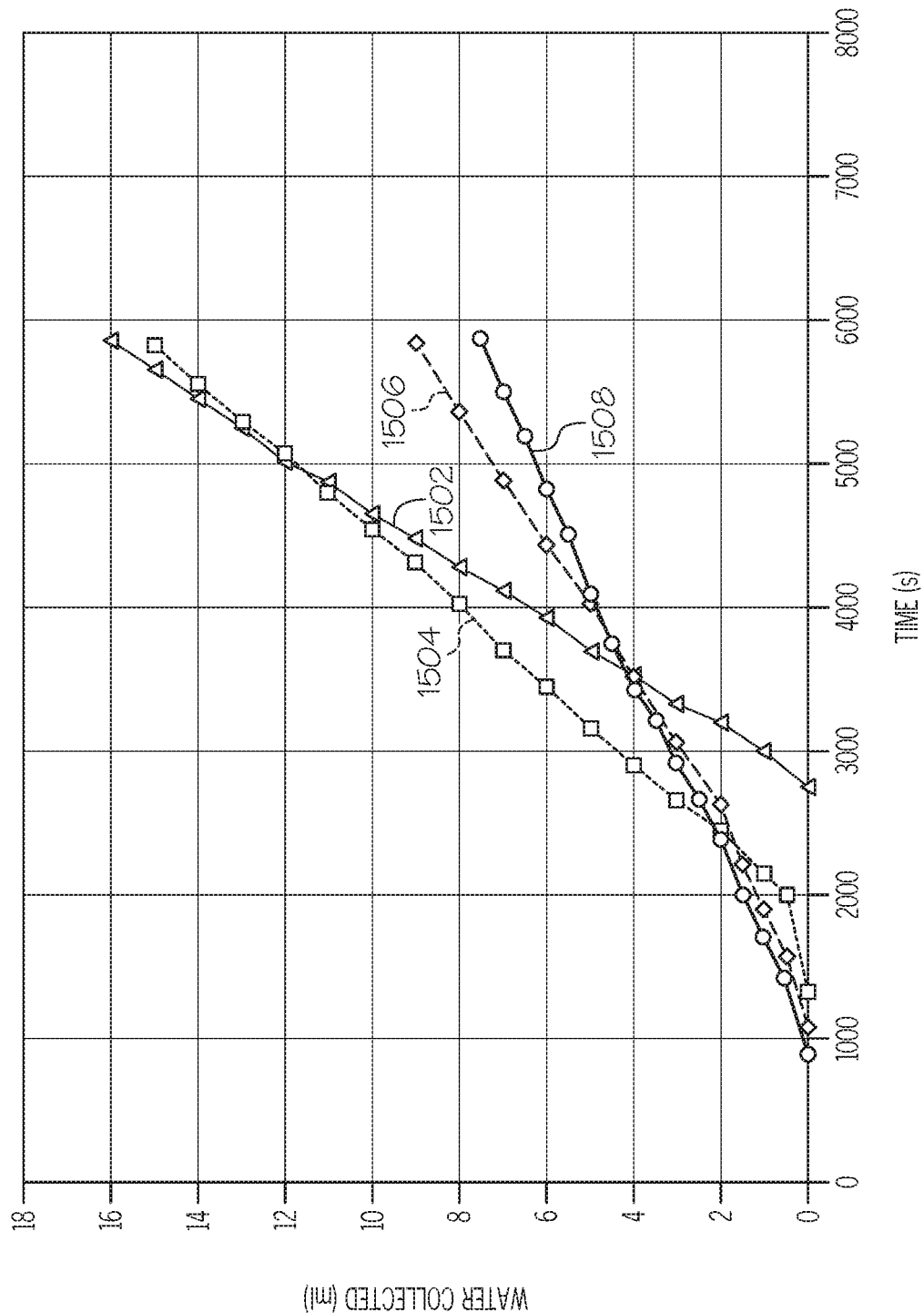
FIG. 27 graphically depicts a volume of desalinated water collected (y-axis) as a function of time (x-axis) for the plurality of hetero-azeotrope mixtures of FIG. 25, according to one or more embodiments described in this disclosure.

Once the temperature stabilized, condensed desalinated water was collected in the condensate receiver 524 and the volume recorded as a function of time. Referring to FIG. 27, the volume of desalinated water collected (y-axis) was plotted as a function of time (x-axis). The rate of distillation was graphically determined from FIG. 27 for each of the ternary hetero-azeotrope mixtures of Example 4 and the results of the distillation rate for each ternary hetero-azeotrope mixture in Example 4 is listed in Table 6, which was previously provided in this disclosure. The distillation for Sample 4A having 100 vol. % aqueous composition was not determined. As shown by the different slopes for the different ternary hetero-azeotrope mixtures shown in FIG. 27, it is noted that the distillation rate increases with increasing volume percent of the aqueous composition.

The maximum distillation rate was found to be 13.03 mL/hr corresponding to Sample 4B, which had a ternary hetero-azeotrope mixture composition of 60.0 vol. % aqueous composition, 22.0 vol. % toluene, and 18.0 vol. % n-pentane. When the volumetric fractions of toluene and pentane were more than doubled in Sample 4D, the resulting distillation rate was less than half of the maximum distillation rate for Sample 4B. Referring to Sample 4C, the distillation rate also decreased when the volumetric fractions of toluene and pentane were increased to 37.6 vol. % and 30.4 vol. %, respectively. Thus, the distillation rate can be increased for the ternary hetero-azeotrope by decreasing the volume proportion of the entrainers.

Figure 28:
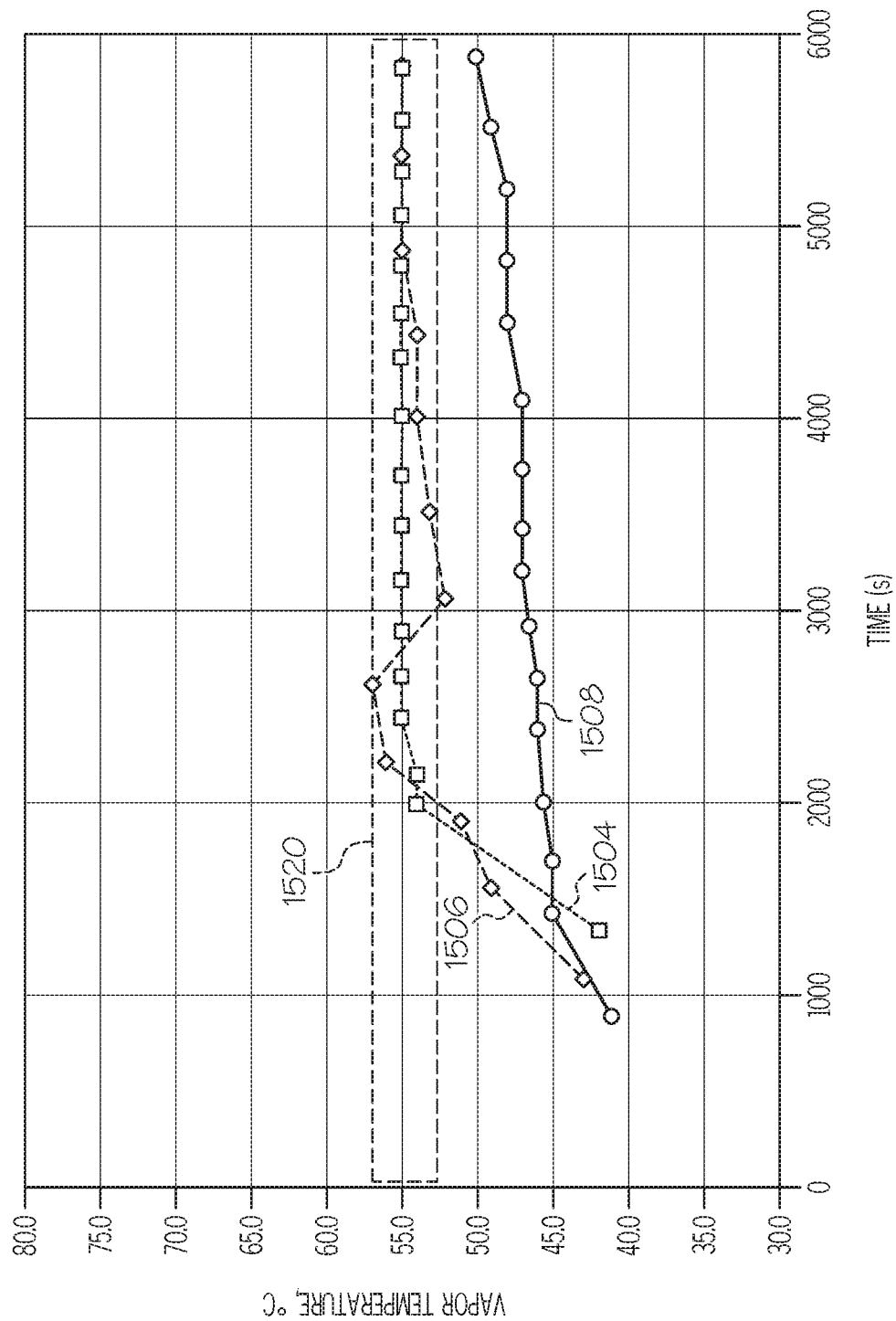
FIG. 28 graphically depicts a temperature of the vapor phase (y-axis) as a function of time (x-axis) for the hetero-azeotrope mixtures of FIG. 25, according to one or more embodiments described in this disclosure.
Figure 29:
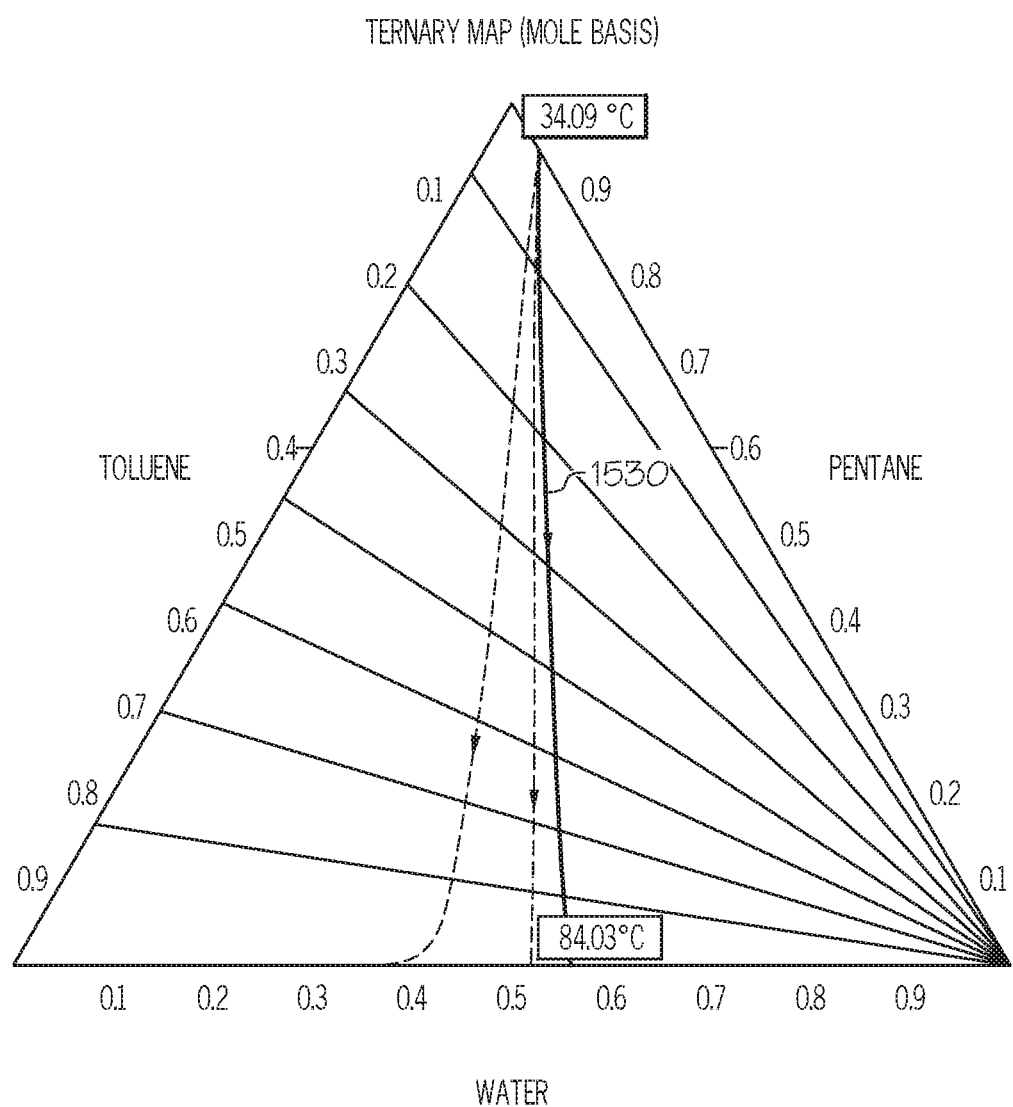
FIG. 29 graphically depicts a phase equilibrium diagram for a ternary hetero-azeotrope of water, toluene, and n-pentane at ambient pressure, according to one or more embodiments described in this disclosure.

Referring to FIG. 28, the temperature of the vapor phase (y-axis) as a function of time (x-axis) is graphically depicted. As shown in FIG. 28, the temperature of the vapor phase remained generally constant, which indicated that the vapor phase is at a hetero-azeotropic composition. The temperatures of the vapor phase were within the range of temperature between the hetero-azeotrope boiling temperature for pentane/water binary hetero-azeotrope (34.09° C.) and the hetero-azeotrope boiling temperature of the toluene/water binary hetero-azeotropes (84.03° C.). The temperature of the vapor phase at the maximum distillation rate was about 55° C. It may be noted from FIG. 28 that the temperature of the vapor phase for Sample 4C having 32.0 vol. % aqueous composition began to decrease at around 2,600 seconds. As previously discussed, it is believed that this may have resulted from changes in the ternary heteroazeotrope mixture composition caused by flooding of the condensate receiver 524. After 3,000 seconds, the temperature of the vapor phase for Sample 4C began to increase slightly and stabilized at the azeotropic temperature of 55° C. For Sample 4D having 9.6 vol. % aqueous composition, the temperature of the vapor phase began to increase more dramatically after about 5200 seconds. It is believed that this increase in the temperature of the vapor phase may also be the result of changing composition of the ternary heteroazeotropic mixture. It can be noted from FIG. 28 that Sample 4D with 9.6 vol. % aqueous composition was not azeotropic and composition shifted away from the azeotropic composition as the amount of water decreased in the flask 510.

In a first aspect of the present disclosure, a method for desalinating an aqueous composition includes forming a hetero-azeotrope mixture by combining at least a portion of the aqueous composition with at least one entrainer, the at least a portion of the aqueous composition comprising at least one salt. The method further includes subjecting the hetero-azeotrope mixture to distillation at a distillation temperature of less than a boiling temperature of the aqueous composition at an operating distillation pressure, which results in separation of the hetero-azeotrope mixture into a distillation bottoms liquid and a multi-phase condensate. The method further includes recovering the multi-phase condensate, the multi-phase condensate comprising an entrainer-rich phase and an aqueous phase, the aqueous phase comprising desalinated water; and removing at least a portion of the aqueous phase from the multi-phase condensate to recover the desalinated water.

A second aspect of the present disclosure may include the first aspect, in which the aqueous composition is briny water having a salinity of from 3 grams per liter (g/L) to 300 g/L.

A third aspect of the present disclosure may include the second aspect, in which the briny water comprises at least one of seawater, salty wastewater, produced water from hydrocarbon drilling, production or refining operations, or combinations of these.

A fourth aspect of the present disclosure may include any of the first through third aspects, further comprising separating at least a portion of the entrainer-rich phase from the multi-phase condensate and passing the at least a portion of the entrainer-rich phase back to the hetero-azeotrope mixture.

A fifth aspect of the present disclosure may include any of the first through fourth aspects, in which the hetero-azeotrope mixture comprises from 20 volume percent (vol. %) to 95 vol. % aqueous composition based on a total volume of the hetero-azeotrope mixture.

A sixth aspect of the present disclosure may include any of the first through fifth aspects, in which the hetero-azeotrope mixture has a hetero-azeotrope boiling temperature of less than 100° C. at the operating distillation pressure.

A seventh aspect of the present disclosure may include any of the first through sixth aspects, in which the at least one entrainer is chemically stable and does not react with water, at least one salt, or organic compounds in the aqueous composition.

An eighth aspect of the present disclosure may include any of the first through seventh aspects, in which the at least one entrainer has a solubility in water of less than 20 grams per 100 grams of water at 25° C. and atmospheric pressure.

A ninth aspect of the present disclosure may include any of the first through eighth aspects, in which the entrainer comprises one or more than one of an alkane, an alkene, an aromatic, an ester, an alcohol, a thiol, a disulfide, a sulfide, an ether, a ketone, a nitro group, or combinations of these.

A tenth aspect of the present disclosure may include any of the first through ninth aspects, in which the entrainer is selected from 2-methyl-1,3-butadiene; pentane; 2-methyl-2-butene; methylenecyclobutane; carbon disulfide; 1-hexene; ethyl formate; 4-methyl-2-pentene; 3-methyl-3-buten-1-ol; hexane; isopropyl ether; cis-1-butenyl ethyl ether; 1-butenyl methyl ether; benzene; cyclohexane; ethyl acetate; cyclohexene; methyl propanoate; propyl formate; isopropyl acetate; ethylbutyl ether; isopropylacetate; butyl ethyl ether; 1-heptene; 2,5-dimethylfuran; 2,2,4-trimethylpentane; heptane; isobutyl formate; methylisopropenyl ketone; diisobutylene; propyl acetate; 3-pentanone; allyl acetate; nitroethane; 2,6-dimethyl-4-heptanol; toluene; 1,2-propanediol diacetate; butyl isopropenyl ether; 2-methyl-2-butanol; methylisobutyl ketone; isobutyl acetate; 2-methylpropyl acetate; cyclopropyl methyl ketone; propyl propanoate; octane; isobutyl alcohol; 2-pentanol, or combinations of these entrainers.

An eleventh aspect of the present disclosure may include any of the first through tenth aspects, in which the at least one entrainer does not include halogen-containing compounds, amines, nitriles, acetals, vinyl ethers, or aldehydes.

A twelfth aspect of the present disclosure may include any of the first through eleventh aspects, where forming the hetero-azeotrope mixture comprises combining the aqueous composition with a plurality of entrainers.

A thirteenth aspect of the present disclosure may include any of the first through twelfth aspects, in which the distillation comprises short path distillation in which a short path ratio ($H_L/H_T$) of from 0.2 to 0.5, in which the short path ratio is defined as a height (HL) of a vapor-liquid interface from a bottom of a distillation vessel to a total height (HT), which includes a distance from the bottom of the distillation vessel to a top of a short path distillation column coupled to the distillation vessel.

A fourteenth aspect of the present disclosure may include any of the first through thirteenth aspects, in which subjecting the hetero-azeotrope mixture to distillation is conducted in a distillation vessel having an aspect ratio ($L/H_V$) of from 2 to 5, in which the aspect ratio of the distillation vessel is defined as a length (L) of the distillation vessel divided by a height ($H_V$) of the distillation vessel.

A fifteenth aspect of the present disclosure may include any of the first through fourteenth aspects, in which the aqueous composition has salinity greater than 200 grams per liter (g/L) and the method further comprises reducing the salinity of the hetero-azeotrope mixture to produce a reduced salinity hetero-azeotrope mixture and a feedstream salt product, and subjecting the reduced salinity hetero-azeotrope mixture to the distillation to produce the multi-phase condensate.

A sixteenth aspect of the present disclosure may include any of the first through fifteenth aspects, further comprising subjecting the at least a portion of the aqueous phase to a water treatment process to remove contaminants from the at least a portion of the aqueous phase to produce a purified desalinated water.

A seventeenth aspect of the present disclosure may include any of the first through sixteenth aspects further comprising subjecting at least a portion of the distillation bottoms liquid to crystallization which results in separation of the distillation bottoms liquid into a salt product and a brine composition.

In an eighteenth aspect, a system for desalinating an aqueous composition includes a distillation system comprising a distillation vessel in thermal communication with a heat source and a condenser in fluid communication with the distillation vessel. The system further includes a condensate receiver in fluid communication with the condenser and operable to receive a multi-phase condensate comprising at least an aqueous phase and an entrainer-rich phase from the distillation system. The condensate receiver may include a separation system operable to separate at least a portion of an aqueous phase from the condensate. The system further comprises a crystallizer in fluid communication with the distillation vessel, the crystallizer operable to receive a bottoms liquid from the distillation vessel and separate at least a portion of a salt in the bottoms liquid to produce a salt product and a brine composition.

A nineteenth aspect of the present disclosure may include the eighteenth aspect, in which the distillation vessel comprises an aqueous composition inlet and an entrainer inlet and the distillation vessel is operable to combine the aqueous composition and an entrainer to produce a hetero-azeotrope mixture.

A twentieth aspect of the present disclosure may include the eighteenth or nineteenth aspects, in which the distillation system further comprises a short-path distillation column in fluid communication with the distillation vessel and disposed between the distillation vessel and the condenser.

A twenty-first aspect of the present disclosure may include any of the eighteenth through twentieth aspects, further comprising a feedstream crystallizer disposed upstream of the distillation vessel and in fluid communication with the distillation vessel, the feedstream crystallizer operable to combine the aqueous composition and an entrainer to produce a hetero-azeotrope mixture and to remove at least a portion of a salt from the hetero-azeotrope mixture to produce a feedstream salt product and a reduced-salinity hetero-azeotrope mixture.

A twenty-second aspect of the present disclosure may include any of the eighteenth through twenty-first aspects, in which the condensate receiver comprises a level control system operable to control a withdrawal rate of at least a portion of an aqueous phase from the multi-phase condensate in the condensate receiver.

It should now be understood that various aspects of the systems and methods for desalinating aqueous stream having one or more salts that include hetero-azeotropic distillation are described and such aspects may be utilized in conjunction with various other aspects.

Throughout this disclosure ranges are provided for various processing parameters and operating conditions for the systems and methods of desalinating aqueous streams and compositions of various streams and mixtures. It will be appreciated that when one or more explicit ranges are provided the individual values and the sub-ranges formed within the range are also intended to be provided as providing an explicit listing of all possible combinations is prohibitive. For example, a provided range of 1-10 also includes the individual values, such as 1, 2, 3, 4.2, and 6.8, as well as all the ranges which may be formed within the provided bounds, such as 1-8, 2-4, 6-9, and 1.3-5.6.

It should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

What is claimed is:

1. A method for desalinating an aqueous composition, the method comprising:
    forming a hetero-azeotrope mixture by combining at least a portion of the aqueous composition with at least one entrainer, the at least a portion of the aqueous composition comprising at least one salt, where the aqueous composition is selected from the group consisting of seawater, salty wastewater, produced water from hydrocarbon drilling, production or refining operations, and combinations of these;
    subjecting the hetero-azeotrope mixture to distillation at a distillation temperature of less than a boiling temperature of the aqueous composition at an operating distillation pressure, which results in separation of the hetero-azeotrope mixture into a distillation bottoms liquid and a multi-phase condensate;
    recovering the multi-phase condensate, the multi-phase condensate comprising an entrainer-rich phase and an aqueous phase, the aqueous phase comprising desalinated water; and
    removing at least a portion of the aqueous phase from the multi-phase condensate to recover the desalinated water.

2. The method of claim 1, in which the aqueous composition is briny water having a salinity of from 3 grams per liter (g/L) to 300 g/L.

3. The method of claim 1, further comprising:
    separating at least a portion of the entrainer-rich phase from the multi-phase condensate; and
    passing the at least a portion of the entrainer-rich phase back to the hetero-azeotrope mixture.

4. The method of claim 1, in which the hetero-azeotrope mixture comprises from 20 volume percent (vol. %) to 95 vol. % aqueous composition based on a total volume of the hetero-azeotrope mixture.

5. The method of claim 1, in which the hetero-azeotrope mixture has a hetero-azeotrope boiling temperature of less than 100° C. at the operating distillation pressure.

6. The method of claim 1, in which the at least one entrainer is chemically stable and the at least one entrainer does not react with water, at least one salt, or organic compounds in the aqueous composition.

7. The method of claim 1, in which the at least one entrainer has a solubility in water of less than 20 grams per 100 grams of water at 25° C. and atmospheric pressure.

8. The method of claim 1, in which the entrainer is selected from the group consisting of an alkane, an alkene, an aromatic, an ester, an alcohol, a thiol, a disulfide, a sulfide, an ether, a ketone, a nitro group, and combinations of these.

9. The method of claim 1, in which the entrainer is selected from 2-methyl-1,3-butadiene; pentane; 2-methyl-2-butene; methylenecyclobutane; carbon disulfide; 1-hexene; ethyl formate; 4-methyl-2-pentene; 3-methyl-3-buten-1-ol; hexane; isopropyl ether; cis-1-butenyl ethyl ether; 1-butenyl methyl ether; benzene; cyclohexane; ethyl acetate; cyclohexene; methyl propanoate; propyl formate; isopropyl acetate; ethylbutyl ether; isopropylacetate; butyl ethyl ether; 1-heptene; 2,5-dimethylfuran; 2,2,4-trimethylpentane; heptane; isobutyl formate; methylisopropenyl ketone; diisobutylene; propyl acetate; 3-pentanone; allyl acetate; nitroethane; 2,6-dimethyl-4-heptanol; toluene; 1,2-propanediol diacetate; butyl isopropenyl ether; 2-methyl-2-butanol; methylisobutyl ketone; isobutyl acetate; 2-methylpropyl acetate; cyclopropyl methyl ketone; propyl propanoate; octane; isobutyl alcohol; 2-pentanol, or combinations of these entrainers.

10. The method of claim 1, where forming the hetero-azeotrope mixture comprises combining the aqueous composition with a plurality of entrainers.

11. The method of claim 1, in which the distillation comprises short path distillation conducted in a distillation unit comprising a distillation vessel and a short-path distillation column fluidly coupled to the distillation vessel, in which a short path ratio ($H_L/H_T$) of the distillation unit is from 0.2 to 0.5, where the short path ratio is defined as a height ($H_L$) of a vapor-liquid interface from a bottom of a distillation vessel to a total height ($H_T$), which includes a distance from the bottom of the distillation vessel to a top of a short path distillation column coupled to the distillation vessel.

12. The method of claim 1, in which subjecting the hetero-azeotrope mixture to distillation is conducted in a distillation vessel having an aspect ratio ($L/H_V$) of from 2 to 5, in which the aspect ratio of the distillation vessel is defined as a length (L) of the distillation vessel divided by a height ($H_V$) of the distillation vessel.

13. The method of claim 1, further comprising subjecting at least a portion of the distillation bottoms liquid to crystallization which results in separation of the distillation bottoms liquid into a salt product and a brine composition.

14. The method of claim 1, in which the aqueous composition has salinity greater than 200 grams per liter (g/L) and the method further comprises:
    reducing the salinity of the hetero-azeotrope mixture to produce a reduced salinity hetero-azeotrope mixture and a feedstream salt product; and
    subjecting the reduced salinity hetero-azeotrope mixture to the distillation to produce the multi-phase condensate.

15. The method of claim 1, in which the aqueous composition has an oil content of greater than 0.1 weight percent (wt. %) based on the total weight of the aqueous composition.

16. The method of claim 1, in which the hetero-azeotrope mixture has a volume ratio of the aqueous composition to the entrainers of from 0.2 to 9.0.

17. The method of claim 1, in which the hetero-azeotrope mixture has a hetero-azeotrope boiling temperature at an operating distillation pressure equal to atmospheric pressure at sea level (101.325 kilopascals (kPa)) of less than or equal to 100° C.

18. The method of claim 1, in which the hetero-azeotrope mixture has a distillation temperature of less than or equal to 100° C. at the operating distillation pressure.

* * * * *